(12) United States Patent
Nir

(10) Patent No.: US 12,058,470 B2
(45) Date of Patent: Aug. 6, 2024

(54) VIDEO COMPRESSION AND STREAMING

(71) Applicant: Nahum Nir, Tel Aviv (IL)

(72) Inventor: Nahum Nir, Tel Aviv (IL)

( * ) Notice: Subject to any disclaimer, the term of this patent is extended or adjusted under 35 U.S.C. 154(b) by 151 days.

(21) Appl. No.: 17/412,216

(22) Filed: Aug. 25, 2021

(65) Prior Publication Data

US 2023/0071585 A1 Mar. 9, 2023

Related U.S. Application Data

(60) Provisional application No. 63/070,103, filed on Aug. 25, 2020.

(51) Int. Cl.
| | |
|---|---|
| *G06T 7/00* | (2017.01) |
| *G06T 7/20* | (2017.01) |
| *G06V 20/40* | (2022.01) |
| *H04N 5/262* | (2006.01) |
| *H04N 19/14* | (2014.01) |
| *H04N 19/167* | (2014.01) |
| *H04N 21/4402* | (2011.01) |
| *H04N 19/436* | (2014.01) |

(52) U.S. Cl.
CPC ............ *H04N 5/2628* (2013.01); *G06T 7/20* (2013.01); *G06V 20/46* (2022.01); *G06V 20/48* (2022.01); *H04N 19/14* (2014.11); *H04N 19/167* (2014.11); *H04N 21/440245* (2013.01); *G06T 2207/10016* (2013.01); *H04N 19/436* (2014.11)

(58) Field of Classification Search
CPC .... H04N 19/136; H04N 19/117; H04N 19/17; H04N 19/80; H04N 5/21; H04N 9/8042; H04N 19/186; H04N 19/14; H04N 19/192; H04N 1/407; H04N 1/6027; H04N 19/625; G06V 40/162; G06V 10/267; G06V 10/30; G06V 10/34; G06V 20/42; G06V 20/47; G06T 2207/10016; G06T 5/002; G06T 7/194; G06T 2207/10024; G06T 7/254; G06T 5/50; G06T 2207/20182; G06T 5/006; G06T 5/007; G06T 7/136; G06T 2207/20024; G06T 2207/20032; G06Q 20/00; G06Q 20/4016; G06Q 20/403
See application file for complete search history.

(56) References Cited

U.S. PATENT DOCUMENTS

| | | | |
|---|---|---|---|
| 10,848,687 B2 * | 11/2020 | Harrison | .......... H04N 21/44226 |
| 11,184,558 B1 * | 11/2021 | Zhang | .................... G06V 20/41 |
| 2002/0030634 A1 | 3/2002 | Noda et al. | |
| 2009/0030701 A1 | 1/2009 | Liebchen | |
| 2009/0032081 A1 | 2/2009 | Saita et al. | |

(Continued)

*Primary Examiner* — Quan M Hua

(57) ABSTRACT

A method, system and product for compressing a video frame. The method comprising: obtaining a video frame that comprises at least a first area of interest; determining at least the first area of interest based on a portion of an object displayed therein; determining at least a portion of the frame based on at least the first areas of interest; determining at least a first processing channel based on at least the first areas of interest, wherein first processing channel comprises at least a first actions, wherein the first processing action is associated with at least one processing action parameters; and processing at least the first portion by utilizing at least the first processing channels, whereby an alternative video frame can be constructed based on at least a first processed portions of the video frame.

23 Claims, 14 Drawing Sheets

(56) References Cited

U.S. PATENT DOCUMENTS

Figure 1:
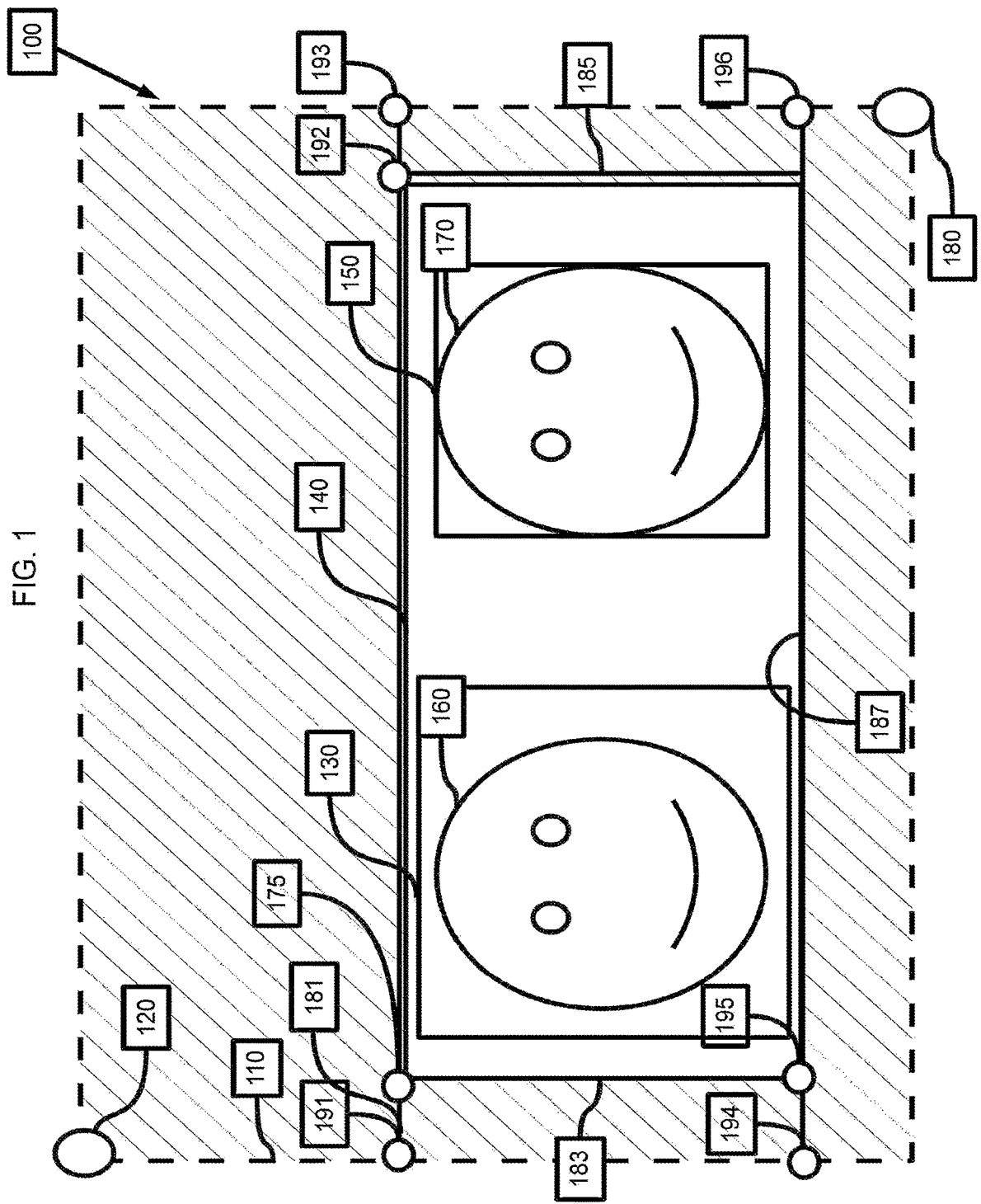

2009/0290794 A1  11/2009  Marchesotti
2010/0111196 A1   5/2010  Lynch
2014/0245367 A1   8/2014  Sasaki et al.
2021/0398333 A1*  12/2021  Kalu .................... G06V 10/462

* cited by examiner

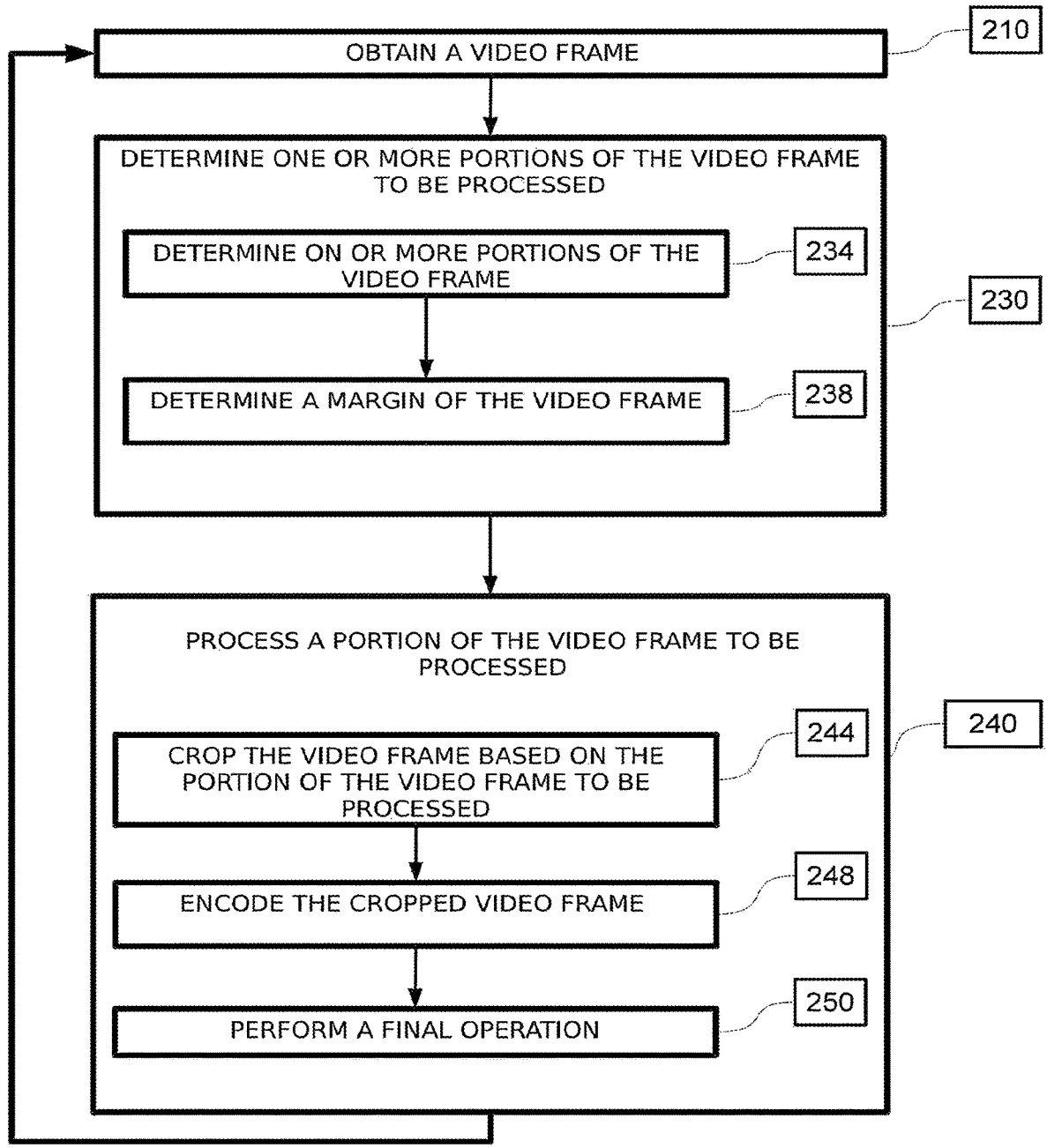

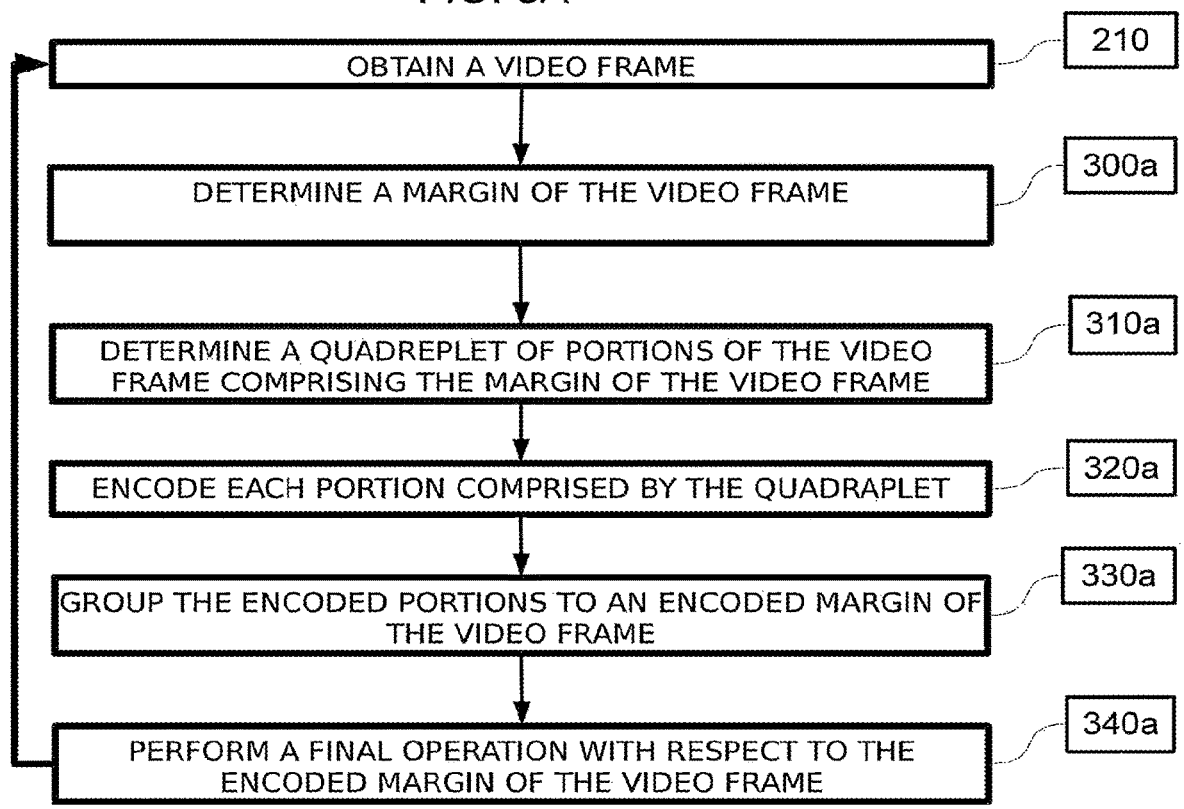
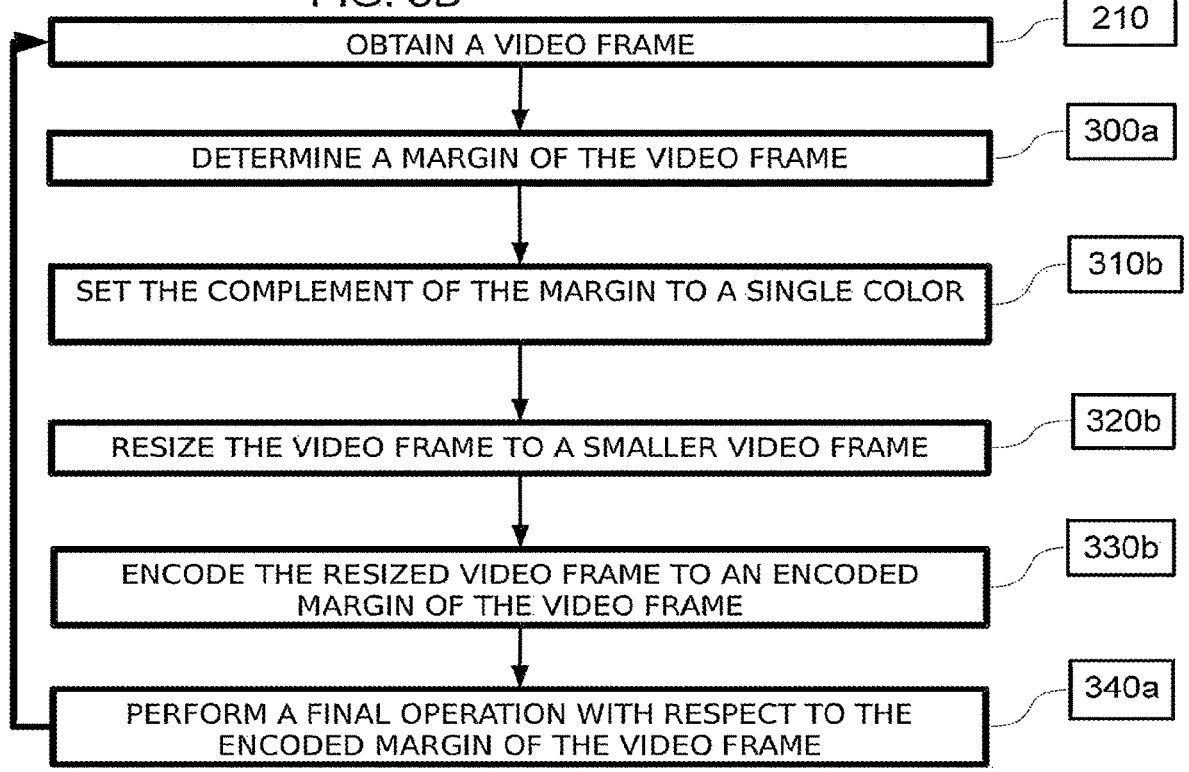

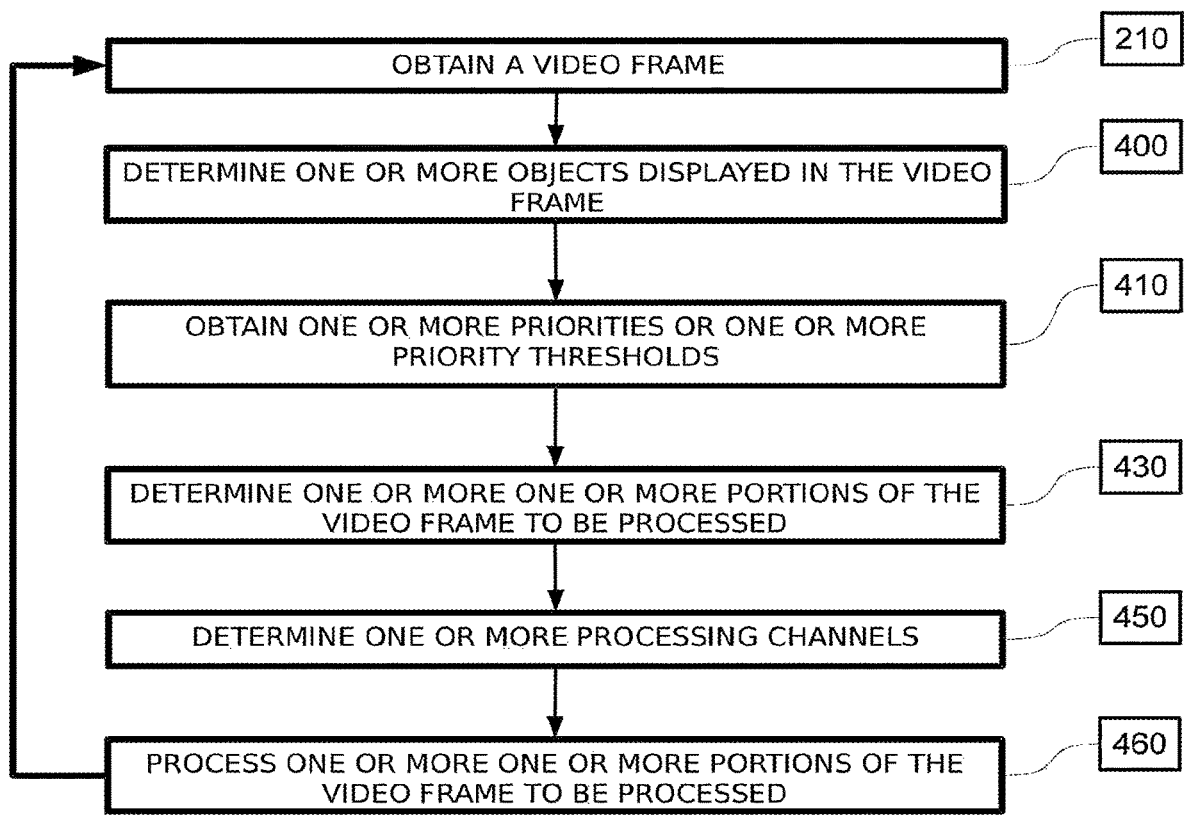

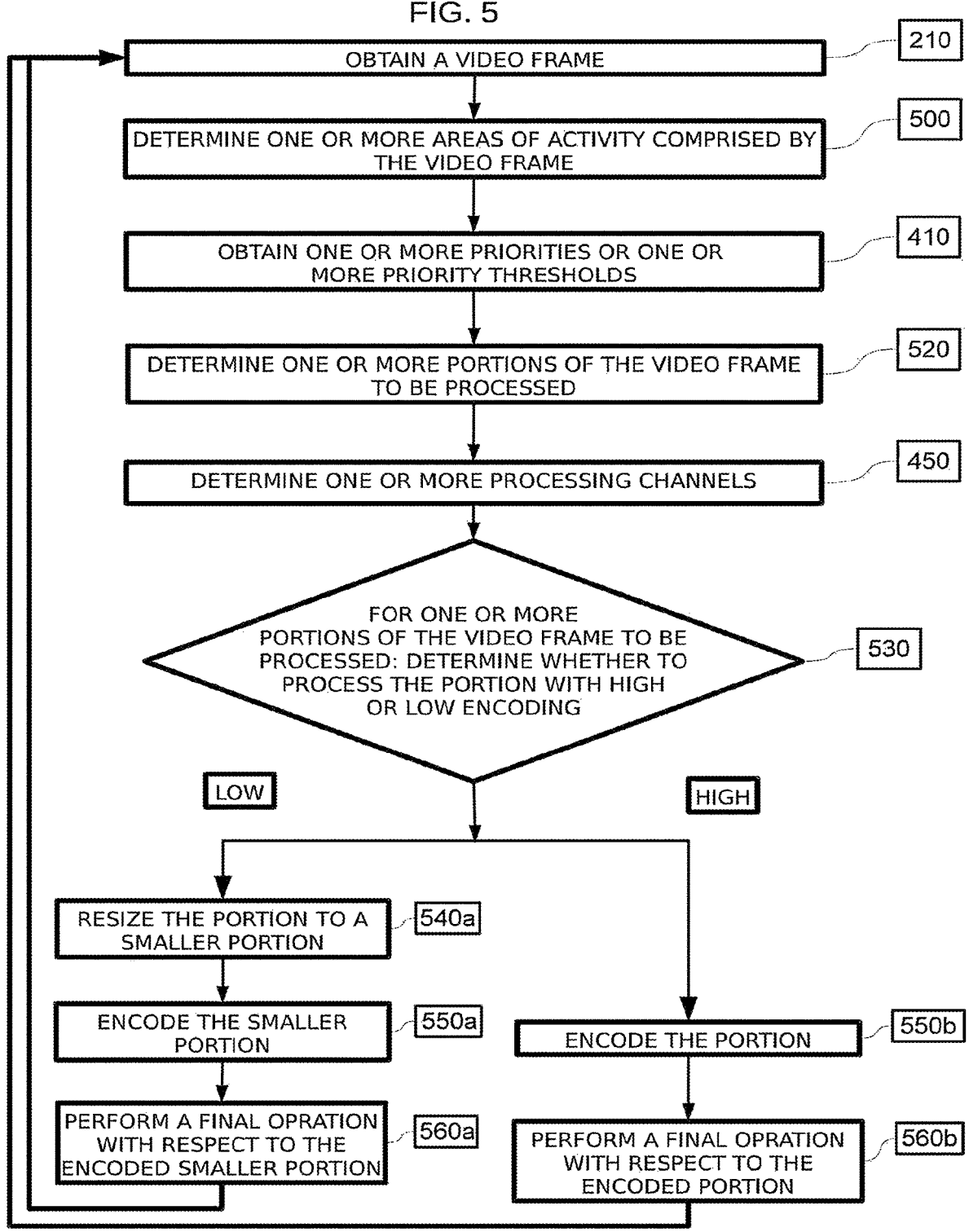

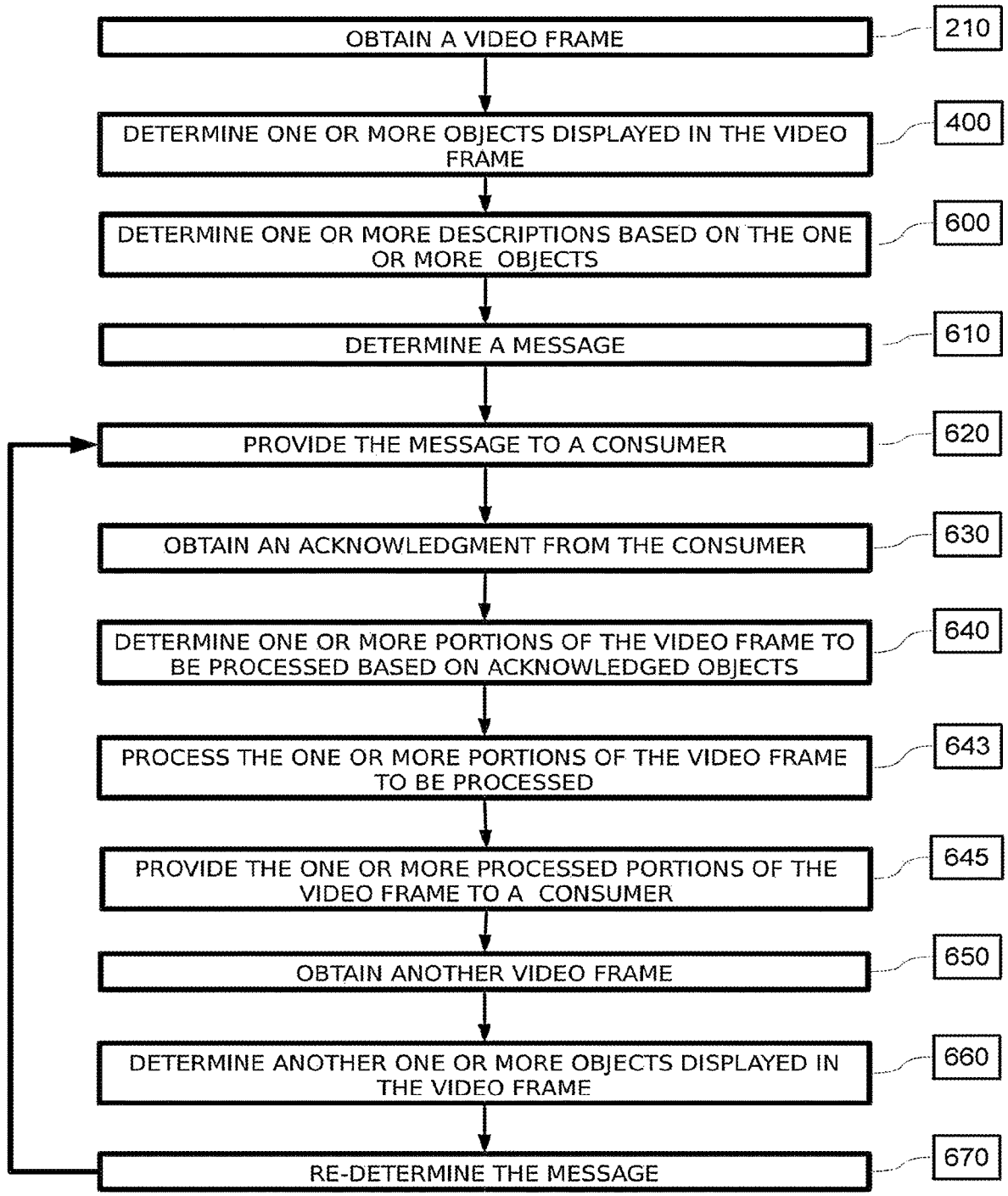

FIG. 7
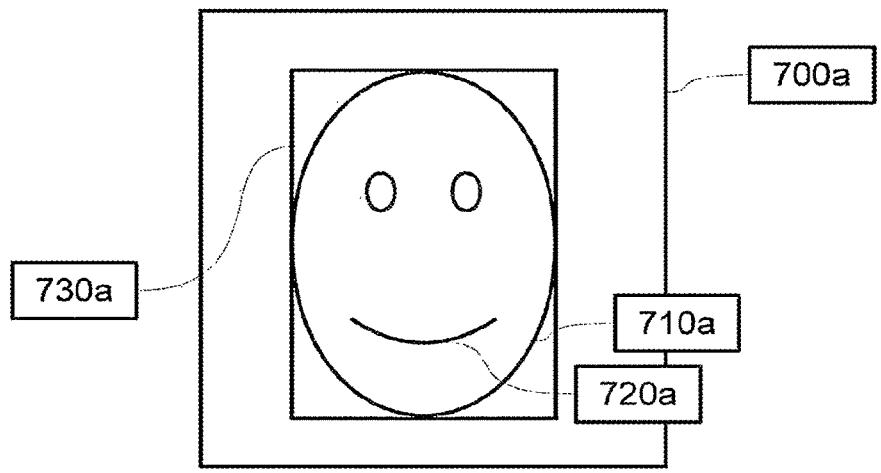
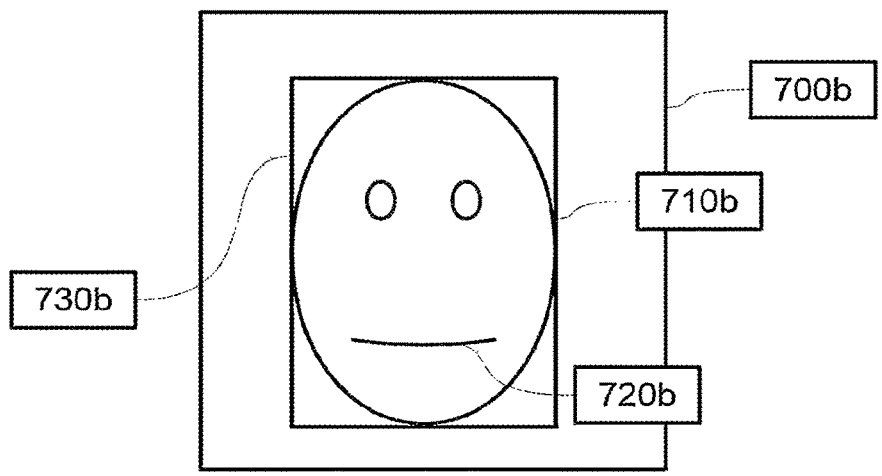
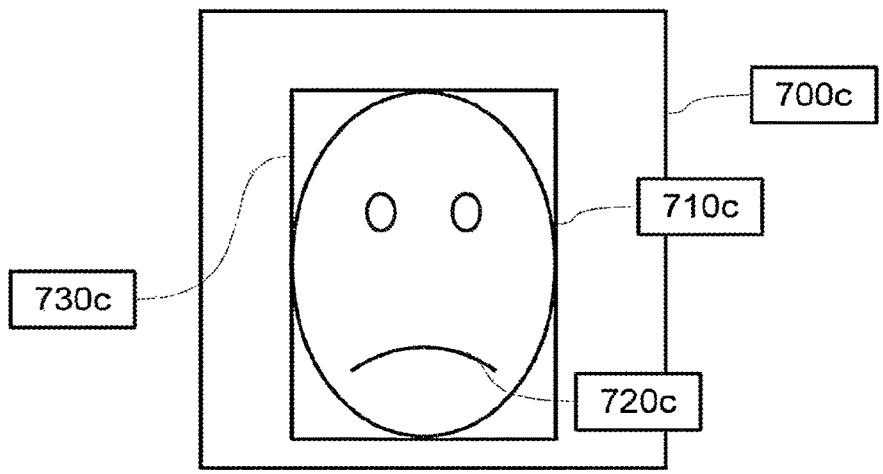

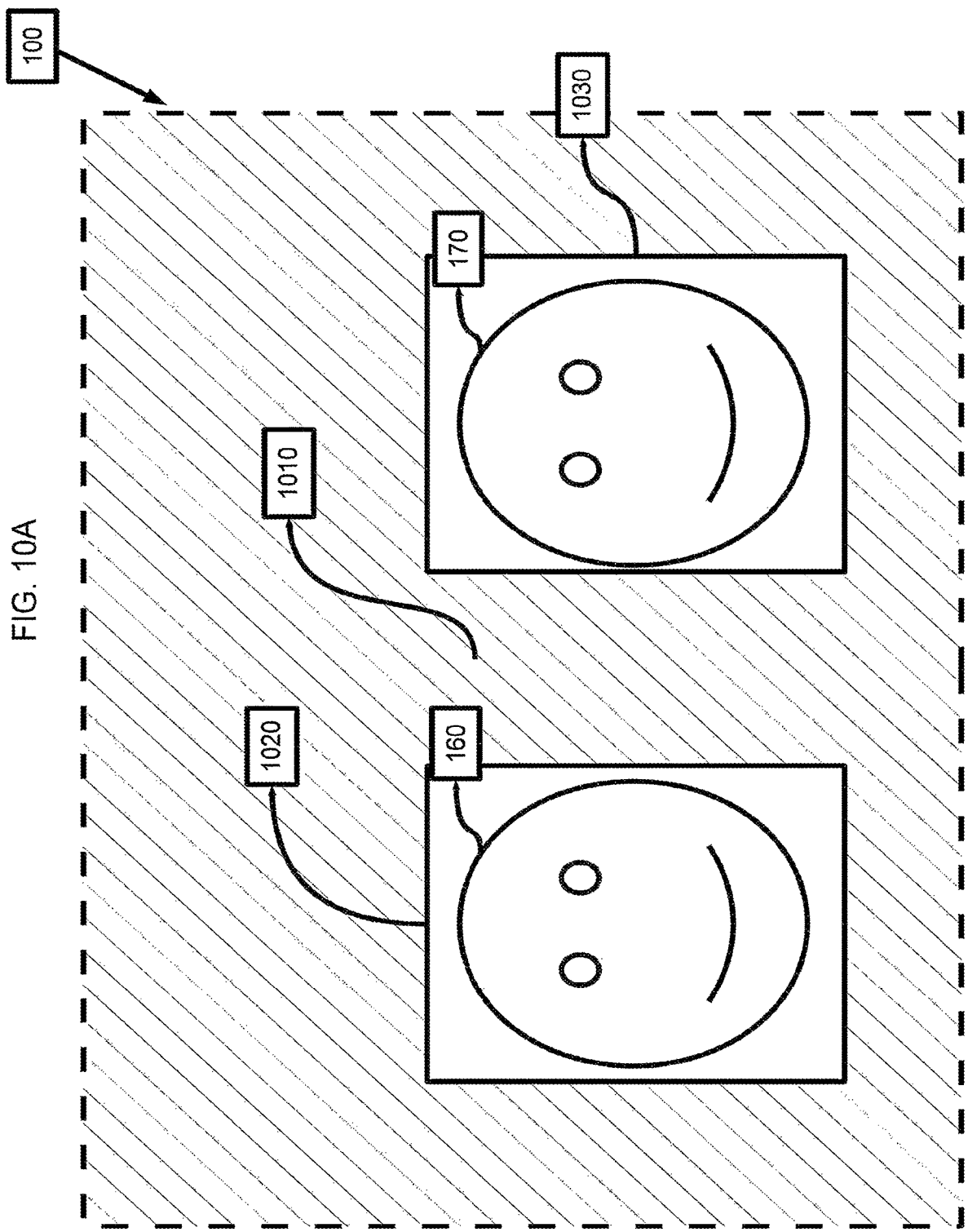

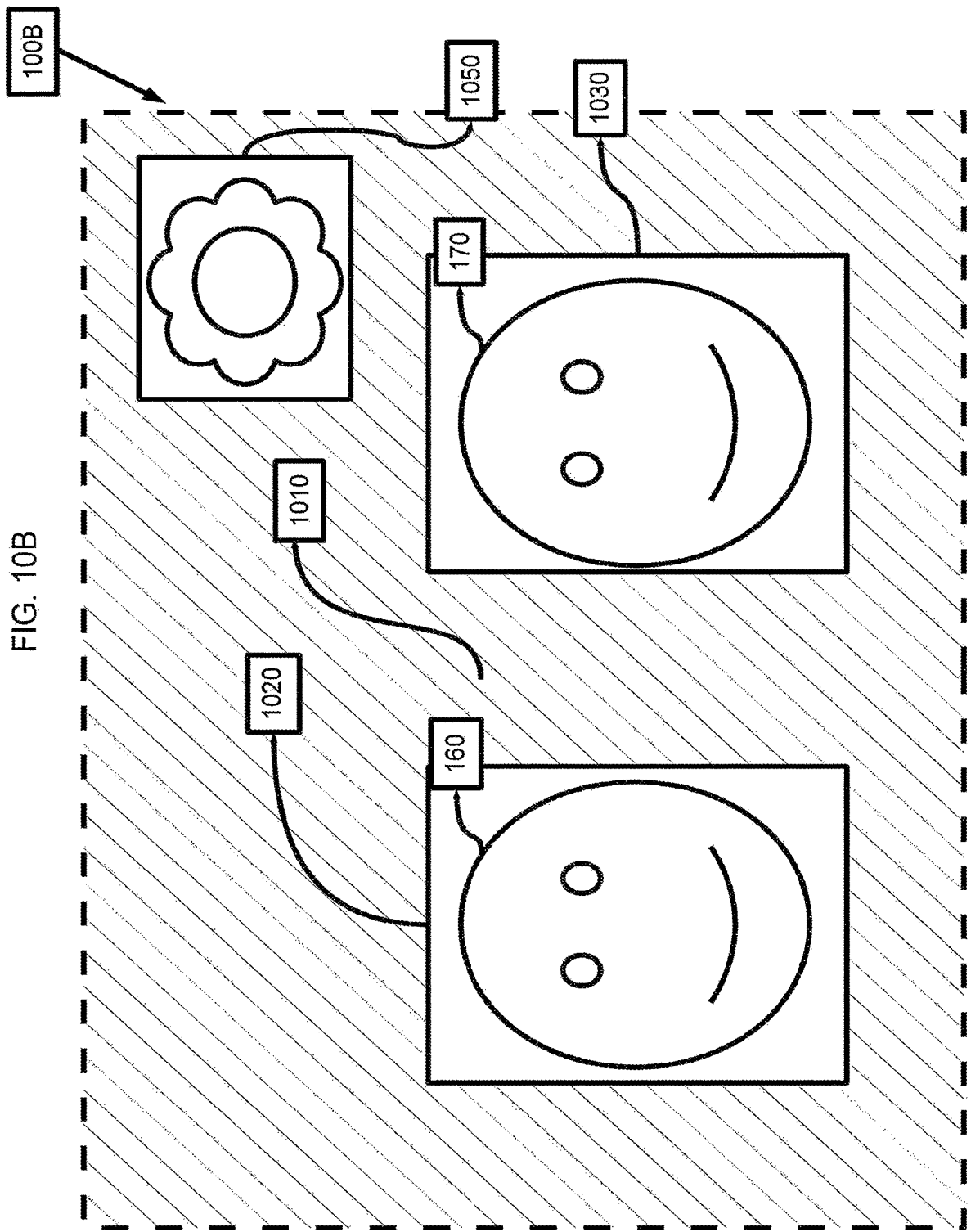

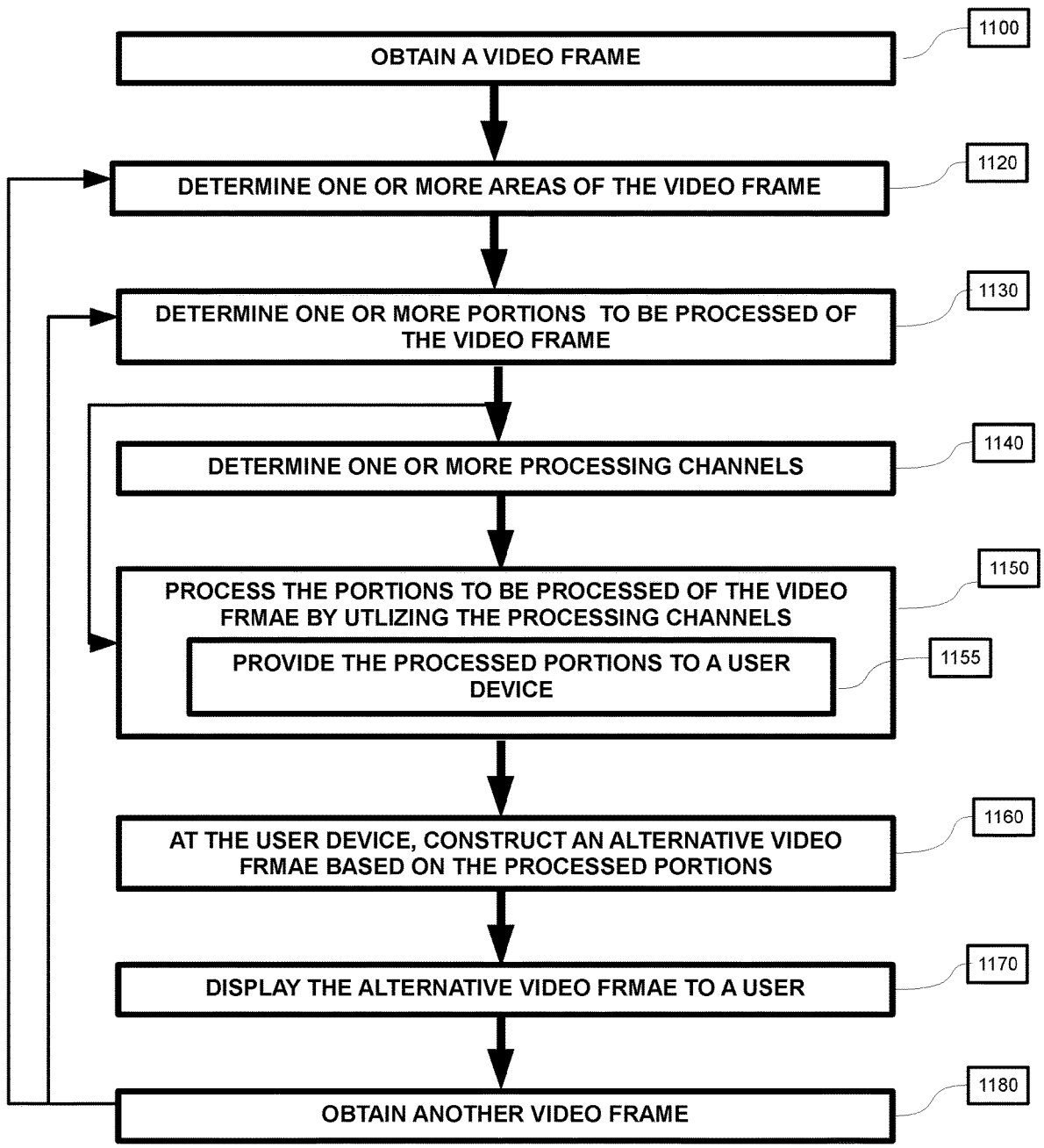

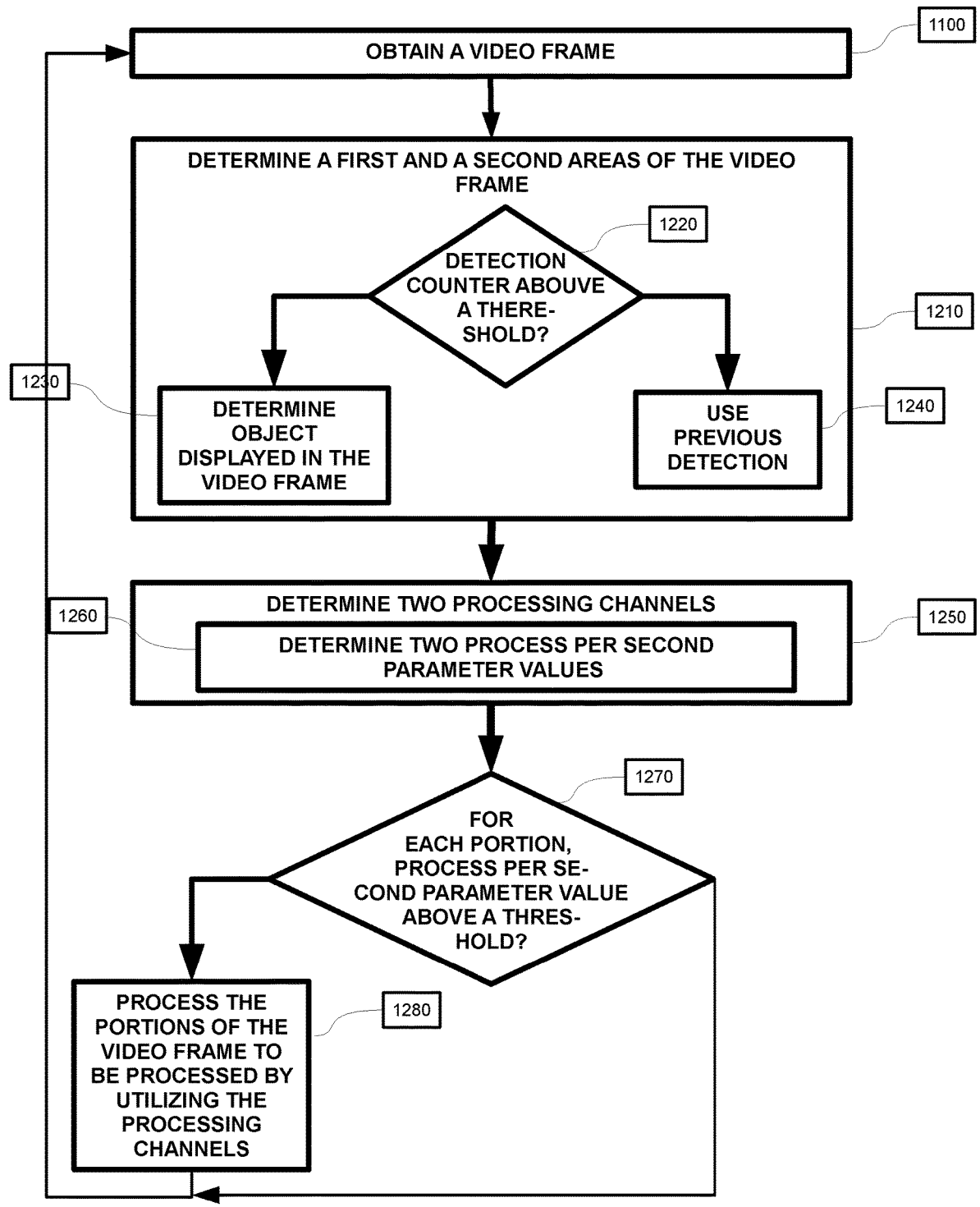

ND STREAMING

CROSS-REFERENCE TO RELATED APPLICATION

This application claims the benefit of provisional patent applications No. 63/070,103 filed Aug. 25, 2020, titled "EFFICIENT VIDEO ENCODING, DECODING AND STREAMING", which is hereby incorporated by reference in its entirety without giving rise to disavowment.

TECHNICAL FIELD

The present disclosure relates to video streaming in general, and to reducing video streaming bandwidth, in particular.

BACKGROUND

Media stream may be a multimedia that is constantly produced by a provider or by a producer and received by a consumer. The received media stream may be presented to an end-user while being delivered by the provider. The verb "to stream" may refer to the process of delivering or obtaining media in this manner; the term may refer to the delivery method of the medium, rather than the medium itself, and may be an alternative to file downloading, a process in which the consumer may obtain the entire file for the content before watching or listening to it.

A client end-user may use their media player to start playing digital video or digital audio content before the entire file has been transmitted. Distinguishing delivery method from the media distributed applies specifically to telecommunications networks, as most of the delivery systems are either inherently streaming (e.g. radio, television, streaming apps) or inherently non-streaming (e.g. books, video cassettes, audio CDs). For example, in the 1930s, elevator music was among the earliest popular music available as streaming media; nowadays Internet television is a common form of streamed media.

Live streaming may be the delivery of content in real-time such as live television broadcasts, online lectures, online meetings, or the like. Live internet streaming may require a form of source media (e.g. a video camera, an audio interface, screen capture software), an encoder to digitize the content, a media publisher, and a content delivery network to distribute and deliver the content. Live streaming does not need to be recorded at the origination point, although it frequently may.

BRIEF SUMMARY

One exemplary embodiment of the disclosed subject matter is a computing system comprising at least one processor; and at least one memory communicatively coupled to the at least one processor comprising computer-readable instructions that when executed by the at least one processor cause the computing system to perform a method comprising obtaining a video frame; determining one or more areas of interest in the video frame, wherein the one or more areas of interest in the video frame comprises at least a first area of interest in the video frame, wherein the first area of interest displays an image of a portion of an object; determining, based on the one or more areas of interest, one or more portions of the video frame, wherein the one or more portions of the video frame comprises at least a first portion, wherein the first portion is defined based on the first area of interest in the video frame, wherein the first portion of the video frame is a portion to be processed; determining, based on the one or more areas of interest of the video frame, one or more processing channels, wherein a processing channel comprises one or more processing actions, wherein a processing action comprised by the processing actions is associated with one or more processing action parameters; and processing the one or more portions by utilizing the one or more processing channels, whereby processing the first portion of the video frame by utilizing a first processing channel, wherein the first processing channel is comprised by the one or more processing channels, wherein processing the first portion of the video frame by utilizing the first processing channel comprises performing one or more processing actions comprised by the first processing channel, wherein processing the first portion of the video frame yields a first processed portion of the video frame; whereby an alternative video frame can be constructed based on the first processed portions of the video frame.

Optionally, the determination of the first portion comprises cropping the video frame, wherein cropping the video frame, when performed with respect to the first area yields a first cropped portion, whereby performing a processing action comprised by the first processing channel with respect to the first cropped portion.

Optionally, the determination of the first area of interest comprises performing a unification of a portion of the one or more areas of interest of the video frame, wherein the unification yields the first area of interest, whereby determining a non-interesting area of the video frame, wherein the non-interesting area is a complement of the first area of interest.

Optionally, the determination of the one or more portions of the video frame comprises determining to process the first area of interest and the non-interesting area, wherein the method comprises: setting the interesting area to a constant value, whereby determining a non-interesting portion, wherein the non-interesting portion is associated with the non-interesting area; and setting the non-interesting area to another constant value, whereby determining the portion, wherein the portion is associated with the interesting area.

Optionally, the determination of the one or more processing channels comprises determining one or more non-interesting processing channels, wherein a processing action comprised by a non-interesting channel is a non-interesting action, wherein the non-interesting action is associated with one or more non-interesting processing parameter.

Optionally, the determination of the non-interesting portion comprises shrinking the non-interesting portion.

Optionally, the determination of the non-interesting area of the video frame comprises a margin of the video frame.

Optionally, the processing action is a deflating action, wherein the method comprises: performing the deflating action with respect to the portion.

Optionally, the determination of the one or more areas of interest is based on one or more points of gaze of one or more users.

Optionally, the determination of the one or more areas of interest comprises: displaying, to a user, the video frame; obtaining, from the user, one or more locations of one or more points of the user to of the video frame; and determining, based on the one or more locations, the one or more areas of interest, wherein a user point comprised by the one or more points of the user is associated with an area of interest comprised by the video frame.

Optionally, the determination of the one or more areas of interest of the video frame comprises detecting one or more objects displayed in the video frame, wherein the first portion of the video frame is displaying a portion of an object comprised by the one or more objects.

Optionally, the video frame comprised by a sequence of video frames, wherein the sequence of video frames comprises at least the video frame and another video frame, wherein the first area of interest of the video frame is a first area of interest in the sequence of the video frames, wherein the video frame comprises a second area, wherein the other video frame is ordered after the video frame in the sequence of video frames, wherein the other video frame comprises at least the first area of interest and the second area; wherein the method further comprises: determining to process a second portion of the video frame, wherein the second portion of the video frame is defined based on the second area; processing the second portion of the video frame by utilizing a second processing channels, wherein the second processing channel comprised by the one or more processing channels, wherein processing the second portion of the video frame yields a second processed portion of the video frame; obtaining the other video frame; determining, based on the one or more areas in the video frame, one or more portions of the other video frame, wherein the one or more portions of the other video frame comprises a first other portion of the other video frame, wherein the first other portion is defined by the first area of interest, wherein a unification of the one or more portions of the other video frame is different than the other video frame; and processing the one or more portions of the other video frame by utilizing the one or more processing channels, whereby processing the first other portion of the other video frame by utilizing the first processing channel, wherein a major relative difference is a relative difference of the video frame, wherein a first minor relative difference is the relative difference of the first portion of the video frame to be processed, wherein a second minor relative difference is the relative difference of the second portion of the video frame to be processed, wherein a value of a sum function of the first minor relative difference and the second minor relative difference is smaller than the major relative difference; whereby an alternative other video frame can be constructed based on the one or more processed portions of the video frame and based on the one or more processed portions of the other video frame.

Optionally, the determination of the one or more portions of the other video frame comprises determining to exclude a second other portion from the portions of the other video frame to be processed, wherein the second other portion is defined by the second area.

Optionally, the determination of the one or more processing channels comprises determining one or more priority frame per second parameter values, wherein said determining to exclude the second other portion of the other video frame from the one or more portions of the other video frame is based on a second priority frame per second parameter, wherein the second priority frame per second parameter is smaller than a process per second parameter value, wherein the process per second parameter value is associated with the second portion of the video frame and with the second other portion of the other video frame, wherein the process per second parameter value is comprised by the one or more process per second parameter values.

Optionally the video frame comprised by a sequence of video frames, wherein the sequence of video frames comprises at least the video frame and another video frame, wherein the other video frame is ordered after the video frame in the sequence of video frames; wherein said determining the first area of interest comprises detecting one or more objects displayed in the video frame, wherein a same object is comprised by the one or more objects; wherein the method comprises: obtaining the other video frame; determining, based on the one or more areas of interest in the video frame, one or more portions of the other video frame to be processed, wherein determining the one or more portions of the other video frame comprises: determining a path of the same objects in the sequences of video frames; based on the path, determining another area of interest in the other video frame, wherein the same object is displayed in the other video frame, wherein the other area of interest is different than the first area of interest; determining to process another portion of the other video frame, wherein the other portion is defined by the other area of interest, whereby not detecting objects in the other video frame; and processing the one or more portions of the other video frame by utilizing the one or more processing channels; whereby an alternative other video frame can be constructed based on the one or more processed portions of the other video frame, whereby the alternative other video frame is displaying an alternative representation of the same object.

Optionally, wherein the video frame comprised by a sequence of video frames, wherein the sequence of video frames comprises at least the video frame and another video frame, wherein the other video frame is ordered after the video frame in the sequence of video frames; wherein said determining the first area of interest comprises detecting one or more objects displayed in the video frame, wherein a same object is comprised by the one or more objects; wherein the method comprises: obtaining the other video frame; determining, based on the one or more areas of interest in the video frame, one or more portions of the other video frame to be processed, wherein determining the one or more portions of the other video frame comprises: determining a path of the same objects in the sequences of video frames; based on the path, determining another area of interest in the other video frame, wherein the same object is displayed in the other video frame, wherein the other area of interest is different than the first area of interest; determining to process another portion of the other video frame, wherein the other portion is defined by the other area of interest, whereby not detecting objects in the other video frame; and processing the one or more portions of the other video frame by utilizing the one or more processing channels; whereby an alternative other video frame can be constructed based on the one or more processed portions of the other video frame, whereby the alternative other video frame is displaying an alternative representation of the same object.

Optionally, the determination of a portion comprised by the one or more portions comprises recursively performing the steps of the method, wherein the first portion of the video frame is the video frame.

Yet another exemplary embodiment of the disclosed subject matter is a method comprising obtaining a video frame; determining one or more areas of interest in the video frame, wherein the one or more areas of interest in the video frame comprises at least a first area of interest in the video frame, wherein the first area of interest displays an image of a portion of an object; determining, based on the one or more areas of interest, one or more portions of the video frame, wherein the one or more portions of the video frame comprises at least a first portion, wherein the first portion is defined based on the first area of interest in the video frame, wherein the first portion of the video frame is a portion to be processed; determining, based on the one or more areas of interest of the video frame, one or more processing channels, wherein a processing channel comprises one or more processing actions, wherein a processing action comprised by the processing actions is associated with one or more processing action parameters; and processing the one or more portions by utilizing the one or more processing channels, whereby processing the first portion of the video frame by utilizing a first processing channel, wherein the first processing channel is comprised by the one or more processing channels, wherein processing the first portion of the video frame by utilizing the first processing channel comprises performing one or more processing actions comprised by the first processing channel, wherein processing the first portion of the video frame yields a first processed portion of the video frame; whereby an alternative video frame can be constructed based on the first processed portions of the video frame.

Optionally, the video frame comprised by a sequence of video frames, wherein the sequence of video frames comprises at least the video frame and another video frame, wherein the first area of interest of the video frame is a first area of interest in the sequence of the video frames, wherein the video frame comprises a second area, wherein the other video frame is ordered after the video frame in the sequence of video frames, wherein the other video frame comprises at least the first area of interest and the second area; wherein the method further comprises: determining to process a second portion of the video frame, wherein the second portion of the video frame is defined based on the second area; processing the second portion of the video frame by utilizing a second processing channel, wherein the second processing channel comprised by the one or more processing channels, wherein processing the second portion of the video frame yields a second processed portion of the video frame; obtaining the other video frame; determining, based on the one or more areas in the video frame, one or more portions of the other video frame, wherein the one or more portions of the other video frame comprises a first other portion of the other video frame, wherein the first other portion is defined by the first area of interest, wherein a unification of the one or more portions of the other video frame is different than the other video frame; and processing the one or more portions of the other video frame by utilizing the one or more processing channels, whereby processing the first other portion of the other video frame by utilizing the first processing channel, wherein a major relative difference is a relative difference of the video frame, wherein a first minor relative difference is the relative difference of the first portion of the video frame to be processed, wherein a second minor relative difference is the relative difference of the second portion of the video frame to be processed, wherein a value of a sum function of the first minor relative difference and the second minor relative difference is smaller than the major relative difference; whereby an alternative other video frame can be constructed based on the one or more processed portions of the video frame and based on the one or more processed portions of the other video frame.

Yet another exemplary embodiment of the disclosed subject matter is an apparatus comprising a processor and a memory; wherein the memory is configured to retain one or more video frames, wherein a video frame comprised by the one or more video frames comprises at least a first area of interest in the video frame; wherein said processor is configured to: determining one or more areas of interest in the video frame, wherein the one or more areas of interest in the video frame comprises at least a first area of interest in the video frame, wherein the first area of interest displays an image of a portion of an object; determining, based on the one or more areas of interest, one or more portions of the video frame, wherein the one or more portions of the video frame comprises at least a first portion, wherein the first portion is defined based on the first area of interest in the video frame, wherein the first portion of the video frame is a portion to be processed; determining, based on the one or more areas of interest of the video frame, one or more processing channels, wherein a processing channel comprises one or more processing actions, wherein a processing action comprised by the processing actions is associated with one or more processing action parameters; and processing the one or more portions by utilizing the one or more processing channels, whereby processing the first portion of the video frame by utilizing a first processing channel, wherein the first processing channel is comprised by the one or more processing channels, wherein processing the first portion of the video frame by utilizing the first processing channel comprises performing one or more processing actions comprised by the first processing channel, wherein processing the first portion of the video frame yields a first processed portion of the video frame; whereby an alternative video frame can be constructed based on the first processed portions of the video frame.

Optionally, the one or more video frame are a sequence of video frames, wherein the video frame comprised by the sequence of video frames, wherein the sequence of video frames comprises at least the video frame and another video frame, wherein the first area of interest of the video frame is a first area of interest in the sequence of the video frames, wherein the video frame comprises a second area, wherein the other video frame is ordered after the video frame in the sequence of video frames, wherein the other video frame comprises at least the first area of interest and the second area; wherein said processor is further configured to: determining to process a second portion of the video frame, wherein the second portion of the video frame is defined based on the second area; processing the second portion of the video frame by utilizing a second processing channel, wherein the second processing channel comprised by the one or more processing channels, wherein processing the second portion of the video frame yields a second processed portion of the video frame; determining, based on the one or more areas in the video frame, one or more portions of the other video frame, wherein the one or more portions of the other video frame comprises a first other portion of the other video frame, wherein the first other portion is defined by the first area of interest, wherein a unification of the one or more portions of the other video frame is different than the other video frame; and processing the one or more portions of the other video frame by utilizing the one or more processing channels, whereby processing the first other portion of the other video frame by utilizing the first processing channel, wherein a major relative difference is a relative difference of the video frame, wherein a first minor relative difference is the relative difference of the first portion of the video frame to be processed, wherein a second minor relative difference is the relative difference of the second portion of the video frame to be processed, wherein a value of a sum function of the first minor relative difference and the second minor relative difference is smaller than the major relative difference; whereby an alternative other video frame can be constructed based on the one or more processed portions of the video frame and based on the one or more processed portions of the other video frame.

THE BRIEF DESCRIPTION OF THE SEVERAL VIEWS OF THE DRAWINGS

Figure 13:
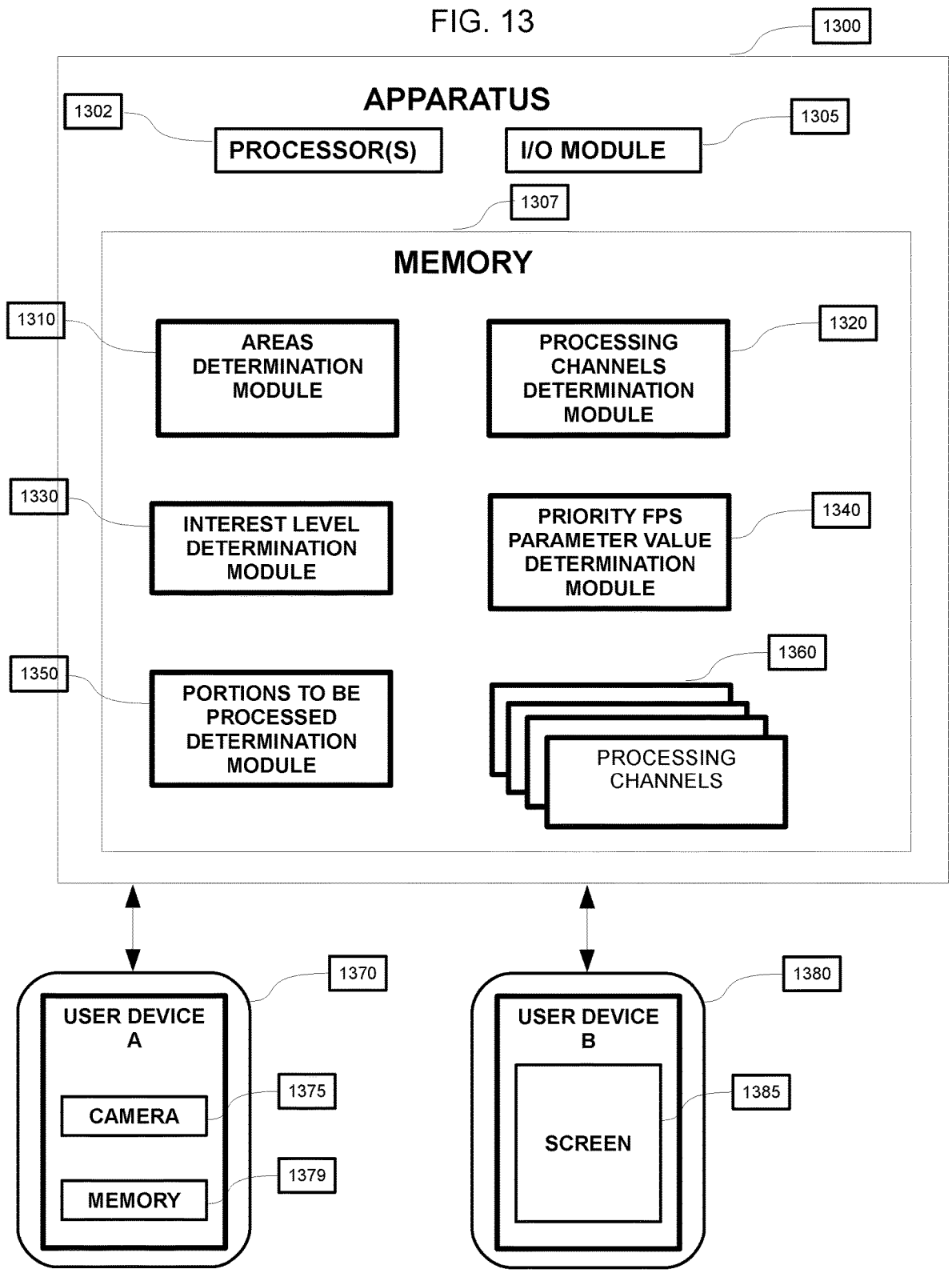

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 1, 7, 8, 9, 10A, and 10B show a schematic illustration of sequences of frames, in accordance with some exemplary embodiments of the disclosed subject matter;

FIGS. 2, 3A, 3B, 4, 5, 6, 11 and 12 show a flowchart diagram of a method, in accordance with some exemplary embodiments of the disclosed subject matter; and FIG. 13 shows a block diagram of an apparatus, in accordance with some exemplary embodiments of the disclosed subject matter.

DETAILED DESCRIPTION

One technical problem dealt with by the disclosed subject matter is to efficiently compress a video. Efficient compression may be useful for reduction of storage required to retain the video, bandwidth required to transmit the video, or the like. In some cases the video may be streamed to a consumer device. Different challenges may be faced when streaming content on the Internet, and specifically in live streaming. Devices with Internet connection lacking sufficient bandwidth may experience stops, lags, or slow buffering of the content. Additionally or alternatively, the connection may suffer from network latency, packet loss, or the like, causing delays in streaming. Devices lacking compatible hardware or software systems may be unable to stream certain content, may be unable to stream the content in a high quality, or the like.

Another technical problem dealt with the disclosed subject matter is to efficiently encode a video frame. In some exemplary embodiments, efficiently encoding a video frame may refer to compressing the video frame as much as possible while losing as little information as possible. In some exemplary embodiments, a Peak Signal-To-Noise Ratio (PSNR) measurement or a Mean Opinion Score (MOS) measurement may measure how much data was lost. Put differently, the PSNR or MOS may measure the difference between the video frame and the decoded encoded video frame.

In some exemplary embodiments, the video may be streamed from a server such as YouTube™, a Video on Demand (VOD) service, or the like. Additionally or alternatively, the video may be streamed from one consumer device to other end devices, such as from a first smartphone to another smartphone, a from a first user computing device to another, from one computing device to a plurality of computing devices, or the like. In some exemplary embodiments, the video may be streamed in a video chat such as Zoom™, Skype™, WebEx™, or the like. Additionally or alternatively, the video may be streamed in an online class, such as a Yoga class, an online lecture, or the like.

In some exemplary embodiments, in order to generate the video stream, a capturing device, such as a camera, a webcam, an infra-red camera, or the like, may be utilized. The capturing device may be integrated in a user device, such as a smartphone, a personal computer, a computing device, or the like. Additionally or alternatively the capturing device may be a camera observing an area, such as a street camera, a security camera, or the like. Additionally or alternatively the capturing device may be integrated in an Internet of Things (IoT) device, a satellite camera, or the like. The capturing device may be configured to output a sequence of frames.

In some exemplary embodiments, the video may be streamed to one or more end devices such as a laptop, a smartphone, a personal computer, or the like. Additionally or alternatively an end device may be a server, a satellite, or the like, that provides the video to one or more consumer devices.

Another technical problem dealt with by the disclosed subject matter is to reduce the amount of data that may be transmitted in a video stream, without affecting the quality or resolution of the transmitted video, in a manner that can be detected by the end user. In some cases, a video content may be available in several resolutions. A lower resolution may be utilized in case that there is insufficient bandwidth while a higher resolution may be utilized in case there is sufficient bandwidth. Videos with lower resolutions may be undesired by the users, as suffering from bad quality, or the like.

In some exemplary embodiments a video stream may be utilized in an online meeting, in an online lecture, or the like. In such embodiments, the background may not change. Additionally or alternatively, slides or electronic presentations may be displayed in the video, such as a lecturer displaying slides, or the like. The slides may change less frequently, such as every half a minute, every minute, or the like. It may be desired to stream only the changing portions of a frame.

Yet another technical problem dealt with by the disclosed subject matter is to provide a consistent streaming of a video for a consumer having a low download rate. A consistent streaming may refer to a streaming in which the download rate of the media is not larger than the play rate of the media. In those embodiments, a streaming provider may automatically detect the bandwidth available for the media consumer. The streaming provider may change a Frame Per Second (FPS) parameter of the media in order to assure that the streaming is consistent. Such change may affect the quality of the downloaded video.

Yet another technical problem dealt with by the disclosed subject matter is to reduce the amount of data that may be transmitted in a video stream. Such reduction may overcome Internet failures.

Yet another technical problem dealt with by the disclosed subject matter is to provide to a consumer a portion of the video frame that may have changed compared to a previous video frame. In some exemplary embodiments, a video stream may be utilized in an online meeting, in an online lecture, or the like. In those embodiments, the margin may not change, may change at a slower rate compared to a portion of the video frame displaying a participant in an online meeting, or the like. Additionally or alternatively, some portions of video frames comprised by the video stream may change more often compared to other portions of the video stream. As an example, the video stream may comprise two kittens. A first kitten may be asleep while a second kitten may be playing. Additionally or alternatively, in an online lecture, a lecturer may display slides. The slides may change every half a minute, every minute, or the like. It may be desired to stream only the changing portions of a video frame. Additionally or alternatively, it may be desired to stream the changing portion of the video stream more often compared to a non-changing portion of the video stream.

Yet another technical problem dealt with by the disclosed subject matter is to provide to a consumer information regarding one or more expected processed portions of the video frame. The information may comprise a size of an expected processed portion of the video frame, a shape of the expected portion of the video frame, information regarding an encoder that may be utilized in order to process the expected portion of the video frame, or the like. In some exemplary embodiments, a processed portion of the video frame may comprise an encoded portion of the video frame. Additionally or alternatively, the processed portion of the video frame may comprise a frame number, a size of the expected processed of the video frame, dimensions of the expected processed portion of the video frame, or the like. Additionally or alternatively, the expected portion of the video frame may comprise an RTP message payload. Additionally or alternatively, the expected processed portion of the video frame may comprise an RTP message.

In some exemplary embodiments, the producer may be configured to predict one or more characteristics of a future video frame. The future video frame may be the expected video frame. The characteristics may be a size of the video frame, dimensions of the video frame, a format of the video frame, or the like. In some exemplary embodiments, the producer may be configured to predict one or more portions of the video frame. An expected portion of the video frame may be comprised by the one or more predicted portions of the video frame. In some exemplary embodiments, the expected portion of the video frame may display an object. It may be desired to provide information regarding the object. In some exemplary embodiments, one or more objects displayed in the video frame may be streamed in different media channels. It may be desired to provide information regarding the location of an object comprised by the one or more objects in order to enable the consumer to determine a reconstructed video frame.

Yet another technical problem dealt with by the disclosed subject matter is to provide a consistent video stream for a consumer having a download rate below a threshold while maximizing a video Frame Per Second (FPS) rate of portions of the video stream. In some exemplary embodiments, a consistent video stream may refer to a video stream in which the download FPS rate of the media is not smaller than a required FPS play rate of the media. In some exemplary embodiments, it may be desired to provide a first portion of the video stream in one FPS rate and a second portion of the video stream in a second FPS rate. In those embodiments, the video stream may comprise a sequence of video frames. A portion of the video stream may refer to a sequence of portions of the video frames, wherein a portion of a video frame comprised by the sequence may display an image of an object, wherein another portion of another video frame comprised by the sequence may display another image of the object. A portion of the video stream may be yielded by one or more video frames comprised by the video stream. In some exemplary embodiments, a portion of the video stream may be a video stream that may be cropped out from the video stream. Put differently, a video frame comprised by the video stream may be cropped. The cropped video frame may be comprised the portion of the video stream. Additionally or alternatively, the first portion of the portion of the video stream may comprise one or more video frames, each of which may precede another video frame that may be comprised by the second portion of the portion of the video stream. Yet another technical problem dealt with by the disclosed subject matter is to find a minimal bounding shape of an object displayed by the video frame. As an example, the minimal bounding shape of a head of a person may be an ellipse while the minimal bounding shape of a body of a person may be a rectangle.

One technical solution is to determine one or more objects displayed in the video frame and to process a portion of the video frame that may be displaying a portion of an image of an object separately. In some exemplary embodiments, the video frame may be comprised by a video stream. In some exemplary embodiments, a computerized video stream producer may be configured to determine, based on the one or more objects, one or more bounding shapes, each of which may comprise an image of a portion of an object. Each bounding shape may be processed separately. In some exemplary embodiments, processing a bounding shape may comprise retaining the bounding shape one or more mediums, providing a portion of the video frame comprising the bounding shape to one or more consumers, or the like. In some exemplary embodiments, the bounding shape may be a minimal bounding shape. Determining the minimal bounding shape may decrease the needed bandwidth to provide the video frame, may decrease a needed amount of memory required to retain the bounding shape, or the like.

In some exemplary embodiments, a final operation may comprise providing the processed portion of the video frame to a consumer. In those embodiments, the processing channel may comprise information regarding a socket. The socket may be utilized in order to provide the processed portion of the video frame.

In some exemplary embodiments, the final operation with respect to the portion of the video frame may comprise retaining the processed portion of the video frame on a medium. In those embodiments, determining the processing channel may comprise determining a file descriptor. The file descriptor may be utilized in order to retain the processed portion of the video frame. In those embodiments, one or more file descriptor parameters may be determined.

In some exemplary embodiments the video frame may display one or more images of one or more objects. An object may be a person, a dog, a car, a flower, or the like. Additionally or alternatively, the video frame may comprise a margin. In those embodiments, a margin frame displaying the margin may be determined based on the one or more objects. In those embodiments, an area of interest may comprise a unification of portions of the video frame displaying one or more objects. The margin of the video frame may be determined by subtracting the area of interest from the video frame.

In some exemplary embodiments, one or more images of the one or more objects may be provided to a consumer by utilizing one or more processing channels. Additionally or alternatively, the margin may be provided to a consumer by utilizing another processing channel. Additionally or alternatively, the one or more final operations may be performed by utilizing the one or more processing channels. In those embodiments, a processing channel may be associated with a computerized process, with a socket, with a file descriptor, with an encoder, with a computerized process parameter with a socket parameter, with an encoder parameter, or the like. In those embodiments, the one or more processing channels may be determined based on the one or more objects or based on the margin of the video frame. In those embodiments, utilizing the processing channel may comprise processing the portion of the video frame in the computerized process, utilizing the socket for providing the encoded portion of the video frame, utilizing the file descriptor for retaining the encoded portion of the video frame, encoding the portion of the video frame by utilizing the encoder, applying the computerized process parameter on the computerized process, applying the socket parameter on the socket, applying the encoder parameter on the encoder, or the like. In that manner, in case that the video frame is displaying one or more images of one or more objects, each portion of the video frame displaying a different image may be encoded or provided by utilizing a different processing channel.

In some exemplary embodiments, it may be determined to determine a margin of the video frame or to process the margin of the video frame. In those embodiments, another processing channel may be determined for the encoding or providing margin of the video frame.

In some exemplary embodiments, there may be two or more consumers. In those embodiments, each processing channel may comprise two one or more sockets. Each socket may be associated with a consumer.

As an example, in case that the video stream is displaying an online lecture, the object may be a lecturer. The video stream may comprise one or more video frames. The producer may be configured to provide one or more portions of the video frames comprising the margin of the video frame by utilizing a processing channel and one or more portions of the video frames comprising an image of the lecturer by utilizing another different processing channel.

In some exemplary embodiments, an interest level may be obtained. The interest level may be associated with an object. Additionally or alternatively, an activity level may be determined. The activity level may be associated with the object. In some exemplary embodiments, the interest level may be determined based on an input of a user, based on a context information, or the like.

In some exemplary embodiments, the producer may be configured to determine whether to process an object based on the associated interest level. Processing an object may refer to processing one or more portions of one or more video frames, wherein each portion may display a portion of the object. In those embodiments, a video frame may be obtained periodically. The producer may be configured to detect objects displayed by a portion of the video frame. Additionally or alternatively, the producer may be configured to process a portion of the video frame displaying an object having an interest level above a threshold. Additionally or alternatively, the producer may be configured not to process a portion of the video frame displaying another object that may be associated with another interest level below the threshold. Additionally or alternatively, the producer may be configured to periodically not process a portion of a video frame displaying the other object. In some exemplary embodiments, one or more interest thresholds may be obtained. Each object may be associated with an interest threshold. The producer may be configured to process a portion of the frame that may be associated with an object, wherein the object is associated with an interest level that may be above an interest threshold.

In some exemplary embodiments, an activity level may be obtained. The activity level may be associated with a portion of the video frame, with an object displayed by the video frame, or the like. Additionally or alternatively, an activity level may be determined. In some exemplary embodiments, the activity level may be determined based on a sequences of video frames. Each video frame comprised by the sequence of video frames may comprise an image of a portion of the object. Put differently, the sequence of video frames may comprise a set of sequences of different objects. As may be exemplified in FIG. 7, in which the sequence of video frames comprises three images of a same object.

In some exemplary embodiments, for each object or for each sequence, an activity level may be determined. As may be exemplified by FIG. 7, the activity level may be a difference between Bounding Shape 730*b* and Bounding Shape 730*a*. As another example, the sequence of video frames may comprise a first sequence of images of a first person and a second sequence of images of a second person. The first person may talk and move while a second person may sit still. In that example, the first person may be associated with a first activity level and the second person may be associated with a second activity level. The first activity level may be higher than the second activity level.

In some exemplary embodiments, an activity level of an object may be determined based on a statistical difference between bounding shapes comprising the sequence of images of the object. Additionally or alternatively, the activity level may be determined based on a sequence of minimal bounding shapes, each of which comprises an image of the object.

In some exemplary embodiments, determining the one or more processing channels may be based on one or more activity levels. A first processing channel may be associated with a first object. Additionally or alternatively, a second processing channel may be associated with a second object. The first object may be associated with a first activity level that may be higher than a second activity level associated with the second object. The producer may be configured to process the first object faster than the second object. In some exemplary embodiments, a first processing channel may be associated with a first computerized process. Additionally or alternatively, a second processing channel may be associated with a second computerized process. Additionally or alternatively, the first object may be processed in the first computerized process. Additionally or alternatively, the second object may be processed in the second computerized process. Additionally or alternatively, the first computerized process may be associated with a first priority. Additionally or alternatively, the second computerized process may be associated with a second priority. Additionally or alternatively, the first priority may be larger than the second priority, yielding that the first object may be processed faster than the second object.

In some exemplary embodiments, the first processing channel may be associated with a first encoder. Additionally or alternatively, the second processing channel may be associated with a second encoder. The first encoder may be configured to encode a portion of the video frame faster than the second encoder. Additionally or alternatively, the first processing channel may be associated with a first socket. Additionally or alternatively, the second processing channel may be associated with a second socket. Additionally or alternatively, the first socket may be configured to provide the portion of the video frame faster than the second socket.

In some exemplary embodiments, the producer may be configured to provide to a consumer a priority information regarding an object that may be processed faster. The consumer may be configured, on obtaining the priority information, to change one or more parameters associated with the object in order to enable such fast processing. As an example, a separate computerized process may be allocated for obtaining or for decoding the video frames displaying images of the object. The separate computerized process may be associated with a higher priority than a computerized process that is not configured to obtain and decode the object. As another example, a socket may be configured to obtain one or more video frames associated with the object. A consumer may be configured to use a socket parameter such as SO_REUSEPORT, or the like, for the socket. Additionally or alternatively, the producer or the consumer may be configured to increase a buffer size that may be associated with the socket. In some exemplary embodiments, the producer may be configured to determine an encoder to be utilized in a first processing channel and to determine another encoder to be utilized in another processing channel.

In some exemplary embodiments, the producer may be configured to provide to the consumer a priority information in an INVITE message, in a RE-INVITE message, or the like.

In some exemplary embodiments, the consumer may be configured to fast process an object having an activity level above a threshold. Additionally or alternatively, the producer may be configured to slow process an object having an activity level below the threshold. In those embodiments, slow process an object may comprise reducing a priority associated with a computerized process in which a portion of the video frame comprising an image of the object is encoded, provided to a consumer, or the like. Additionally or alternatively, fast process an object may comprise increasing the priority.

In some exemplary embodiments, the producer may be configured to process a first portion of the video frame to be processed and a second portion of the video frame to be processed by utilizing a same processing channel. The first portion of the video frame to be processed and the second portion of the video frame to be processed may have similar priorities, similar activity levels, similar interest levels, or the like. The first and second priorities may be similar in case that a difference between the first priority and the second priority is below a threshold. Additionally or alternatively, the first activity level and the second activity level may be similar in case that a difference between the first activity level and the second activity level is below a threshold. Additionally or alternatively, the first interest level and the second interest level may be similar in case that a difference between the first interest level and the second interest level is below a threshold. Additionally or alternatively, the first portion of the video frame to be processed may display a first portion of the margin of the video frame and the second portion of the video frame to be processed may display a second portion of the margin of the video frame.

In some exemplary embodiments, a background of the video stream may appear as if it is changing due to an object that may be moving. The producer may periodically transmit the video frame to the consumer, the encoded video frame, or the like. By periodically obtaining the entire video frame, the consumer may be able to reconstruct the video frame and maintain the image of the object with the background.

In some exemplary embodiments, a first portion of the video frame may be provided in a first media channel and a second portion of the video frame may be provided in a second media channel. As an explanation by example of a media channel, Alice and Bob may conduct a video chat. In that case, there may be six media channels: A first media channel for transmitting Alice's audio, a second media channel for transmitting Alice's face, a third media channel for transmitting margins of one or more video frames originated by Alice's camera, a fourth media channel for transmitting Bob's audio, a fifth media channel for transmitting Bob's face and a sixth media channel for transmitting margins of one or more video frames originated by Bob's camera.

In some exemplary embodiments, a media channel may utilize User Datagram Protocol (UDP). UDP may provide better throughput compared to other protocols. However, a packet may be lost, may arrive out of order, or the like. In those embodiments, the consumer may be configured to determine a reconstructed video frame based on a previous packet obtained in the channel. In some exemplary embodiments, the object may be associated with an activity level that is below a threshold, the difference in size and position of the object within the video frame and the previous video frame may not be noticeable to a human eye.

In some exemplary embodiments, it may be desired to provide to the consumer a description of a processed portion of the video frame. The description may comprise the shape of the processed portion of the video frame (e.g. rectangle, eclipse), an activity level associated with one or more objects displayed in the portion, a position of the processed portion of the video frame within the video frame, or the like. In those embodiments, another providing channel between the producer and the consumer may be allocated. The producer may be configured to provide the description in the other channel. In some exemplary embodiments, the description of each encoded portion of the video frame may be provided with a video frame number, allowing the consumer to synchronize the description with an encoded video frame received on another channel. In some exemplary embodiments, a portion of the description may be sent periodically, upon a change, or the like.

In some exemplary embodiments, a media protocol, such as Real Time Protocol (RTP) may be utilized. RTP may provide a channel for transmitting packets comprising media. An RTP packet may comprise a header and a payload. In some exemplary embodiments, the header may comprise the description of a processed portion of the video frame. Additionally or alternatively, the payload may comprise the video frame, an encoded video frame, an encoded portion of the video frame to be processed, a portion of the video frame, or the like.

In some exemplary embodiments, an RTP instance may be associated with a processing channel. In those embodiments, determining the one or more processing channels may comprised determining one or more RTP instances.

In some exemplary embodiments, a context information may be obtained. The context information may comprise information regarding hardware capabilities of a computerized device that may be configured to execute the one or more instances of the producer. In those embodiments, the context information may comprise information regarding one or more CPUs utilized by the computerized device, information regarding Random Access Memory (RAM) that may be utilized by the computerized device, a load that may be associated with the computerized device, or the like.

In some exemplary embodiments, obtaining the context information may comprise obtaining one or more consumer context information from the one or more consumers. In those embodiments, a context information obtained from a consumer may comprise a target screen description. The consumer may be configured to obtain an encoded frame, decode the encoded frame and display it to a user by utilizing a rendering device such as a target screen. The target screen may be associated with a size, such as width, height, or the like. Additionally or alternatively, the target screen may be associated with a DPI information, number of colors information, or the like. The producer may be configured to encode the frame based on the target screen information. As an example, in case that the capturing device is configured to produce a 1600×1400 frame, and in case that the target screen is of size 320×240, the video frame may be resized, the resized frame may be encoded, or the like.

Detecting an object displayed in the video frame may utilize an object detection algorithm such as Single Shot MultiBox Detector, R-FCN (Object Detection via Region-based Fully Convolutional Networks), or the like. In some exemplary embodiments, a specific detection algorithm may be utilized. A specific detection algorithm may be an algorithm configured for detection of a specific type of an object such as a face, a dog, a car, or the like. It may be noticed that in those embodiments, a face detection algorithm may be an algorithm configured to detect a face without associating the face to a person. In some exemplary embodiments, a specific detection algorithm may be selected based on a context information associated with the video stream. As an example, in case that the context information comprises an "online meeting" string, the producer may be configured to select a face detection algorithm. Additionally or alternatively, in case that the context information comprises a "birds in nature" string, the producer may be configured to select a bird detection algorithm.

In some exemplary embodiments, utilizing an object detection algorithm may yield one or more minimal bounding shapes. As an example, in case that the algorithm is a face detection algorithm, the face detection algorithm may yield a minimal bounding shape displaying a face. The minimal bounding shape may display a person's face. Additionally or alternatively, the person's forehead, the person's hair, the person's neck, the person's shoulders, or the like may not be displayed in the minimal bounding shape. In those embodiments, a bounding shape may be determined based on the minimal bounding. The bounding shape may display the person's forehead, the person's hair, the person's shoulders, the person's neck, or the like.

In some exemplary embodiments, a face detection algorithm configured to detect a face and associate the face with a person may be determined and utilized. The producer may be configured to determine an interest level of an object based on the face detection algorithm. As an example, the video stream may display images of a famous movie star in a crowd of people. The famous movie star may be more interesting to a user than a person in the crowd of people. Additionally or alternatively, one or more users watching the video stream may wish to see images of the famous movie star in high definition. The producer may be configured to determine objects displayed in the video frame. Additionally or alternatively, the producer may be configured to associate an object comprising images of the movie star with an interest level that may be higher compared to another interest level associated with another object. As a result, by utilizing the disclosed subject matter, images of the famous movie star may be processed separately and better than other images. Additionally or alternatively, portions of video frames displaying the images of the famous movie star may be encoded in a first processing channel. Additionally or alternatively, other portions of video frames may be encoded in one or more other processing channels.

In some exemplary embodiments, the object detection algorithm may be configured to accept a specific type of input. The specific type of input may be Red Green Blue (RGB), Red Blue Green, a gray scale of the video frame, or the like. In those embodiments, the video frame may be transformed to the specific type of input.

In some exemplary embodiments, a Machine Learning (ML) algorithm may be trained based on raw video data. Training the ML algorithm based on raw video may yield better performance as there may not be a need to transform the video frame to another format. In some exemplary embodiments, the raw video may be represented in a YUV format, or the like. A raw video format may comprise different channels for different types of colors, of gray, of light, or the like. The ML algorithm may be trained based on one channel. Training the algorithm based on one channel may yield faster training time compared to an algorithm that is configured to work on an input comprising all channels. Additionally or alternatively, detecting an object comprised by a video frame may be performed faster by an algorithm that is configured to work on one YUV channel compared to an algorithm that is configured to work on an entire video frame comprising all YUV channels.

In some cases, more than one object may be displayed by the video frame. In those embodiments, for each object, a media channel comprised by the media stream may be allocated. As an example, Charlie may join an ongoing video chat held by Alice and Bob. Two more media channels may be allocated for transmitting Charlie's audio and video. In a SIP based video chat, in order to add Charlie to the video chat, a SIP REINVITE message may be transmitted to Alice. The RE-INVITE message may comprise two SDP sections: one for Charlie's audio and another for Charlie's video. Similarly, in some exemplary embodiments, each object may be processed as a media source. In case that another object is detected while streaming, a RE-INVITE message may be provided to a consumer. Put differently, a first sequence of video frames comprised by the video stream, may display a first object. Additionally or alternatively, a second sequence of the video frames comprised by the video stream may display the first object or a second object. The producer may be configured to generate, upon detection of the second object, an SDP message comprising a first media offer for the first object or a second media offer for the second object. A SIP RE-INVITE message comprising the SDP message may be provided to a consumer of the video stream. A first video frame may be comprised by the first sequence of video frames. The producer may be configured to determine a portion of the video frame to be processed displaying the first object. Additionally or alternatively, the producer may be configured to process the first portion by utilizing a first processing channel. Additionally or alternatively, a second video frame may be comprised by the second sequence of video frames. The producer may be configured to determine a first-other portion of the other video frame to be processed displaying the first object. Additionally or alternatively, the producer may be configured to determine a second-other portion of the other video frame to be processed displaying the second object. Additionally or alternatively, the producer may be configured to process the first other portion of the other video frame to be processed by utilizing the first processing channel. Additionally or alternatively, the producer may be configured to process the second-other portion of the other video frame to be processed in a second processing channel.

In some exemplary embodiments, a consumer may be configured to determine a reconstructed video frame. The consumer may obtain a plurality of processed portions of the video frame, each of which may represent one or more objects. The consumer may reconstruct the video frame based on the description that may be provided. In some exemplary embodiments, the consumer may be configured to decode each portion of the video frame or to determine the reconstructed video frame based on the decoded portions of the video frame. In some exemplary embodiments, different portions of the video frame may be associated with a different frame per seconds parameter. As an example, a first portion of the video frame may be associated with a 30 fps parameter and a second portion of the video frame may be associated with a 5 fps parameter. In that case, at time 0, the video stream may comprise the first portion of the video frame and the second portion of the video frame. At times 1, 2, 3, 4 and 5, the video stream may not comprise the second portion of the video frame. The consumer may utilize the second portion of the video frame received at time 0 for reconstructing the video frame at times 1 through 5.

In some exemplary embodiments, a path of an object within a sequence of video frames may be determined. Another frame may be obtained and portions of the other video frame to be processed may be determined based on the previously detected objects and based on the path instead of re-detecting objects that may be displayed in the other video frame. As an example, a person may be moving from one side of a room to the other side. In those embodiments, a path of the person may be determined and portions of the other video frame may be determined based on a prediction of the person's location.

In some exemplary embodiments, one or more portions of the video frame may be determined. In some exemplary embodiments, the number of the portions may be a predetermined number of portions. As an example, in case that the video frame is comprised by a video stream displaying an online movie, the portions may be determined while editing the movie. Additionally or alternatively, in case of an online lecture, a portion of the video frame may be determined based on one or more video frames. In some exemplary embodiments, for each portion it may be determined if the portion is to be processed. In some exemplary embodiments, for each portion, an interest level may be obtained. Additionally or alternatively, for each portion, an activity levels may be obtained. Determining whether to process a portion may be based on the interest level, on the activity level, or the like. A portion may be processed in case that the activity level is above a threshold, in case that the interest level is above a threshold, or the like. Additionally or alternatively, a first portion may be processed in a first processing channel and a second portion may be processed in a second processing channel. Additionally or alternatively, for each portion, one or more objects displayed in the portion may be detected. Additionally or alternatively, a portion displaying a portion of an image of an object may be processed faster than another portion not displaying a portion of any images of any object. Additionally or alternatively, a first object may be associated with a first activity level and a second object may be associated with a second activity level.

Additionally or alternatively, the first activity level may be higher than the second activity level. A portion displaying an image of a portion of the first object may be processed faster than another portion displaying an image of a portion of the second object.

Yet another technical solution is to determine one or more areas of interest comprised by the video frame based on an input of a user. Additionally or alternatively, one or more interest levels may be determined based on an input from a user. The producer may be configured to obtain one or more video frames and to display the one or more video frames to a user. The user may point the screen in a location in order to provide input regarding an area of interest. The user may point the screen by touching the screen, by utilizing a mouth, or the like. Based on the location of the point of the user, an area of interest may be determined. In some exemplary embodiments, determining the area of interest may comprise detecting an object displayed in the location of the point. Based on the area of interest a portion of the video frame may be determined. The portion of the video frame may be associated with an interest level that may be higher than another interest level associated with another portion of the video frame. The portion of the video frame may be processed. In some exemplary embodiments, another video frame may be obtained and processed based on the location of the portion of the video frame. A portion of the other video frame displaying the object may be processed faster, processed better, or the like, compared to the other portions of the other video frame. In some exemplary embodiments, the user may double tap the screen in order to determine another area of interest. In some exemplary embodiments, the other area of interest may be associated with another interest level. The other interest level may be lower than the interest level. Additionally or alternatively, the other interest level may be higher than an additional interest level associated with an additional portion of the video frame. In some exemplary embodiments, the producer may periodically obtain a video frame and process the video frame based on one or more points of the user. In some exemplary embodiments, the user may be utilizing a consumer. In those embodiments, the producer may provide one or more video frames to a consumer. Additionally or alternatively, the consumer may be configured to provide the one or more video frames to a rendering device to be displayed to a user. The user may point the screen. The location of the point of the user may be provided to the producer. As an example, the disclosed subject matter may be utilized by a camera application. The camera application may be configured to generate a video frame and to retain the video frame on a medium, to attach the video frame to a message, or the like. By utilizing the disclosed subject matter, less bits may be required to retain an output video frame compared to a video frame taken by another camera application, not utilizing the disclosed subject matter. In some exemplary embodiments, the camera application may be configured to generate an output video frame encoded by a standard encoder, in a format such as TIFF, PNG, or the like. The camera application may be configured to merge the one or more processed portions of the video frame to a merged video frame. The merged video frame may comprise values in RGB format, in a YUV format, or the like. Additionally or alternatively, the merged video frame may be encoded by a standard encoder in order to produce the output video frame. In some exemplary embodiments, the consumer may be configured to obtain a processed portion of the video frame or to decode the processed portion of the video frame to a decoded portion. Additionally or alternatively, the consumer may be configured to provide the decoded portion to the rendering device. In some exemplary embodiments, the producer may be configured to utilize a first format for encoding a first portion of the video frame and a second format for encoding a second portion of the video frame. As an example, in case that the video frame is displaying an image of a person, a first portion of the video frame displaying the image of the person may be decoded in a TIFF format and a second portion of the video frame displaying the margins of the video frame may be decoded in a PNG format. In those embodiments, encoding a portion of the video frame in TIFF format may result in a larger encoded portion of the video frame compared to decoding in a PNG format. Additionally or alternatively, TIFF format may provide better quality compared to PNG format. Additionally or alternatively, only the portion of the video frame displaying the object may be encoded in TIFF format yielding a smaller encoded video frame compared to encoding the entire video frame in TIFF format.

In some exemplary embodiments, determining the one or more portions of the video frame to be processed may comprise determining one or more sets of portions of the video frame. In those embodiments, a set of portions comprised by the one or more sets may be a portion of the video frame to be processed. In some exemplary embodiments, determining the set may comprise determining portions of the video frame. Additionally or alternatively, one or more priorities may be obtained. Additionally or alternatively, a priority may be associated with a portion of the video frame. In those embodiments, the set may comprise a first portion of the video frame and a second portion of the video frame. The first portion of the video frame may be associated with a first priority or the second portion of the video frame may be associated with a second priority. In those embodiments, a difference between the first priority and the second priority may be below a threshold. As an example, the first priority may be 5, the second priority may be 6, the threshold may be 1.1. Hence, the first portion may be comprised by the set or the second portion may be comprised by the set. Additionally or alternatively, a third portion of the video frame may be associated with a third priority or a fourth portion of the video frame may be associated with a fourth priority. The third priority may be 8 or the fourth priority may be 8.5. In that example, another set may comprise the third portion of the video frame or the fourth portion of the video frame. In some exemplary embodiments, a portion of the video frame may be determined based on an object displayed thereby, based on an area of activity, or the like. In some exemplary embodiments, an area of low priority may be determined. The area of low priority may not display an object, may not comprise an area of activity, or the like. In those embodiments, the area of low priority may be determined by determining a unification over the one or more portion of the video frame. Additionally or alternatively, the unification may be subtracted from the video frame. The area of low priority may be a difference between the video frame and the unification. In some exemplary embodiments, the area of low priority may be another portion of the video frame to be processed.

In some exemplary embodiments, processing a portion of the video frame to be processed may comprise processing a set of portions of the video frame. In those embodiments, processing the set may comprise determining an area of the video frame. The area may be a unification of the other sets comprised by the one or more sets. Additionally or alternatively, a modified video frame may be determined by setting the area to a color, to a value, or the like. In those embodiments, the modified video frame may be encoded, may be provided, may be retrained, or the like. In some exemplary embodiments, the modified video frame may be resized to a smaller video frame. The smaller video frame may be encoded, provided, retained, or the like. In some exemplary embodiments, determining a smaller size of the modified video frame may be based on the one or more priorities. As an example, in case that the set is associated with a priority of 8, the video frame may be resized by a factor of 0.9. Additionally or alternatively, in case that the priority is 5, the modified video frame may be resized by a factor of 0.7. Additionally or alternatively, in case that the portion of the video frame to be processed is the area of low priority, the modified video frame may be resized by a factor of 0.1.

One technical effect of utilizing the disclosed subject matter is reducing the resources and bandwidth utilization required for video streaming in general and in live streaming particularly, without massively affecting the quality of the viewer's experience. As the cropped frames provided to the end device comprise the objects of interest, changes and motions of such objects may continuously be streamed to the end device without being affected. The portions that are excluded from the cropped frame may relate to elements that are static, unchanged, irrelevant to the context of the video, and thus even if affected, such affection may not be detected by the end user.

In some cases, the disclosed subject matter may be utilized to generate an alternative video to be retained locally or transmitted after being constructed, so as to reduce required bandwidth or storage. In some cases, encoders may use data from other frames to decompress the video, such as p-frames, b-frames, or the like. Hence, the fact that the alternative frames are generated based on previous frames as well as cropped addition thereto may enable such encoders to provide a higher amount of data compression when compared to the compression of the original video.

Another technical effect is enabling to encode static content, such as content available for downloading, saving a video statically to a computing device, or the like, frame by frame, utilizing the disclosed solution, thereby reducing the amount of downloaded data. The size of the downloaded video file may be smaller than the original static content without utilizing the disclosed subject matter.

It is noted that human vision is imperfect, and focus of attention is of importance to the manner in which an image is perceived. In some cases, peripheral information may be ignored by the human mind and may be completed even if absent. The disclosed subject matter may make use of such properties of the human vision mechanism to reduce information used to present the video to the human viewer without adversely affecting her experience.

Yet another technical effect of the disclosed subject matter is an improvement of a consumption of hardware resources that may be needed for transmitting a packet comprising an encoded video frame, for routing the packet, or the like. In order to transmit the packet, one or more routers may be required. Each router may be configured to forward the packet to a next hop. In some cases, a packet may be above a Maximum Transmission Unit (MTU), above a maximum frame size that may be transported on the data link layer, or the like. In those cases, the packet comprising the encoded video frame may be fragmented, or the like, by one or more routers. Fragmenting a packet may result in increased memory usage of one or more routers, increased CPU utilization of one or more routers, or the like. By utilizing the disclosed subject matter, the packet size may be below the MTU, below the maximum frame size, or the like. Additionally or alternatively, a consumer may be able to determine a reconstructed video frame without all the portion of the video frame, without all the encoded portion of the video frame, or the like.

The inventor has implemented an embodiment of the disclosed subject matter, and exemplified that a video in which a TV newscaster is speaking, and having a relatively non-changing background, is compressed from an original file of 44 megabytes to an encoded version of 2,646,988 Bytes, while encoding the file without utilizing the disclosed subject matter is an encoded version of 6,232,861 Bytes, reducing the size of the file in more than 50%, while providing the user with an experience that is identical for all relevant purposes. In this embodiment, the object of interest is the face of the TV newscaster. The encoded video utilizes the disclosed subject matter comprises a cropped video comprising the TV newscaster of size of 2,644,061 Bytes, one full frame from the original file of size of 2,923 Bytes and a single anchor location of size of 4 bytes. As the TV newscaster movement during the video is below a threshold, the cropped video, a single anchor location and a single full frame are sufficient to construct the entire video. It is noted the single frame is resized for further efficiency.

The inventor implemented another embodiment of the disclosed subject matter, and exemplified that a video meeting using Zoom™ with the implementation results in an upload video size which is 80% less compared to a video meeting using Zoom™ without the implementation.

The disclosed subject matter may provide for one or more technical improvements over any pre-existing technique and any technique that has previously become routine or conventional in the art. Additional technical problems, solutions and effects may be apparent to a person of ordinary skill in the art in view of the present disclosure.

Referring now to FIG. 10A showing an environment, in accordance with some exemplary embodiments of the disclosed subject matter.

FIG. 10A may illustrate Video Frame 100. In some exemplary embodiments, Video Frame 100 may display Face 160 and Face 170. Bounding Shape 1020 may bound Face 160. Additionally or alternatively, Bounding Shape 1030 may bound Face 170. In some exemplary embodiments, Bounding Shape 1020 may be an area of importance, an area of interest, an area of activity, or the like. Additionally or alternatively, Bounding Shape 1030 may be an area of interest, an area of importance, an area of activity, or the like. FIG. 10A may illustrate two images of two people, a video frame comprised by an online lecture given by two lecturers, or the like.

In some exemplary embodiments, the producer may be operatively coupled with a computerized apparatus with low resources such as a weak CPU, low amount of available RAM, or the like. Additionally or alternatively, in case that processing Video Frame 100 comprises providing, there may be a latency above a latency threshold between the producer and a consumer. In those embodiments, the computerized apparatus may not be able determine one or more portions of the video frame or to process the one or more portions of the video frame to be processed in a time duration below a time threshold. In those embodiments, a first portion of the video frame to be processed may be determined. Additionally or alternatively, a second portion of the video frame to be processed may be determined. The first portion of the video frame to be processed may comprise Bounding Shape 1020. The second portion of the video frame to be processed may comprise Bounding Shape 1030. In those embodiments, Bounding Shape 1020 may be processed in a first processing channel. Additionally or alternatively, Bounding Shape 1030 may be processed in a second processing channel. As a result, Bounding Shape 1020 may be processed in a first computerized process. Additionally or alternatively, Bounding Shape 1030 may be processed in a second computerized process. Additionally or alternatively, an image comprising Face 160, may be provided by utilizing a first socket. Additionally or alternatively, another image comprising Face 170 may be provided by utilizing a second socket. As a result, Dashed Area 1010 may not be processed.

In some exemplary embodiments, it may be determined to provide Dashed Area 1010. Dashed Area 1010 may be determined by determining a unification of Bounding Shape 1020 and Bounding Shape 1030. Additionally or alternatively, the unification may be subtracted from Video Frame 100, resulting in Dash Area 1010. In some exemplary embodiments, a third processing channel may be determined. Dashed Area 1010 may be processed by utilizing the third processing channel.

In some exemplary embodiments, in case that Video Frame 100 is comprised by a sequence of video frames, another video frame may be obtained. In those embodiments, it may be determined that Bounding Shape 1020 or Bounding Shape 1030 may be more important for a user. In those embodiments, two other bounding shapes may be determined. A first other bounding shape may bound Face 160 as may be displayed in the other video frame. Additionally or alternatively, a second other bounding shape may bound Face 170 as displayed in the other video frame. In those embodiments, the first other bounding shape may be processed by utilizing the first processing channel. Additionally or alternatively, the second other bounding shape may be processed by utilizing the second processing channel. As a result, another dashed area may not be determined. Additionally or alternatively, another dashed area may not be processed. In those embodiments, in case that a consumer is configured to determine a reconstructed video frame based on the other frame, the consumer may determine the reconstructed video frame based on a processed portion of the video frame comprising a representation of the first other bounding shape or based on a processed portion of the video frame comprising a representation of the second other bounding shape or based on a processed portion of the video frame comprising a representation of Dashed Area 1010, previously provided.

In some exemplary embodiments, the unification may be a portion of the video frame to be processed. In those embodiments only the first processing channel may be determined for processing the unification. It may be noted, that the unification may be an un-continuous portion of the video frame. In some exemplary embodiments, it may be determined to provide the unification by utilizing the first processing channel or to provide Dashed Area 1010 by utilizing the third processing channel. In some exemplary embodiments, determining the portions of the video frame to be processed may comprise cropping Video Frame 100 based on the unification. In those embodiments, the portions of the video frame to be processed may comprise the cropped video frame. In some exemplary embodiments, instead of cropping Video Frame 100, Dashed Area 1010 may be set to a single value, to a single color, or the like. Additionally or alternatively, another portion of the video frame to be processed may be determined. The other portion of the video frame to be processed may be determined by setting the unification to a single value, to a single color, or the like, yielding a modified video frame. In those embodiments, the one or more portions of the video frame to be processed may comprise the modified video frame. In some exemplary embodiments, the modified video frame may be resized. In those embodiments, the resized modified video frame may be comprised by the one or more portions of the video frame to be processed.

In some exemplary embodiments, in case that Video Frame 100 is comprised by a sequence of video frames, it may be determined that Bounding Shape 1020 may comprise Face 160 in the other video frame prior to obtaining the other video frame. In those embodiments, Bounding Shape 1020 may be determined to be larger than a minimal bounding shape that may comprise Face 160 as displayed in the video frame. As a result, a portion to be processed of the other video frame may be determined based on Bounding Shape 1020 without determining areas of interest, without performing object detection, without performing face detection, or the like.

Referring now to FIG. 10B showing an environment, in accordance with some exemplary embodiments of the disclosed subject matter.

FIG. 10B may illustrate Video Frame 100B. In some exemplary embodiments, Video Frame 100B may display Screen 1050. Screen 1050 may be hung on a wall behind the two lecturers.

In some exemplary embodiments, determining the one or more portions of the video frame to be processed may comprise determining one or more portions of the video frame. In the illustrated example, a first portion of the video frame comprised by the one or more portions of the video frame may display Face 160. Additionally or alternatively, a second portion of the video frame comprised by the one or more portions of the video frame may display Face 170. Additionally or alternatively, a third portion of the video frame comprised by the one or more portions of the video frame may display Screen 1050. Additionally or alternatively, Bounding Shape 1020 may define the first portion of the video frame. Additionally or alternatively, Bounding Shape 1030 may define the second portion of the video frame. Additionally or alternatively, Screen 1050 may define a third portion of the video frame. In some exemplary embodiments, all portions of the video frame may be processed. The producer may be configured to determine whether a portion of the video frame is a high priority portion or a low priority portion. In the illustrated example, the producer may be configured to determine that Bounding Shape 1020 is a high priority portion. Additionally or alternatively, the producer may be configured to determine that Bounding Shape 1030 is a high priority portion. Additionally or alternatively, the producer may be configured to determine that Screen 1050 is a low priority portion. In those embodiments, the producer may be configured to determine to process all the portions of the video frame.

In some exemplary embodiments, the producer may be configured to determine an area of high priority. The area of high priority may comprise a unification of high priority portions of the video frame. In the illustrated example, the area of high priority may comprise Bounding Shape 1020 and Bounding Shape 1030. Additionally or alternatively, an area of low priority may be determined by subtracting the area of high priority from the video frame. In those embodiments, the area of high priority may be a first portion of the video frame to be processed. A high priority processing channel may be determined in order to process the area of high priority. Additionally or alternatively, it may be determined to process the area of low priority. In that case, a low priority processing channel may be determined. In some exemplary embodiments, the high priority processing channel may be a processing channel configured to utilize a high encoding. The low priority processing channel may be a processing channel configured to utilize low encoding. In those embodiments, high encoding may provide a video frame of better quality compared to low encoding. Additionally or alternatively, high encoding may require more computational resources compared to low encoding. Additionally or alternatively, a high priority processing channel may be configured to provide a video frame faster than a low priority processing channel.

In some exemplary embodiments, Video Frame 100B may be comprised by a sequence of video frames, such as in case of a video stream. In those embodiments, a high priority FPS parameter may be determined. The sequence of video frames may be obtained by utilizing a light sensor, such as a camera, or the like. The light sensor may be associated with a capturing FPS parameter. The capturing FPS parameter may define a maximal number of video frames per second that may be obtained by the producer. The high priority FPS parameter may be a portion of the capturing FPS parameter. Additionally or alternatively, the high priority FPS parameter may be equal to the FPS parameter. Additionally or alternatively, a low priority FPS parameter may be determined. The low priority FPS parameter may be smaller than the high priority FPS parameter. As a result, less portions of the video frames comprised by the area of low priority may be processed compared to portions of the video frames comprised by the area of high activity.

In some exemplary embodiments, during the lecture, one of the lecturers may utilize Screen 1050 in order to display another video stream. In those embodiments, the producer may be configured to determine that Screen 1050 is displaying the other video stream. The producer may determine that the Screen 1050 is displaying the other video stream by identifying a change in an activity level that may be associated with Screen 1050. Additionally or alternatively, a lecturer may say "I want to show you a movie", "let's look at a video", or the like. The producer may be configured to obtain audio of users, analyze the audio, and determine that Screen 1050 is displaying the other video stream. In response to determining that Screen 1050 is displaying the other video stream, the producer may be configured to determine new portions of the video frame to be processed. The new portions of the video frame to be processed may comprise Bounding Shape 1020, Bounding Shape 1030 and Screen 1050. Additionally or alternatively, the producer may be configured to determine a new area of high priority. Additionally or alternatively, the producer may be configured to determine a new area of low priority. The new area of high priority may comprise Bounding Shape 1020 and Screen 1050. In that example, a first lecturer displayed in Bounding Shape 1020 may be talking while a second lecturer displayed in Bounding 1030 may be still. As a result, Bounding Shape 1030 may be excluded from the area of high priority.

In some exemplary embodiments, in order to process the other video stream, the producer may be configured to obtain a copy of the other video stream. The other video stream may be processed. As an example, the other video stream may be provided to one or more consumers. Providing the other video stream to one or more consumers may be performed by utilizing the disclosed subject matter. The producer may be configured to provide a location and a size of Screen 1050 within the sequence of video frames, enabling a consumer to determine a sequence of reconstructed video frames displaying the other video stream.

As another example, the disclosed subject matter may be utilized in order to provide a Remote Desktop Software (RDS). In some exemplary embodiments, a video frame may display one or more open windows. Each of which may be associated with a software running on a remote desktop. In those embodiments, the producer may be configured to be executed on a remote machine. Additionally or alternatively, the remote machine may be utilizing the remote desktop. Additionally or alternatively, a consumer end device may obtain one or more portions of the video frame. Each open window may be associated with a bounding shape. Based on points of a user, a window of interest may be determined. The window of interest may be the window that a user is currently utilizing. Dashed Area 1010 may be considered as the seen portion of the desktop background. In some exemplary embodiments, the producer may be configured to obtain a description of each open window. In those embodiments, a description may comprise a location of the open window, a refresh rate of the open window, a size of the open window, a name of a software generating the open window, or the like.

Referring now to FIG. 1 showing an environment, in accordance with some exemplary embodiments of the disclosed subject matter.

Dashed line 110 may define a boundary of Video Frame 100. In some exemplary embodiments, the video frame may be of width w and of height h. In a coordinate system, the video frame may be defined by a quadruplet. The quadruplet may be (0, 0, w, h).

Point 120 may illustrates a top left corner of Video Frame 100. In the illustrated figure, Point 120 may be described by the 2-tuple (0,0). Additionally or alternatively, Point 180 may illustrate the bottom right corner of Video Frame 100. Point 180 may be described by the 2-tupple (w, h).

Video frame 100 may display First Object 160. Additionally or alternatively, Video Frame 100 may display Second Object 170.

Bounding Shape 130 may define a bounding shape of First Object 160. Additionally or alternatively, Second Bounding Shape 150 may define a bounding shape of Object 170. Additionally or alternatively, Bounding Shape 140 may define a bounding shape of First Object 160 and of Second Object 170. As can be seen, Bounding Shape 150 may be a minimal bounding rectangle. Bounding Shape 150 may be the rectangle having the smallest area out of all rectangles that may comprise Object 170. As can be seen, Bounding Shape 130 may be a non-minimal bounding rectangle.

In some exemplary embodiments, the producer may be configured to determine one or more bounding shapes as one or more closed curved areas comprising the one or more objects. In some exemplary embodiments, an object of the one or more objects may be associated with a closed curved area defining a bounding shape. In some exemplary embodiments, there may be a one-to-one relation between the one or more objects and the one or more curved areas. In some exemplary embodiments, the producer may be configured to encode each bounding shape in a different processing channel. In some exemplary embodiments, the term margin of the video frame may be used in order to reference a portion of the video frame without any objects. Additionally or alternatively, the margin may coincide with Dashed Line 110. Determining the margin may comprise determining a rectangle that may be defined by Top Left Point 175 and Bottom Right Point 177. The rectangle may comprise Object 160 and Object 170. Additionally or alternatively, the margin may be determined by subtracting the rectangle from Frame 100.

In some exemplary embodiments, the margin of Video Frame 100 may be defined by a quadruplet of portions of the video frame. A first portion of the quadruplet may be defined by Point 120 and Point 193. Additionally or alternatively, the first portion of the quadruplet may be a first area of Video Frame 100 that may be between the top border of Video Frame 100 and line 181. A second portion of the quadruplet may be defined by Point 192 and Point 196. Additionally or alternatively, the second portion of the quadruplet may be a second area of Video Frame 100 that may be between Line 181, the right border of Video Frame 100, Line 187 and Line 185. A third portion of the quadruplet may be defined by Point 194 and Point 180. Additionally or alternatively, the thread portion of the quadruplet may be a third area of Video Frame 100 that may be between Line 187 and the bottom border of Video Frame 100. A fourth portion of the quadruplet may be defined by Point 191 and Point 195. Additionally or alternatively, the fourth portion of the quadruplet may be a fourth area of Video Frame 100 that may be between Line 191, Line 183, Line 194 and the left border of Video Frame 100.

In some exemplary embodiments, the margin of Video Frame 100 may be sliced, based on the quadruplet, to four portions of the margin. Each portion may be encoded. Additionally or alternatively, each portion may be resized to a smaller portion and the smaller portion may be encoded. Additionally or alternatively, the encoded portions of the margin may be grouped to an encoded margin of Video Frame 100. Additionally or alternatively, the encoded margin of Video Frame 100 may be provided, may be retained, or the like.

Referring now to FIG. 2 showing a flowchart diagram of a method, in accordance with some exemplary embodiments of the disclosed subject matter.

On Step 210, a video frame may be obtained. The video frame may be obtained by utilizing a sensor, a camera, by reading a portion of a file, or the like.

On Step 230, one or more portions of the video frame to be processed may be determined. In some exemplary embodiments, a portion of the frame to be processed may display a portion of an image of an object, of two objects, or the like. An object may be a person, a face of a person, a dog, a car, a table, or the like. Additionally or alternatively, the portion of the video frame to be processed may comprise an area of importance. In some exemplary embodiments, an area of importance may be important to a user. Additionally or alternatively, the portion of the video frame to be processed may comprise an area of interest. In some exemplary embodiments, an area of interest may be an area in which a user may find interest. Additionally or alternatively, the portion of the video frame to be processed may comprise an area of activity. In some exemplary embodiments, the area of activity comprises an area of the video frame that may change above a threshold.

In some exemplary embodiments, determining the one or more portions of the video frame to be processed may comprise step 234, step 238, or the like.

On Step 234, one or more portions of the video frame may be determined. In some exemplary embodiments, the one or more portions of the video frame may be determined based on one or more objects that may be displayed in the video frame. In those embodiments, each portion of the video frame may be associated with a portion of an object. In some exemplary embodiments, a portion of the video frame may be processed in case that the portion of the video frame is displaying a portion of the object associated with an interest level above a threshold. Additionally or alternatively, the portion of the video frame may be processed in case that the portion of the video frame is displaying a portion of an object associated with an activity level above another threshold.

In some exemplary embodiments, the one or more portions of the video frame may be determined by determining areas of interest. As an example, the context information may be indicative to the video frame displaying a hall in a museum. In that example, an area of interest may be associated with an art item displayed in the video frame.

In some exemplary embodiments, the one or more portions of the video frame may be determined based on areas of activity. In some exemplary embodiments, the areas of activity may be associated with an activity level. In those embodiments, another portion of the video frame, associated with an activity level above an activity threshold may be processed. Referring again to the above museum example, the video frame may be comprised by a video stream displaying an online tour in the museum. Another portion of the video frame may display an image of a tour guide that may be moving from one picture to another picture. An activity level associated with the portion of the video frame displaying the tour guide may be larger than the activity threshold. As a result, the portion of the video frame displaying the tour guide may be processed.

In some exemplary embodiments, a portion of the video frame may not be processed. As an example, the producer may be configured to perform high encoding of one or more areas of interest associated with one or more interest level above an interest threshold, of one or more areas of activity associated with one or more activity levels above a threshold, or the like, requiring computational resources above a threshold. The portion of the frame may be associated with a priority below a priority threshold. In case that there are not enough computerized resources to process the portions of the video frame, the portion of the video frame may not be processed. Additionally or alternatively, another portion of the video frame may be associated with another priority. The other priority may be larger than the priority threshold. As a result, the other portion of the video frame may be processed.

On Step 238, a margin of the video frame may be determined. In some exemplary embodiments, determining one or more portions of the video frame may comprise determining the margin of the video frame. In those embodiments, an area of interest comprising a unification of portions of the video frame displaying one or more objects may be determined. Additionally or alternatively, the area of interest may comprise a unification of the one or more areas of activity. In those embodiments, the area of interest may comprise an inner portion of the video frame. The margin of the video frame may be a difference between the inner portion and the video frame. In some exemplary embodiments, the video frame may be comprised by a sequence of video frames, such as comprised by a video stream. In those embodiments, the inner frame may be processed per each video frame while the margin may be processed periodically. Additionally or alternatively, the margin may be determined periodically.

On Step 240, a portion of the video frame to be processed may be comprised by the one or more portions of the video frame to be processed may be processed. In some exemplary embodiments, the portion of the video frame to be processed may be processed by utilizing a processing channel. In some exemplary embodiments, the processing channel may comprise a computerized process. In some exemplary embodiments, a computerized process parameter may be determined for the computerized process. As an example, the computerized process parameter may comprise a priority, yielding that the portion of the video frame to be processed may be encoded in the computerized process with a different priority than other portions of the video frame to be processed. In some exemplary embodiments, the one or more portions of the frame to be processed may comprise one portion of the video frame. The one portion may be processed in a different computerized process than another computerized process in which the producer is running in, associated with, or the like. In some exemplary embodiments, determining the processing channel may comprise obtaining a socket. In those embodiments, processing the portion of the video frame to be processed may comprise utilizing the socket for providing an encoded portion of the video frame.

In some exemplary embodiments, processing the portion of the video frame to be processed may comprise performing step 244, performing step 248, performing step 250, or the like.

On Step 244, the video frame may be cropped based on the portion of the video frame to be processed. The cropped video frame may be comprised by the portions of the video frame to be processed. Additionally or alternatively, the cropped video frame may be resized to a smaller cropped video frame. The smaller cropped video frame may be comprised by the portions of the video frame to be processed.

In some exemplary embodiments, a bounding shape of the portion of the video frame to be processed may be determined. In those embodiments, the cropped video frame may comprise the bounding shape. The bounding shape may comprise the portion of the video frame to be processed. The shape may be a circle, an ellipse, a square, a rectangle, a triangular, or the like. In some exemplary embodiments, the bounding shape may be a minimal bounding shape. The minimal bounding shape may be minimal with respect to a predetermined shape such as a minimal rectangle comprising the portion of the video frame to be processed.

In some exemplary embodiments, the bounding shape may be larger than a minimal bounding shape. In some exemplary embodiments, it may be determined that another video frame may display the object in a location comprised by the bounding shape.

In some exemplary embodiments, the bounding shape may be a rectangle in order to utilize an encoder such as h264, h263 or the like.

In some exemplary embodiments, determining the portions of the video frame to be processed may comprise determining one or more bounding shapes.

On Step 248, the cropped video frame may be encoded. In some exemplary embodiments, such as a video stream, encoding the portion of the video frame may comprise utilizing an encoder such as h264, h263, or the like. In some exemplary embodiments, such as a camera application, encoding the video frame may comprise utilizing an encoder such as MPEG, PNG, or the like.

On Step 250, A final operation may be performed. The final operation may be performed with respect to the portion of the video frame to be processed. In some exemplary embodiments, the final operation may comprise providing the cropped video frame, providing the encoded cropped video frame, or the like. A consumer may obtain the processed portion, decode the processed portion and provide the decoded portion to a rendering device such as a screen. The consumer may obtain the one or more processed portions, decode each processed portion and determine a reconstructed video frame. In some exemplary embodiments, a final operation may comprise providing the one or more encoded portions of the video frame to a computerized device for further processing, for analysis, or the like. In some exemplary embodiments, the consumer may be configured to determine a decoder based on an encoder used for encoding the cropped video frame. As an example, in case that the producer utilized an H264 encoder, the consumer may be configured to utilize an H264 decoder.

In some exemplary embodiments, the consumer may be configured to display an obtained portion of the video frame directly. In those embodiments, the obtained portion of the video frame may be associated with a location within the video frame. The consumer may be configured to provide the obtained portion of the video frame to the rendering device in the location. In some exemplary embodiments, in case that the obtained portion of the video frame was encoded by the producer, the consumer may be configured to decode the portion of the video frame and to provide the decoded portion to the rendering device in the location. In some exemplary embodiments, the producer may be configured to determine a decoder based on an encoder. As an example, the producer may utilize H264 in order to encode a first portion of the video frame to be processed. The consumer may be configured to decode the first portion of the video frame to be processed with the first encoder. Additionally or alternatively, the producer may be configured to encode the margin of the video frame with H263. The consumer may be configured to decode the encoded margin of the video frame by utilizing an H263 decoder.

In some exemplary embodiments, a first processed portion of the video frame may be obtained by the consumer. Additionally or alternatively, a second portion of the video frame may be obtained by the consumer. Additionally or alternatively, a first portion of the video frame on another video frame may be obtained by the consumer, Additionally or alternatively, a second portion of the other video frame may not be obtained by the consumer. The second portion of the other video frame may not be provided by the consumer, may get lost, may be delayed, or the like. In those embodiments, the consumer may determine another reconstructed video frame based on the first processed portion of the other video frame and base on the second portion of the video frame.

In some exemplary embodiments, a final operation comprised by the one or more final operations may comprise retaining on a medium device the one or cropped portions of the video frame, the one or more encoded cropped portions of the video frame, or the like. In those embodiments, the one or more encoded portions of the video frame may be retained to be downloaded, to be processed, or the like. Additionally or alternatively, the one or more cropped portions of the video frame may be retained to be downloaded, to be processed, or the like. A consumer may be configured to download the one or more portions of the video frame and utilize the downloaded one or more portions of the video frames in order to provide the video frame to a user. In some exemplary embodiments, each portion of the video frame may be retained in a separate file, on a separate medium, or the like. In some exemplary embodiments, the video frame may be comprised by a sequence of video frames. In those embodiments, one or more video frames comprised by the sequence may be retained.

In some exemplary embodiments, the disclosed subject matter may be utilized while editing a movie. The movie may comprise a video frame. In those embodiments, the producer may be configured to remove an object displayed in the movie, to blur a portion of the object, to add an image to the object, to add an object to the video frame, or the like. Processing an image of the object may be followed by retaining a processed portion of the video frame comprising a representation of the object. In those embodiments, the producer may be utilized by one or more computerized devices configured to edit the video frame. A first computerized device may be configured to edit an image of the object and a second computerized device may be configured to edit another image of another object. Additionally or alternatively, two or more human editors may work separately, each may edit a portion of the video frame displaying a portion of the one or more objects.

In some exemplary embodiments, such as for decoding a single video frame, the steps of FIG. 2 may be performed once.

In some exemplary embodiments, one or more final operations may comprise one or more providing operations. In those embodiments, one or more sockets may be obtained. Different final operations may utilize different sockets. In some exemplary embodiments, a first encoded portion of the video frame, associated with a portion of the video frame to be processed, may be provided by utilizing a first socket. Additionally or alternatively, a second encoded portion of the video frame, associated with a second portion of the video frame to be processed, may be provided by utilizing a second socket. Additionally or alternatively, the margin may by be provided by utilizing the second socket, by utilizing a third socket, or the like.

In some exemplary embodiments, the producer may be executed in a computerized process. Additional computerized processes may be determined in order to process a portion of the video frame displaying an object, in order to process the margin of the video frame, or the like. Additionally or alternatively, the portion of the video frame may be processed in a first computerized process and the margin of the video frame may be processed in a second computerized process. In some cases, a first priority may be determined and applied on the first computerized process. The first priority may be higher than a second priority that may be associated with a second computerized process. Additionally or alternatively, the second priority may be determined and applied on the second computerized process. The first priority may be higher than the second priority, yielding that the first portion of the video frame may be processed faster than the margin of the video frame.

In some exemplary embodiments, the video frame may be comprised by a sequence of video frames, such as in case that the disclosed subject matter is utilized for streaming a video stream. In those embodiments, each video frame comprised by the sequence of video frames may display one or more images of one or more objects. For each video frame, one or more portions of the video frame to be processed may be determined. A portion of the video frame may be associated with an object, yielding a sequence of portions of the video frame, wherein each portion comprised by the sequence of portions is associated with the same object. Each portion comprised by the sequence may be processed in a same computerized process, utilizing a same socket, a same encoder, a same encoder type, a same encoder instance, or the like. In some cases, there may be two objects. The first object may be encoded or provided in a first computerized process or utilizing the first socket. Additionally or alternatively, the second object may be encoded or provided in a second computerized process or utilizing a second socket. The first computerized process may be associated with a first priority that may be smaller than a second priority associated with the second computerized process.

In some exemplary embodiments, separating the processing and providing to different computerized processes and to different sockets may yield that processed portions that are associated with a first object may arrive to the consumer at a different rate than processed portions that are associated with the second object. Additionally or alternatively, processed portions of the margin of the video frame may arrive at a different rate than the processed portions that may be associated with the first object. In those embodiments, in case that a new portion of the video frame is obtained by the consumer, the consumer may be configured to generate a merged video frame based on the new portion of the video frame and based on a previously obtained portion of the video frame. The new portion of the video frame may comprise a representation of the first object. Additionally or alternatively, the previously obtained portion of the video frame may comprise a representation of a second object, of the margin of the video frame, or the like. In some exemplary embodiments, the consumer may be configured to determine one or more consumer processing channels. In those embodiments, a consumer processing channel may comprise a computerized process, a socket, a decoder, or the like. In some exemplary embodiments, a first obtained processed portion of the video frame may be processed in a first consumer processing channel. Additionally or alternatively, a second obtained processed portion of the video frame may be processed in a second consumer processing channel. In some exemplary embodiments, the consumer may be configured to provide to a rendering device a decoded portion of the video frame. In those embodiments, the consumer may be configured to decode the first obtained processed portion of the video frame and to provide the decoded portion of the video frame to the rendering device. In some exemplary embodiments, the first obtained processed portion of the video frame may be associated with a location in the video frame. The consumer may be configured to provide the decoded portion of the video frame to the rendering device based on the location.

In some exemplary embodiments, the consumer may be configured to eye track the eyes of one or more users in order to determine one or more points of gaze. Additionally or alternatively, the producer may obtain one or more points of gaze of one or more users. Additionally or alternatively, the consumer may be configured to provide to the producer one or more points of gaze. In some exemplary embodiments, the producer may provide video frames to one or more rendering devices used by one or more users. The producer may be configured to determine one or more points of gaze. Based on the one or more points of gaze, the producer may determine interesting portions of the video frame.

As an example, two or more users may be watching a video stream, utilizing different consumers. The first user may be utilizing, directly or indirectly, a first consumer. Additionally or alternatively, a second user may be utilizing, directly or indirectly, a second consumer. The first user may be interested in a first object displayed in the video stream. Additionally or alternatively, a second user may be interested in a second object displayed in the video stream. Put differently, the first user may be interested in a first portion of the sequence of video frames. Additionally or alternatively, the second user may be interested in a second portion of the sequences of video frames. The first consumer may be configured to track the eyes of the first user or to determine a first point of gaze of the first user. Additionally or alternatively, the second consumer may be configured to track the eyes of the second user in order to determine a second point of gaze of the second user. The first consumer may provide the first of point gaze to the producer. Additionally or alternatively, the second consumer may provide the second point of gaze to the producer. Additionally or alternatively, the producer may be configured to detect, based on the first point of gaze, the first object. The producer may be configured to generate a first video stream in which the first object is associated with a first priority FPS parameter that is higher compared to a second priority FPS parameter that may be associated with the second object in the first video stream. Additionally or alternatively, the producer may be configured to detect, based on the second point of gaze, the second object. Additionally or alternatively, the producer may be configured to generate a second video stream in which the second object is associated with a third priority FPS parameter. In the context of determining the second video stream, the third priority FPS parameter may be higher compared to other priority FPS parameters associated with other objects. Additionally or alternatively, the producer may be configured to provide the first video stream to the first consumer. Additionally or alternatively, the consumer may be configured to provide the second video stream to the second user. As an example, the video stream may display a lion hunting a zebra. The first user may be interested in the lion or the second user may be interested in the zebra. While generating a first video stream the producer may be configured to utilize the first FPS. Additionally or alternatively, while generating the second video stream the producer may be configured to utilize the third priority FPS parameter. As a result, the first user may see the lion more clearly compared to the zebra or the second user may see the zebra more clearly compared to the lion.

In some exemplary embodiments, based on a point of gaze, an object may be low processed, high processed, or the like. Referring again to the zebra and lion example, in the first video stream, portions of the video frame displaying images of the lion may be high processed. Additionally or alternatively, in the first video stream, portions of the video frame displaying images of the zebra may be low processed. Additionally or alternatively, in the second video stream, portions of the video frame displaying the lion may be low processed. Additionally or alternatively, in the second video stream, portions of the video frame displaying the zebra may be high processed.

In some exemplary embodiments, the method exemplified by FIG. 2 may be a recursive method. In those embodiments, a number of portions above a threshold, the video frame may comprise a number of objects above a threshold, may have a size above a threshold, a footprint above a threshold, or the like. In those embodiments, a processing action with respect to ap portion may comprise performing Step 230 with respect to the portion. Pot differently, Step 230 may be performed again, wherein the video frame is the portion.

Referring now to FIGS. 3A and 3B showing flowchart diagrams of methods, in accordance with some exemplary embodiments of the disclosed subject matter.

FIGS. 3A and 3B may illustrate operations of a producer with respect to a margin of a video frame.

On Step 300*a*, a margin of the video frame may be determined. The margin of the video frame may be determined based on the video frame, based on one or more objects displayed in the video frame, based on one or more areas of activity comprised by the frame, based on one or more portions of the video frame to be processed, or the like. In some exemplary embodiments, determining the margin of the video frame may comprise determining an area of interest. The area of interest may be a unification over the one or more portions of the video frame displaying the one or more objects. Additionally or alternatively, the area of interest may be determined by determining a rectangle comprising the unification. Additionally or alternatively, the margin may be determined by subtracting the unification from the video frame. Additionally or alternatively, the margin may be determined by subtracting the rectangle from the video frame. As an example, a rectangle defined by Top Left Point 175 and Bottom Right Point 177 of FIG. 1 may exemplify such area of interest.

In some exemplary embodiments, a sequence of video frames may be obtained. The margin may be determined based on the sequences of video frames, such as by determining one or more margins, each of which associated with a video frame comprised by the sequence of video frames and determining the margin to be the maximal margin from the one or more margins. In those embodiments, the margin may be utilized for another frame, newly obtained, yielding that a margin of the newly obtained frame may be processed without performing Step 300*a*.

On Step 310*a*, a quadruplet of portions of the video frame comprising the margin of the video frame may be determined. As an example, the video frame may be of width w and height h. A single bounding shape may be defined by the coordinates (x1, y1, x2, y2). Hence, the margin of the video frame may comprise the portions of the video frames (0, 0, w, y1), (x2, y1, w, y), (0, y2, w, h), (0, y1, x1, y2).

As another example, the quadruplet may be as illustrated by FIG. 1. Lines 181, Line 183, Line 185 and Line 187 may illustrate the quadruplet. A first portion of the video frame comprising the quadruplet may be defined by Point 120 and Point 193. A second portion of the video frame comprising the quadruplet may be defined by Point 192 and Point 196. A third portion of the video frame comprising the quadruplet may be defined by Point 194 and Point 180. A fourth portion of the video frame comprising the quadruplet may be defined by Point 191 and Point 195.

On Step 320*a*, each portion of the video frame comprised by the quadruplet may be encoded by utilizing a video encoder such as h264, h263, or the like. In some exemplary embodiments, each portion of the quadruplet may be resized to a smaller portion of the margin. Each smaller portion of the margin may be encoded.

On Step 330*a*, the encoded quadruplet of portions of the video frame may be grouped to an encoded margin of the video frame.

On Step 340*a*, a final operation may be performed with respect to the encoded margin of the video frame. The encoded margin of the video frame may be provided to a consumer, may be retained on a medium, may be provided for a computerized processing device, or the like.

In some exemplary embodiments, the encoded margin of the video frame may be provided to a consumer by embedding the encoded resized video frame within an RTP packet. Additionally or alternatively, the RTP packet may be provided to the consumer. In those embodiments, a field may be added to an RTP header extension in order to provide the consumer a means for identifying the encoded margin of the video frame within the RTP stream. The field may be a bit such as 1 for a margin frame and 0 for a video frame comprising an object, an area of activity, or the like. Additionally or alternatively, an SDP may comprise a media offer associated with the margin of the video frame, describing boundaries of the margin, boundaries of a bounding shape bounding the object, boundaries of the area of activity, or the like. As an example, the media offer may comprise a representation of the points: Point 120 of FIG. 1, Point 191 of FIG. 1, Point 192 of FIG. 1, Point 193 of FIG. 1, Point 194 of FIG. 1, Point 195 of FIG. 1, Point 196 of FIG. 1, Point 180 of FIG. 1, or the like. In some exemplary embodiments, each RTP packet comprising an encoded resized margin frame may comprise a description describing the boundaries of the margin, boundaries of a bounding shape bounding the object, boundaries of the area of activity, or the like.

On Step 310*b*, a complement of the margin in the video frame may be set to a single color. Additionally or alternatively, the complement of the margin may be set to a single value. In some exemplary embodiments, the complement of the margin may be equivalent to an area of importance. In those embodiments, the area of importance may comprise a unification of one or more areas of importance, a unification of one or more areas of activity, a unification of one or more areas of interest, a combination thereof, or the like. The color may be yellow, green, blue, gray, black, white, purple, or the like. In some exemplary embodiments, a video frame comprising an area of one color may be better encoded compared to a video frame comprising objects, multiple colors, or the like. In those embodiments, a better encoding may refer to faster encoding, better compression, or the like.

On Step 320*b*, the video frame may be resized to a smaller video frame. As the margin of the video frame may be less important for a human viewer, resizing the video frame may not adversely impact the human viewer. It may be noted that the video frame may be modified by setting the complement to one color and that the modified video frame may be resized.

On Step 330*b*, the resized video frame may be encoded to an encoded margin of the video frame.

In some exemplary embodiments, providing or retaining the video frame may comprise performing the steps of FIG. 2 and the steps of FIG. 3A, performing the steps of FIGS. 2 and 3B or the like.

In some exemplary embodiments, a consumer may be configured to obtain the encoded margin of the video frame, decode it and provide it to a rendering device to be displayed to a user. Additionally or alternatively, the consumer may be configured to retain on a medium the decoded margin of the video frame enabling another consumer to consume the video frame. Additionally or alternatively, the consumer may be configured to obtain a processed portion of the video frame comprising a representation of an object and decode it to a decoded image of an object. The consumer may be configured to reconstruct the video frame based on the decoded margin of the video frame and based on the decoded image of the object. Additionally or alternatively, the consumer may be configured to render the reconstructed video frame by utilizing a rendering device such as a screen or the like. Additionally or alternatively, the consumer may be configured to retain the reconstructed video frame. In some exemplary embodiments, the consumer may be configured to merge the decoded margin and a decoded portion of the video frame comprising a representation of the object. The consumer may be configured to provide the merged video frame to the rendering device.

In some exemplary embodiments, a single socket or a single file descriptor may be determined. In those embodiments, each processing channel comprised by the one or more processing channels may be configured to utilize the single socket for performing the final operation, may be configured to utilize the single file descriptor for performing the final operation, or the like. In those embodiments, each RTP header may comprise a volatile description of the portion of the video frame. Additionally or alternatively, a final operation performed in a processing channel may comprise providing the encoded portion of the video frame to a writing module, such as by providing the encoded portion of the video frame or a pointer thereof to a shared memory area. In some exemplary embodiments, the writing module may periodically write the available portions of the video frame to the single socket, to the single file descriptor, or the like. In some exemplary embodiments, a single RTP packet may comprise one or more encoded portions of the video frame. In those embodiments, an RTP header may comprise one or more volatile locations of the one or more encoded portions of the video frame.

In some exemplary embodiments, the encoded portions of the video stream may be comprised by an encoded video stream. For one or more encoded video frames, a single final operation may be performed. Additionally or alternatively, in case that the final operation comprises providing the encoded portion of the video stream to a consumer, a single session description offer may be provided. Additionally or alternatively, the producer may be configured to obtain one or more video frames from a camera, and to determine, for a video frame comprised by the one or more video frames, one or more portions of the video frame to be processed. A first portion of the video frame to be processed, comprised by the one or more portions of the video frames to be processed, may be processed in a first processing channel. Additionally or alternatively, a second portion of the video frame comprised by the one or more portions of the video frames to be processed may be processed in a second processing channel. Additionally or alternatively, the producer may be configured to perform a single final operation with respect to a processed portion of a video frame, wherein the video frame comprised by the one or more video frames. The single final operation may comprise providing the first processed portion of the video frame and the second processed portion of the video frame to a consumer over the single socket in a single operation, utilizing a single packet. It may be noticed the single packet may be fragmented or the like by an operating system configured to execute the producer, by a router configured to transmit the packet, or the like.

Referring now to FIG. 4 showing a flowchart diagram of a method, in accordance with some exemplary embodiments of the disclosed subject matter.

On Step 400, one or more objects displayed in the video frame may be detected. The video frame may display one or more images, each of which may be an image of a portion of an object. An object may be a person, a face of a person, a dog, a car, a flower, a mountain, or the like. In some exemplary embodiments, an object may be detected by utilizing an ML algorithm such as Region-based Convolutional Neural Networks (R-CNN), Fast R-CNN, Faster R-CNN, You Only Look Once (YOLO), or the like.

In some exemplary embodiments, a context information of the video frame may be obtained. In some exemplary embodiments, the context information may comprise information regarding the capturing device such as a frame per second capability, a width of the video frame, a height of the video frame, or the like. Additionally or alternatively, the context information may comprise information regarding hardware capabilities of an encoding device such as CPU, RAM, or the like. In some exemplary embodiments, the encoding device may be a computerized device that may be operatively coupled with the producer. Additionally or alternatively, the context information may comprise information indicating that a single video frame may be processed, indicating that the video frame may be comprised by a movie, or the like, Additionally or alternatively, the context information may comprise information indicating that the video frame may be comprised by an online meeting video stream, comprised by an Augmented Reality (AR) content, comprised by a Virtual Reality (VR) content, or the like. Additionally or alternatively, the context information may comprise information indicating whether the video frame is to be provided online, offline, or the like. Additionally or alternatively, in case that the video frame is it to be provided online to one or more consumers, the context information may comprise one or more consumer context information. Additionally or alternatively, the context information may comprise one or more latency measurements, each of which may be a measurement of latency between the producer and a consumer. Additionally or alternatively, in case that the video frame is to be retained on one or more remote mediums, the context information may comprise one or more latency measurements, each of which may be a latency between the producer and a remote medium. Additionally or alternatively, the context information may comprise information regarding a demographic attribute of one or more users such as users that may watch the video frame, people that may be displayed in the video frame, or the like.

In some exemplary embodiments, the video frame may be comprised by a video stream, by a sequence of video frames, or the like. In those embodiments, the context information may be re-obtained while streaming the video stream. As an example, a first latency may be obtained. Additionally or alternatively, a second latency may be obtained afterwards. The second latency may be smaller than the first latency. In that case, the producer may be configured to increase a priority FPS parameter, to perform low encoding of the video frame, or the like. As another example, the video stream may be a movie. The movie may comprise an action scene and a quiet scene in which two characters are still. A first context information may be indicative to the action scene while a second context information may be indicative to the quiet scene. While processing a video frame comprised by the action seen, the producer may be configured to operate in a higher priority, to increase the number of rectangles as exemplified by FIG. 9:160, or the like. Additionally or alternatively, while encoding a video frame comprised by the quite seen, the producer may be configured to operate in a lower priority, to decrease the number of rectangles as exemplified by FIG. 9:170, or the like. In some exemplary embodiments, an information comprised by the context information may be determined by the producer. As an example, the producer may be configured to determine the latency measurement, to determine the type of the movie, or the like.

In some exemplary embodiments, one or more priorities may be re-obtained, one or more priorities threshold may be re-obtained, one or more interest levels may be re-obtained, one or more interest thresholds may be re-obtained, one or more activity levels may be re-obtained, one or more activity thresholds may be re-obtained, or the like.

In some exemplary embodiments, the producer may be configured to determine a type of the video stream such an online meeting, a movie, a sport event, or the like. Determining the type of the video stream may be based on a media packet traffic. A one direction media traffic, from the producer to the consumer may yield that the type of the video stream is a movie, a concert, or the like. Additionally or alternatively, in case that the producer is operatively coupled with a consumer, and in case that on the average, the media ingress volume is similar to the media egress volume, the type of a video stream may be determined to an online meeting, video chat, or the like. As an example, the context information may comprise a tag such as an "on-line meeting" a "movie", or the like.

In some exemplary embodiments, the context information may comprise information regarding a latency between the producer and the consumer. In those embodiments, in case that the latency is above a threshold, the producer may be configured to perform low processing of a portion of the video frame to be processed displaying an image of an object associated with an interest level below a threshold. In those embodiments, low processing may comprise steps 540*a*, 550*a*, and 560*a* of FIG. 5.

Additionally or alternatively, low processing may comprise determining a priority FPS parameter that may be associated with the object. The priority FPS parameter may be set to a value below another threshold. Additionally or alternatively, the producer may be configured to perform strict encoding of a portion of the video frame to be processed comprising an image of another object associated with another interest level. The other interest level may be above the threshold. In some exemplary embodiments, strict encoding may comprise a better compression of a portion of the video frame comprising the object compared to a non-strict encoding. It may be noticed that strict encoding may yield higher CPU usage, higher RAM usage, or the like, compared to non-strict encoding. By utilizing the disclosed subject matter, only a portion of the video frame may be strictly encoded, yielding less CPU or RAM usage compared to strictly encoding the entire video frame.

In some exemplary embodiments, based on the context, an ML algorithm may be determined. As an example, YOLO may not be able to detect objects associated with a portion of the video frame, wherein a size of the portion of the video frame is below a threshold. Additionally or alternatively, in case that a distance between the object and the other object is below a distance threshold, YOLO may not be able to detect the object and the other object. Additionally or alternatively, YOLO may not be able to detect one or more objects in case that the video frame is associated with a rare aspect of ratio such as a width of 1280 and a height of 320. Additionally or alternatively, Fast RCNN may detect the object, may detect the other object, may detect the one or more objects displayed in a video frame in case that the video frame is in a rare aspect of ratio, or the like. Additionally or alternatively, applying Fast RCNN on a sequence of video frames, wherein the sequence is obtained in a capture rate above a capture threshold may result in an error rate above an error threshold. Additionally or alternatively, applying YOLO on the sequence of video frames may yield another error rate below the error threshold.

In some exemplary embodiments, detecting the one or more objects may be based on the context information. As an example, the context information may comprise a latency measurement between the producer and a consumer. The latency measurement may be above a threshold. Additionally or alternatively, the context information may comprise a field indicating that the connection between the producer and the consumer is a limited connection. A connection may be limited in case that the connection is configured to reduce the amount of data that may be transmitted such as in case that an end device used by a user may be roaming. Additionally or alternatively, the context information may comprise an information indicating that the producer is utilized in an online video chat. A user utilizing the producer may be outside. A sensor configured to capture images of the user may capture the user or one or more objects. The producer may be configured to detect one object comprising an image of the user. Additionally or alternatively, as the connection is limited or as the latency is below a threshold, it may be determined, based on the context information, not to detect another object. Put differently, it may be determined that the one or more portions of the video frame to be processed may comprise a portion of the video frame displaying a portion of the user. Additionally or alternatively, it may be determined to exclude another portion of the video frame, not displaying any portion of the user, from the one or more portions of the video frame to be processed. As a result, only a portion of the video frame displaying an image of the user, may be processed, may be encoded, may be provided to the consumer, or the like. Additionally or alternatively, the margin may be excluded from the one or more portions of the video frame to be processed and may not be provided to the consumer.

On Step 410, one or more priorities may be obtained. A priority comprised by the one or more priorities may be associated with a portion of the video frame. In some exemplary embodiments, a first portion of the video frame may be associated with a first priority and a second portion of the video frame may be associated with a second priority. The first priority may be larger than the second priority. In those embodiments, the producer may be configured to ensure that the first portion of the video frame can be processed. Additionally or alternatively, the producer may be configured to exclude the second portion of the video frame from the portions of the video frame to be processed. As an example, the first portion of the video frame may display an image of a person and the second portion of the video frame may be the margin of the video frame. The producer may be configured to ensure that an image of the person is provided to a consumer even if an image of the margin may not be provided to the consumer.

In some exemplary embodiments, one or more priority thresholds may be obtained. In some exemplary embodiments, a priority threshold comprised by the one or more priority thresholds may be associated with a priority, Additionally or alternatively, the priority threshold may be associated with a portion of the video frame. In those embodiments, the portion of the video frame may be processed in case that the priority is larger than the priority threshold.

In some exemplary embodiments, a priority may be based on an interest level. In those embodiments, obtaining the one or more priorities may comprise obtaining one or more interest levels. Additionally or alternatively, one or more interest thresholds may be obtained. In some exemplary embodiments, an object may be associated with an interest level. The interest level may be indicative to the importance of the object. As an example, the video frame may comprise two objects. The first object may be a person and the second object may be a hat. In one case, the person may be sitting alongside the hat. In that case, the hat may be associated with a low interest level. In a second case, the person may be a magician showing a magic show. A viewer of the magic show may wait for a rabbit to come out of the hat. In that case, the hat may be associated with an interest level higher than an interest level associated with the magician. As another example, a first person may be in an online meeting with a second person and a third person. The first person may display her baby and her dog. The producer may be configured to determine, based on the context information, that the second person is more interested in the dog or that the third person is more interested in the baby. The producer may be configured to generate a first video stream for the second person and a second video stream for the third person. In the first video stream a portion of the video frame comprising an image of the baby may be better encoded than a portion of the video frame comprising an image of the dog. Additionally or alternatively, in the second video stream, the portion of the video frame comprising the image of the dog maybe be better encoded than the portion of the video frame comprising the image of the baby.

In some exemplary embodiments, the producer may be configured to obtain a point of interest. As an example, the second person may point an area on the screen displaying the baby. The consumer may be configured to provide the location of the point of the second user. The producer may be configured to increase the interest level of that area in the first stream.

In some exemplary embodiments, the producer may be configured to determine an interest level based on audio. As an example, the third person may say "what a cute dog", or the like. The producer may be configured to obtain audio from the third user and to analyze the audio in order to determine to increase the interest level associated with the dog in the second video stream. Additionally or alternatively, the consumer may be configured to obtain the audio, analyze it, and provide to the consumer information indicating the interest of the third user.

In some exemplary embodiments, a priority or a priority threshold may be associated with a portion of the video frame. As an example, a video stream may be utilized for security surveillance. Each video frame comprised by the video stream may be sliced to one or more slices. Each slice may represent a portion of a watched area. A slice representing the entrance to the watched area may be associated with a first priority. Additionally or alternatively, a slice representing a garden in the watched area may be associated with a second priority. The first priority may be larger than the second priority.

In some exemplary embodiments, an interest level that may be associated with an object may change during a streaming of the video stream. The producer may be configured to periodically obtain new one or more interest levels, to periodically determine new one or more interest levels, to determine new one or more interest levels based on new one or more activity levels, or the like. As an example, two people may be lecturing. The lecture may be provided on-line to students. In that case, there may be two objects. The first lecturer may be referred to as a first object and the second lecturer may be referred to as a second object. While the first lecturer is talking, the first object may be associated with a higher interest level than the second object. In case that the first lecturer stops talking or that the second lecturer starts talking, a new interest level may be determined for the first lecturer or a new second interest level may be determined for the second lecturer. The new second interest level may be higher than the new first interest level.

In some exemplary embodiments, a minimal priority threshold may be obtained by the producer, determined by the producer, or the like. In those embodiments, other portions of the video frame displaying non interesting objects may be associated with a priority below the minimal priority threshold and may be low processed. Additionally or alternatively, a priority FPS parameter above a threshold may be determined for a portion of the video frame displaying the object. Additionally or alternatively, another priority FPS parameter below another threshold may be associated with the other portions of the video frame. Additionally or alternatively, the other portions of the video frame may be excluded from the portions of the video frame to be processed. Referring again to the lion and zebra example, a video frame may comprise the lion, the zebra, additional one or more zebras, one or more other animals, or the like. The producer may be configured to low process portions of the video frame displaying the additional one or more zebras, portions of the video frame displaying other animals, or the like. As a result, another image of another zebra may be pixelated when displayed to a user. Additionally or alternatively, the other image of the other zebra may not be displayed to the user.

In some exemplary embodiments, obtaining the one or more priorities may comprise obtaining one or more activity levels. Additionally or alternatively, one or more activity thresholds may be obtained. In some exemplary embodiments, an activity level may be associated with an object. The activity level may be indicative to movements, to activity, or the like, of the object as captured by the capturing device. In some exemplary embodiments, one or more activity levels may be determined for the one or more objects. Additionally or alternatively, an activity level may be determined for a sequence of images displaying an object. In some exemplary embodiments, an activity level may represent a difference in pixels between two or more bounding shapes comprising the sequence of the image. In some exemplary embodiments, in order to determine an activity level of a video frame, a difference between the video frame and a previous video frame may be determined.

In some exemplary embodiments, an activity level of a portion of the frame to be processed may be determined based on a sequence of video frames. In that case, the activity level may be a statistical measurement, such as the average, of the one or more activity levels.

In some exemplary embodiments, a minimal activity threshold may be obtained by the producer, determined by the producer, or the like. In those embodiments, other portions of the video frame displaying an object that may be associated with an activity level below the minimal activity threshold may be slow processed. Additionally or alternatively, the other portions may be excluded from the portions of the video frame to be processed.

In some exemplary embodiments, an object may be associated with a bounding shape, with a minimal bounding shape, or the like. In those embodiments, an activity level of the object may be determined based on the activity level of the bounding shape. In some exemplary embodiments, such as a video stream, one or more bounding shapes may be determined based on the object. A first bounding shape comprised by the one or more bounding shapes may be associated with a first video frame comprised by the sequence. Additionally or alternatively, a second bounding shape comprised by the one or more bounding shapes may be associated with a second video frame comprised by the sequence. The first bounding shape may comprise an image of a first object. Additionally or alternatively, the second bounding shape may comprise the image.

In some exemplary embodiments, two or more objects may be associated with a same bounding shape, with a same portion of the frame to be processed, or the like. Additionally or alternatively, a first interest level may be associated with a first object. Additionally or alternatively, a second interest level may be associated with a second object. Additionally or alternatively, a difference between the first interest level and the second interest level may be below a threshold. Additionally or alternatively, the first object may be associated with a first activity level. Additionally or alternatively, the second object may be associated with a second activity level. Additionally or alternatively, a difference between the first activity level and the second activity level may be below a threshold. Additionally or alternatively, a first object comprised by the two or more objects may be associated with a first location within a video frame. Additionally or alternatively, a second object comprised by the two or more objects may be associated with a second location within the video frame. A difference between the first location and the second location may be below a threshold. In those embodiments, the two bounding shapes may be comprised by a same portion of the video frame to be processed. In those embodiments, one processing channel may be determined for the two bounding shapes, yielding that the two bounding shapes may be provided by a same socket, a same encoder may be utilized in order the two bounding shapes, the two bounding shapes may be encoded together, the two bounding shapes may be processed in a same computerized process, or the like.

In some exemplary embodiments, in case of a video stream, it may be determined whether to perform step 400, or to perform step 410. In those embodiments, the video stream may comprise a sequence of video frames. A portion of the sequence may be analyzed, by performing step 400 on one or more video frames comprised by the portion. Additionally or alternatively, a decision may be made in order to determine whether a video frame should be analyzed, on whether to determine one or more objects, or the like. The decision may be based on the one or more activity levels, on the one or more interest levels, or the like. In those embodiments, a statistical function over the one or more activity levels or over the one or more interest level may be determined. The statistical function may be a maximum, an average, or the like. As an example, in case that the maximal interest level is below an interest threshold only a portion of the video frames comprised by the video stream may be analyzed. Additionally or alternatively, in case that the maximal activity level is below an activity threshold only a portion of the video frames comprised by the video stream may be analyzed. Additionally or alternatively, the statistical function may be a weighted average of the one or more interest levels and the one or more activity levels. In some exemplary embodiments, in case that a video frame is not analyzed, the one or more portions of the video frame may be determined based on one or more portions of a previous video frames. In those embodiments, a portion of the video frame to be processed may be associated with an area within a previous video frame. Based on the area, a portion of the video frame to be processed may be determined. The portion of the video frame to be processed may be associated with a same location and shape as the portion of the previous video frame to be processed. In some exemplary embodiments, another video frame may be obtained. In case that the statistical function is below a threshold, the other video frame may not be analyzed.

On Step 430, one or more portions of the video frame to be processed may be determined. In some exemplary embodiments, determining the one or more portions of the video frame to be processed may be based on the one or more priorities and on a single priority threshold. A portion of the video frame, displaying a portion of an object, may be comprised by the one or more portions of the video frame to be processed in case that the priority is above the single priority threshold.

In some exemplary embodiments, the portions of the video frame to be processed may be determined based on one or more priority thresholds, wherein a priority threshold may be associated with a portion of the video frame. In those embodiments, for each portion of the video frame, the portion of the frame may be comprised by the one or more portions of the video frame to be processed in case that the associated priority is larger than the associated priority threshold.

On Step 450, one or more processing channels may be determined. In some exemplary embodiments, determining the one or more processing channels may comprise determining or obtaining one or more sockets, one or more socket parameters, one or more computerized processes, one or more computerized processes parameters, one or more encoders, one or more encoders parameters, or the like. Determining the one or more processing channels may be based on the context information, on the one or more priorities, on the one or more priorities thresholds, on the one or more interest levels, on the one or more activity levels, on the one or more interest threshold, on the one or more activity threshold, on the one or more objects, on the one or more portions of the video frame to be processed, or the like. In some exemplary embodiments, a producer may be configured to provide a representation of a first object to a consumer by utilizing a first processing channel or to provide a representation of a second object by utilizing a second processing channel. Additionally or alternatively, a representation of the margin frame may be provided by utilizing the second processing channel. Additionally or alternatively, a representation of a third object may be provided by utilizing the second processing channel. In some exemplary embodiments, grouping the one or more objects to the one or more processing channels may be based on the one or more interest levels and on the one or more interest threshold. An interesting object may be associated with an interest level above a first interest threshold. Additionally or alternatively, a first object associated with an interest level above the first interest threshold may be associated with a first processing channel. The first processing channel may not be associated with any other object. Additionally or alternatively, two or more objects associated with an interest level below the first threshold may be associated with a second processing channel. As a result, an interesting object may be processed in a separate processing channel and may be provided in the separate processing channel.

In some exemplary embodiments, the producer may be configured to track the eyes of one or more objects in order to determine one or more points of gaze. The producer may be configured to track an image of eyes of one or more objects as may appear in a video frame. Additionally or alternatively, the producer may be configured to obtain one or more points of gaze of the one or more objects. Based on the one or more points of gaze, new one or more interest levels may be determined for the one or more object, for another one or more objects, or the like. As an example, a video stream may display a Yoga teacher and a student. The Yoga teacher may be associated with a first interest level and the student may be associated with a second interest level. The first interest level may be higher than the second interest level. The teacher may ask the student to show a pose. Additionally or alternatively, the teacher may look at the student while the student is showing the pose. Based on the point of gaze of the teacher, the producer may be configured to determine a new second interest level that may be higher than the first interest level.

In some exemplary embodiments, an encoding algorithm may be referred to as an encoder. In those embodiments, an encoder may be an implementation of H264, H263, or the like. In some exemplary embodiments, an encoding algorithm instance may be referred to as an encoder. Applying a first encoding instance on a video frame and a second encoding instance on the video frame may be referred to as applying a first encoder on the video frame and applying a second encoder on the video frame.

In some exemplary embodiments, different encoders may be determined for different processing channels. A processing channel associated with an interesting object may utilize a first encoder. Additionally or alternatively, another processing channel associated with a less interesting object may utilize a second encoder. The second encoder may be configured to work more slowly than the first encoder. Additionally or alternatively, the first encoder may produce an encoded image that when decoded may be of better quality than a second image, wherein the second image may be a decoded video frame, encoded by the second encoder.

In some exemplary embodiments, one or more encoders may be determined for processing different portions of the video frame based on the one or more priorities, based on the one or more objects, based on the margin, based on the one or more interest levels, based on the one or more interest thresholds, based on the one or more activity levels, based on the one or more activity thresholds, based on a context information, or the like. In those embodiments, a first encoder may be utilized in order to encode a portion of the video frame displaying an object and a second encoder may be utilized in order to encode a portion of the video frame displaying the margin of the video frame. Additionally or alternatively, the first encoder may be utilized to encode a high priority video frame and the second encoder may be utilized in order to encode a low priority video frame.

In some exemplary embodiments, different encoder parameters may be determined. An encoder parameter may indirectly cause an encoder to work faster, to work slower, to require different amounts of hardware resources, or the like. Determining the one or more encoder parameters may be based on the one or more encoders, on the context information, on the one or more interest levels, on the one or more activity levels, or the like. In those embodiments, a first parameter may be applied on an encoder configured to encode an object and a second parameter may be determined for a second encoder configured to encode a portion of the video frame displaying the margin. As an example, the first encoder may be configured, when provided with the first parameter, to make more than one pass over the portion of the video frame comprising the object. Additionally or alternatively, the second encoder may be configured, when provided with the second parameter, to make a fast pass over a portion of the video frame comprising the margin, comprising another object, or the like.

In some exemplary embodiments, determining the one or more encoders, the one or more encoders parameters, or the like, may be based on the context information. As an example, determining an encoder, an encoder parameter, or the like, may be based on the availability of one or more CPU's associated with the producer, on the available RAM associated with the producer, or the like.

In some exemplary embodiments, determining an encoder, an encoder parameter, or the like, for an object, may be based on an interest level associated with the object. As an example, the first object may be associated with a first interest level that may be higher than a second interest level associated with a second object. In some cases, applying different encoding algorithm implementations on different portions of the video frame may yield minimizing hardware resources while keeping a difference between the video frame and the reconstructed video frame above a threshold. Additionally or alternatively, a first encoder instance may be utilized to encode a first portion of the video frame and a second encoder instance may be utilized to encode a second portion of the video frame. The variance of pixels in the first portion may be lower than a variance of pixels in the entire video frame. Additionally or alternatively, the variance of pixels in the second portion of the video frame may be lower than the variance of pixels in the video frame. Hence, applying different instances of a same encoding algorithm implementation on different portions of the video frame may yield a faster encoding.

In some exemplary embodiments, the disclosed subject matter may be utilized for encoding a portion of a video stream. In those embodiments, an encoder parameter value may be changed during an encoding of the portion of the video stream. A first value may be determined for the encoder parameter. The encoder parameter value may be set with the first value. The encoder may be utilized for encoding a first portion of the portion of the video stream. Additionally or alternatively, a second value may be determined for the encoder parameter. The encoder parameter value may be set with the second value. The encoder may be utilized for encoding a second portion of the video stream.

As an example, the first portion of the video stream may comprise images of a basketball player warming up. Additionally or alternatively, the second portion of the video stream may comprise images of the basketball player running, jumping, or the like. Put differently, the second portion of the video stream may display the basketball player moving faster compared to the first portion of the video stream. In that example, a first bit rate value may be determined for a bit rate parameter of the encoder. Additionally or alternatively, a second bit rate value may be determined for the bit rate parameter of the encoder. The first bit rate value may be larger than the second bit rate value. As another example, a first Constant Rate Factor (CRF) value may be determined for the first portion of the video stream and a second CRF may be determined for the second portion of the video stream. The second CRF value may be smaller than the first CRF value.

In some exemplary embodiments, a priority FPS parameter may be associated with an object, associated with a processing channel, or the like. The priority FPS parameter may be determined based on a priority that may be associated with the object, based on an interest level that may be associated with the object, based on an activity level that may be associated with an object, or the like. In those embodiments, an interest level may be indicative of an interest of a user in the object. Additionally or alternatively, the activity level may be indicative to movements of the object. In some exemplary embodiments, the first object may be associated with a first interest level and the second object may be associated with a second interest level. The first interest level may be higher than the second interest level. In those embodiments, a first priority FPS parameter that may be associated with the first object may be higher than a second priority FPS parameter that may be associated with the second object. Similarly, in another exemplary embodiment, a first activity level that may be associated with the first object may be higher than a second interest level that may be associated with the second object. In that embodiment, the first priority FPS parameter may be determined based on the first activity level and the second priority FPS parameter may be determined based on the second activity level. The first priority FPS parameter may be higher than the second FPS parameter.

In some exemplary embodiments, the priority FPS parameter may be based on a priority. The priority may be based on the interest level and on the activity level. The interest level and the activity level may each be normalized. The priority may be an average of the normalized interest level and of the normalized activity level may be determined. Based on the priority, an FPS may be determined. A first priority FPS parameter may be determined based on a first priority. Additionally or alternatively, a second priority FPS parameter may be determined based on a second priority associated with a second object. The first priority may be higher than the second priority yielding that the first priority FPS parameter may be higher than the second FPS parameter.

As an example, in case that the context information comprises a "nature landscape" tag, a margin of the video frame may be provided to one or more consumers. Additionally or alternatively, a first priority FPS parameter may be determined for the margin. Additionally or alternatively, in case that the context information comprises a "movie" tag, a second priority FPS parameter may be determined for the margin. In some exemplary embodiments, the second FPS rate may be higher than the first FPS rate.

In some exemplary embodiments, a sensor may be utilized in order to capture a sequence of video frames. The sensor may be associated with a capturing FPS parameter. Additionally or alternatively, the producer may be configured to determine one or more FPS parameters for one or more portions of the video frame. Additionally or alternatively, a priority FPS parameter may be associated with an object that may be displayed in the sequence of the video frames. Additionally or alternatively, another priority FPS parameter comprised by the one or more FPS parameters may be associated with the margin. A priority FPS parameter comprised by the one or more FPS parameters may be smaller than the capturing FPS parameter associated with the sensor. In those embodiments, the producer may be configured to periodically not process a portion of the frame displaying an object, displaying the margin, or the like. As an example, the sensor may be associated with a 30 FPS parameter and the margin may be associated with a 10 FPS parameter. The producer may obtain 30 video frames per second, out of which the margin frame may be encoded 10 times, may be provided to a consumer 10 times, or the like. The producer may be configured to exclude a portion of the video frame comprising the margin from the one or more portions of the video frame to be processed. Additionally or alternatively, the producer may be configured to exclude a portion of the video frame displaying the margin of video frame every second and third video frames.

In some exemplary embodiments, a video frame may be analyzed in order to detect one or more objects displayed in the video frame, in order to determine a margin of the video frame, in order to determine areas of activity comprised by the video frame, or the like. In some exemplary embodiments, in case of a sequence of video frames, only a portion of the video frames comprised by the sequence of video frames may be analyzed. In those embodiments, the priority FPS parameter may yield a rate in which video frames may be analyzed. Additionally or alternatively, the priority FPS parameter may yield a rate in which one or more priorities may be obtained, a rate in which one or more priority thresholds may be obtained, or the like.

As an example, a video stream may display a Yoga lesson. The video stream may comprise a teacher and one or more students. A user may watch the video stream. The user may find the teacher more interesting than the one or more students. The teacher may be associated with a first interest level, a first activity level, or the like. The one or more students may be associated with a second interest level, a second activity level, or the like. Based on the first interest level and based on the first activity level, a first FPS may be determined. Additionally or alternatively, based on the second interest level and based on the second activity level a second priority FPS parameter may be determined. The first FPS may be higher than the second FPS, yielding that portions of video frames displaying images of the teacher may be sent more often than portions of the video frames displaying images of the one or more students. In some exemplary embodiments, a first computerized process may be determined for the teacher and a second computerized process may be determined for the one or more students. The first computerized process may be associated with a first priority and the second computerized process may be associated with a second priority. The second priority may be smaller than the first priority, yielding that the portions of video frames displaying the one or more students may be processed more slowly compared to portions of video frames displaying the teacher.

In some exemplary embodiments, during the video stream, the teacher may ask a student to show a pose. In that case, a new second activity level associated with the student may be determined. The new second activity level may be larger than the second activity level. Based on the second interest level and based on the new second activity level a new second priority FPS parameter may be determined. The new second priority FPS parameter may be larger than the second FPS parameter, yielding that more portions of the video frames displaying images of the student may be provided to the consumer compared to portions of the video frames displaying images of the teacher, displaying images of other students, or the like. In some exemplary embodiments, a new portion of the video frame to be processed may be determined. The new portion of the video frame to be processed may be associated with the student showing the pose. As a result, the one or more portions of the video frame to be processed may comprise three portions of the video frame to be processed. One portion of the video frame to be processed may display an image of the teacher, another portion of the video frame to be processed may display the student and an additional portion of the video frame to be processed may display images of the other students.

In some exemplary embodiments, the context information may comprise information regarding a content of the video stream. As an example, the video stream may display a basketball match. A video frame comprised by the video stream may display several objects. A portion of the objects may be associated with one or more basketballers. A first basketballer may be running with a ball and may be associated with an interest level that may be higher than any other interest level that may be associated with other basketballers in the basketball match. Additionally or alternatively, a second basketballer may be closer to the first basketballer compared to a third basketballer. The second basketballer may be associated with a second interest level and the third basketballer may be associated with a third interest level. The second interest level may be higher than the third interest level.

In some exemplary embodiments, an image of the first basket bailer may be processed in a first processing channel. Additionally or alternatively, a second image of the second basketballer may be processed in a second processing channel. The first channel may be associated with the first computerized process, with a first priority, with a first socket, with a first socket parameter, with a first FPS parameter, with a first encoder type, with a first encoder instance, with a first encoder parameter, or the like. Additionally or alternatively, the second channel may be associated with a second computerized process, with a second priority, with a second socket, with a second socket parameter, with a second FPS parameter, with a second encoder type, with a second encoder instance, with a second encoder parameter, or the like. Put differently or more generally, based on the context information or based on the one or more priorities, one or more processing channels may be determined.

In some exemplary embodiments, for each processing channel, a priority FPS parameter may be determined.

Determining the priority FPS parameter may be based on the activity level associated with the processing channel, on the interest level associated with processing channel, or the like. Additionally or alternatively, determining the priority FPS parameter of the processing channel may be based on the context information. In those embodiments, the capturing device may be associated with a capturing FPS parameter. The capturing FPS parameter may be hardware dependent. Additionally or alternatively, the capturing FPS parameter may be a rate in which a capturing device, such as a camera, is configured to capture a sequence of images. The priority FPS parameter associated with the object of interest may be a portion of the capturing FPS parameter such as a half, one third, 90%, or the like. In those embodiments, a video frame counter may be utilized in order to determine whether to process the video frame with respect to the portion of the video frame. As an example, referring again to the magician example, the priority FPS parameter of a portion of the video frame associated with the magician may be one third of the capturing FPS parameter. As a result, every third video frame may be processed with respect to the processing channel associated with the magician.

As another example, a Yoga lesson may be provided by two teachers. One teacher may move in order to show a Yoga pose. A first one or more portions of the one or more video frames comprised by the sequence of video frames may be associated with the Yoga teacher showing the pose. The first one or more portions of the one or more video frames comprised by the sequence of video frames may be associated with a first priority, with a first activity level, with a first interest level, or the like. Additionally or alternatively, a second one or more portions of the one or more video frames comprised by the sequence of video frames displaying a second Yoga teacher may be associated with a second priority, with a second activity level, with a second interest level, or the like. The first priority may be larger than the second priority, Additionally or alternatively, the first activity level may be higher than the second activity level. Additionally or alternatively, the first interest level may be higher than the second interest level. A first processing channel may be determined or may be associated with the first one or more portions of the one or more video frames comprised by the sequence of video frames. Additionally or alternatively, a second processing channel may be determined or associated with the second one or more portions of the one or more video frames comprised by the sequence of video frames. In some exemplary embodiments, the first one or more portions of the one or more video frames comprised by the sequence of video frames may be analyzed more often compared to the second one or more portions of the one or more video frames comprised by the sequence of video frames. Additionally or alternatively, the first one or more portions of the one or more video frames comprised by the sequence of video frames may be encoded and provided more often compared to the second one or more portions of the one or more video frames comprised by the sequence of video frames.

In some exemplary embodiments, the producer may be configured to perform steps 210, 400, 410 at the beginning of the video stream, for a time duration, such as a second, two seconds, or the like. In some cases, the activity level may change above a threshold, or the like at the beginning of the video stream. As an example, in case of an online meeting, a participant may move the camera, may switch on or off a light, or the like. In those embodiments, the producer may be configured to provide, for the time duration, video frames without determining objects, without determining a margin, or the like.

In some exemplary embodiments, a computerized apparatus utilizing the disclosed subject matter may be configured to simultaneously process one or more video streams, one or more audio streams, or the like. In some exemplary embodiments, a same instance of an ML algorithm may be utilized for analyzing two or more media streams simultaneously. The ML algorithm may be an object detection algorithm, a face detection algorithm, or the like. One technical effect may be a reduction in required CPUs and RAM for processing a video stream. Additionally or alternatively, a same computerized apparatus utilizing the disclosed subject matter may process more video streams compared to the computerized apparatus not utilizing the disclosed subject matter. As an example, a cloud server may be configured to receive a video stream from a computerized client. Additionally or alternatively, the cloud server may be configured to process the video stream. Additionally or alternatively, the cloud server may be configured to return to the client one or more types of detected objects, one or more locations the one or more detected objects, or the like. Additionally or alternatively, the cloud server may be configured to simultaneously process one or more video streams from one or more computerized clients. By utilizing the disclosed subject matter the cloud server may allow the cloud server to simultaneously process more video streams compared to the cloud server not configured to utilize the disclosed subject matter.

On Step 460, the one or more portions of the video frame to be processed may be processed. In some exemplary embodiments, processing a portion of the video frame to be processed may comprise Step 240 of FIG. 2. In some exemplary embodiments, Step 240 of FIG. 2 may be performed one or more times for each portions of the video frame to be processed.

In some exemplary embodiments, in case that the video frame is comprised by a video stream, the steps of FIG. 4 may be performed a plurality of times, for one or more video frames comprised by the video stream.

In some exemplary embodiments, as exemplified by FIG. 4, determining the one or more processing channels may be based on the one or more portions of the video frame to be processed. In those embodiments, another video frame may be obtained. Additionally or alternatively, a processing channel that may be determined for a portion of the video frame to be processed. Additionally or alternatively, the processing channel may be utilized for processing a portion of the other video frame to be processed. As an example, the portion of the video frame may display an image of an object. Additionally or alternatively, the portion of the other video frame may display another image of the object. In that example, the processing channel may be utilized for processing the portion of the other video frame to be processed.

In some exemplary embodiments, it may be determined not to determine one or more objects, not to perform Step 400, or the like. In those embodiments, determining not to determine the one or more objects may be based on a plurality of activity levels being below a first activity threshold. In those embodiments, determining the one or more portions of the frame to be processed may be based on a previously determined one or more objects. In those embodiments, the producer may be configured to determine, for an object, a portion of the frame to be processed that may be larger than the image of the object as appeared in the video frame. In that manner, when utilizing a portion of the previous video frame to be processed in order to process the video frame, the image of the object may be comprised by the portion of the frame to be processed.

In some exemplary embodiments, such as for a video stream comprising a sequence of video frames, Step 400 may be performed periodically, for a portion of the video frames comprised by a sequence of video frames. Determining the one or more objects may be performed every other frame, every other two frames, or the like. In some exemplary embodiments, the producer may be configured to determine a period in which Step 400 is to be performed. Determining the period may be based on the interest level, on the activity level, on an FPS parameter associated with the capturing device, based on one or more FPS parameters associated with the one or more objects, or the like.

In some exemplary embodiments, a consumer may be configured to determine one or more consumer processing channels based on the one or more portions of the video frame to be processed. A consumer processing channel may comprise one or more sockets, one or more socket parameters, one or more decoders, one or more decoder parameters, one or more computerized processes, one or more computerized process parameters, or the like. In some exemplary embodiments, a consumer processing channel may comprise a sub cache. In those embodiments, a sub cache may be a buffer, a jitter buffer, or the like. Additionally or alternatively, the sub cache may be configured to retain one or more processed portions of the video frame. The one or more processed portions of the video frame may be comprised by a sequence of video frames. A first processed portion of the video frame may be comprised by the sub cache. Additionally or alternatively, a second processed portion of the video frame may be comprised by the cache. Additionally or alternatively, the first or second processed portions of the video frame may display images of a same object, may be associated with a same location within the sequence of video frames, or the like.

In some exemplary embodiments, the consumer may be configured to determine one or more processing channels. Determining the one or more processing channels may comprise determining a single socket. A packet comprising one or more encoded portions of a video frame may be obtained. A first encoded portion of the video frame comprised by the one or more portions of the video frame may be encoded in a first processing channel. Additionally or alternatively, a second encoded portion of the video frame comprised by the one or more portions of the video fame may be processed in a second processing channel.

Referring now to FIG. 5, showing a flowchart diagram of a method, in accordance with some exemplary embodiments of the disclosed subject matter.

On Step 500, one or more areas of activity comprised by the video frame may be determined. In some exemplary embodiments, an area of activity may comprise a portion of the video frame that changes compared to another portion of a previous frame. In those embodiments, the change may be above a threshold. In some exemplary embodiments, the area of activity may display an image of an object that may change compared to the previous video frame. In some exemplary embodiments, one or more areas of activity may be obtained. As an example, the disclosed subject matter is utilized in order to process a single video frame, one or more areas of activity may be obtained.

On Step 520, one or more portions of the video frame to be processed may be determined. In some exemplary embodiments, the one or more portions of the video frame to be processed may be one or more rectangles. In those embodiments, determining the rectangles may be based on the size of the video frame. In some exemplary embodiments, the unification of the rectangles may be identical in size and shape to the video frame. Additionally or alternatively, each two rectangles comprised by the one or more rectangles may be disjoints sets. As an example, in case that the video frame width is 640 pixels and that the video frame height is 480 pixels, 4 rectangles may be determined. A first rectangle may be represented by the coordinates (0,0,319, 119). A second rectangle may be represented by the coordinates (319,0,639,239). A third rectangle may be represented by the coordinates (0,239,319,479). A fourth rectangle may be represented by the coordinates (319,239,639, 479). In some exemplary embodiments, a portion of the video frame to be processed may be determined by cropping the video frame based on a rectangle.

In some exemplary embodiments, determining the one or more rectangles may be based on the one or more areas of activity. In those embodiments, a sequence of video frames may be obtained. Additionally or alternatively, one or more areas of activity may be determined based on differences between two one or more video frames comprised by the sequence. In those embodiments, a first sequence of video frames may be associated with a first number of areas of activity. Additionally or alternatively, a second sequence of video frames may be associated with a second number of areas of activity. The first number may be larger than the second number. Additionally or alternatively, a number of rectangles that may be determined for the first sequence may be larger than a second number of rectangles that may be determined for the second sequence.

In some exemplary embodiments, one or more objects may be determined. In those embodiments, determining the one or more objects may be based on the one or more rectangles. In some exemplary embodiments, a rectangle may be analyzed in order to detect objects therein. The rectangle may be analyzed in case that the rectangle comprises an area of activity. Additionally or alternatively, the rectangle may be analyzed in case that the rectangle is comprised by the area of activity. Additionally or alternatively, the rectangle may be analyzed in case that an activity level associated with the area of activity is above a threshold. Additionally or alternatively, another rectangle comprising another area of activity may not be analyzed. The other rectangle may not be analyzed in case that another activity level associated with the rectangle is below the threshold. In some exemplary embodiments, additional one or more rectangles may be determined based on one or more objects, based on the one or more activity levels associated with the one or more objects, based on one or more interest levels associated with the one or more objects, or the like. As an example, the video frame may comprise a first object and a second object. The first object may be associated with a still person. Additionally or alternatively, a second object may be associated with a second person. The second person may be moving. Hence, a first rectangle may comprise a portion of the video frame displaying the first person. Additionally or alternatively, 8 rectangles may be associated with the second person.

On Step 530, it may be determined if a portion of the video frame is to be processed with a high encoding or with a low encoding. Processing a portion of the video frame with a low encoding may comprise performing steps 540*a*, 550*a*, 560*a*. Additionally or alternatively, processing a portion of the video frame with a high encoding may comprise performing steps 550*b*, 560*b*. In some exemplary embodiments, encoding a portion of the video frame may yield an encoded portion of the video frame. A high encoding of a portion of the video frame may yield that more CPU may be required to encode the portion of the video frame, less memory may be required in order to retain the encoded portion of the video frame, less bandwidth may be required to provide the encoded portion, or the like, compared to a low encoded rectangle.

In some exemplary embodiments, Step 530 may be performed once for the entire video frame. Each portion of the video frame, or each rectangle, may be encoded with high encoding. Additionally or alternatively, each portion of the video frame or each rectangle may be processed with low encoding.

In some exemplary embodiments, the decision of Step 530 may be used in another video frame. In those embodiments, another portion of the other video frame, located in a same location, may be low encoded or high encoded based on the decision regarding the portion of the video frame.

On Step 540*a*, the portion of the video frame may be resized to a smaller portion of the video frame. In some exemplary embodiments, the smaller the resized portion of the frame, the less bandwidth may be required in order to transmit it, less CPU operations may be required in order to encode it, less disk space may be required in order to retain it, or the like. Additionally or alternatively, the smaller the portion of the video frame, the lower the quality in case that it may be decoded and resized back to the original size. Hence, determining a size of the smaller portion may be based on a level of interest that may be associated with the portion of the video frame, or the like. In case that the level of interest that may be associated with the object is below a threshold, the portion of the video frame may be resized to a smaller portion of the video frame.

On Step 550*a*, the smaller resized portion of the video frame may be encoded. Encoding the resized portion may utilize an encoder such as H264, H263, or the like. In some exemplary embodiments, encoding the resized portion of the video frame may be performed in an associated processing channel.

On Step 560*a*, a final operation may be performed with respect to the encoded smaller resized portion of the video frame. In some exemplary embodiments, the final operation may be performed in the associated processing channel.

On Step 550*b*, the portion of the video frame may be encoded. In some exemplary embodiments, encoding the portion of the video frame may be performed in the associated processing channel.

On Step 560*b*, a final operation may be performed with respect to the encoded portion of the video frame. In some exemplary embodiments, the final operation may be performed in the associated processing channel.

In some exemplary embodiments, processing a rectangle may comprise setting the other rectangles to a specific color. Additionally or alternatively, pixels comprised by the other rectangles may be set to a specific value. Setting the other rectangles to a specific color may yield a modified video frame. In some exemplary embodiments, the modified video frame may be resized to a smaller video frame. Additionally or alternatively, the modified video frame may be comprised by the one or more portions of the video frame to be processed. In some exemplary embodiments, the modified video frame may be encoded, provided, retained, or the like. Additionally or alternatively, the resized smaller modified video frame may be encoded, provided, retained, or the like.

It may be noted that the description of high encoding, low encoding, or the like, as described in FIG. 5 may be applied to other embodiments of the disclosed subject matter. As an example, objects may be determined and portions of the video frame may be determined based thereon. Processing one portion of the video frame to be processed may comprise high encoding. Additionally or alternatively, processing another portion of the video frame to be processed may comprise low encoding.

It may be noted that one or more embodiments of the disclosed subject matter may be applied with regards to the embodiment of FIG. 5. As an example, the margin of the video frame may be low processed, an area of low priority may be low processed or an area of high priority may be high processed, or the like.

Referring now to FIG. 6, showing a flowchart diagram of a method, in accordance with some exemplary embodiments of the disclosed subject matter.

On Step 600, one or more session description offers may be determined. In some exemplary embodiments, the one or more session description offers may be determined based on the one or more portions of the video frame, based on the one or more objects, or the like. In some exemplary embodiments, a session description offer may be based on Session Description Protocol (SDP) format. In some exemplary embodiments, a session description offer may comprise a description of a portion of the video frame. The portion of the video frame may comprise an area of importance. The area of importance may display an image of an object, an area of interest, an area of activity, or the like. In some exemplary embodiments, the session description offer may comprise a description of an expected processed portions of the video frame, a priority FPS parameter that may be associated with the portion of the video frame, or the like. In some exemplary embodiments, the excepted processed portion of the video frame may be the result of processing the portion of the video frame. The description may comprise a shape of the expected processed portion of the video frame, a dimension of the expected processed portion of the video frame, a shape of the expected portion of the video frame, a dimension of the expected portion of the video frame, a priority that may be associated with the portion of the video frame, an activity level that may be associated with the object, an interest level that may be associated with the object, a description of the object, or the like.

The description of the object may comprise a type of the object such as a person, a child, a star, or the like. Additionally or alternatively, the description of the object may comprise a color of the object. Additionally or alternatively, the description of the object may comprise an age of the object.

In some exemplary embodiments, such as the embodiments illustrated by FIG. 5, the producer may be configured to determine a session description offer for a rectangle. In those embodiments, the session description offer may comprise a dimension of the rectangle, an activity level associated with the area of activity, wherein the area of activity is associated with the rectangle, or the like. Additionally or alternatively, the session description offer may comprise information regarding high encoding or low encoding. Additionally or alternatively, in case that high encoding is utilized, the session description offer may comprises information regarding the encoding such as the encoder algorithm name, encoder parameters, or the like. Additionally or alternatively, in case that low encoding is utilized the session description offer may comprise information regarding the encoding, the dimensions of the resized smaller portion of the video frame, or the like. Additionally or alternatively, the session description offer may comprise a location of the expected portion in the expected video frame.

In some exemplary embodiments, the expected portion of the video frame may be an encoded expected portion of the video frame and may be provided to a consumer. The consumer may be configured to decode the encoded expected portion of the video frame. In order to decode the expected portion of the video frame, the consumer may utilize the shape or the dimension of the expected processed portion of the video frame or the shape or the dimension of the expected portion of the video frame to be processed. Additionally or alternatively, the consumer may utilize the dimension of the smaller portion of the video frame.

In some exemplary embodiments, a network protocol for delivering audio and video such as RTP may be utilized. In some exemplary embodiments, each packet may comprise a volatile description associated with an area of importance. A volatile description of an area of importance may change from one video frame to another video frame. In some exemplary embodiments, a volatile description may comprise a volatile location. The volatile location may be indicative to the location of a bounding shape comprising the area of importance within the video frame. In those embodiments, one or more volatile descriptions may be determined for one or more areas of importance. Additionally or alternatively, the one or more volatile descriptions may be provided with the one or more processed portions of the video frame. In some exemplary embodiments, a processed portion of the video frame may be provided without a volatile description. In those embodiments, the consumer may be configured to utilize a previously obtained volatile description. Additionally or alternatively, the previously obtained volatile description may be associated with the area of importance. In some exemplary embodiments, the volatile description may comprise an interest level associated with the area of importance. Additionally or alternatively, the volatile description may comprise an activity level associated with the area of importance. Additionally or alternatively, the volatile description may comprise a description of an object that may be displayed in the area of importance.

In some exemplary embodiments, a first volatile description may be associated with a margin of a video stream. Additionally or alternatively, the video stream may be processed. In some exemplary embodiments, processing the video stream may comprise analyzing the video stream. In some exemplary embodiments, analyzing the video stream may comprise providing one or more video frames to a computerized apparatus configured to detect objects displayed in the one or more video frames, configured to detect faces displayed by the one or more video frames, or the like. Additionally or alternatively, one or more volatile descriptions may be obtained from the computerized apparatus. Additionally or alternatively, the one or more volatile descriptions may be associated with one or more objects that may be displayed by the one or more video frames, associated with one or more faces that may be displayed by the one or more video frames, or the like.

In some exemplary embodiments, a first portion of the video frame may be provided in a first processing channel and a second portion of the video frame may be provided in a second processing channel. In those embodiments, the first processing channel may be associated with a first RTP instance and the second processing channel may be associated with a second RTP instance. A User Datagram Protocol (UDP) may be utilized in order to provide the encoded portions of the video frame. UDP may provide better throughput compared to other protocols. However, a packet may be lost, may arrive out of order, or the like. In those embodiments, a consumer may be configured to reconstruct the video frame based on a previous packet. As an example, a first packet comprising an encoded first portion may be provided to the consumer. Additionally or alternatively, a second packet comprising an encoded second portion may be provided to the consumer. The consumer may be configured to determine a reconstructed video frame based on the encoded first packet and based on the encoded second packet. Additionally or alternatively, another first packet comprising an encoded first portion of another video frame may be provided to the consumer. Additionally or alternatively, another second packet comprising an encoded second portion of the other video frame may get lost, may arrive out of order, may arrive in a delay above a threshold, or the like. The consumer may be configured to determine the reconstructed other video frame based on the other first packet and based on the second packet.

On Step 610, a message such as an INVITE message may be determined. The message may comprise a portion of the one or more session description offers. In some exemplary embodiments, the message may be generated, obtained, or the like. As an example, the message may be obtained from a SIP stack such as PJSIP, or the like.

On Step 620, the message may be provided to a consumer of the video stream.

On step 630, an acknowledgment message from the consumer may be obtained by the producer. The acknowledgment message may comprise an acknowledgment for a session description offer comprised by the one or more session description offers. In some exemplary embodiments, the consumer may be configured to acknowledge a session description offer that is associated with an object. Additionally or alternatively, the consumer may be configured not to acknowledge another session description offer associated with another object. As an example, a user of the consumer may be a little girl. The age of the user may be comprised by the consumer context information. The consumer may be configured to acknowledge the session description offer that may be associated with a person. Additionally or alternatively, the other session description offer may be associated with a nude person, the consumer may be configured not to acknowledge the other session description offer.

In some exemplary embodiments, based on one or more obtained session description offers, the consumer may be configured to determine one or more consumer processing channels. In those embodiments, the consumer may be configured to allocate a consumer processing channel per acknowledged session description offer.

On Step 640, one or more portions of the video frame to be processed may be determined based on the one or more acknowledged objects. An object may be considered as acknowledged if the acknowledgment message comprises an acknowledgment for the session description offer that may be associated with the object. In case that an object is acknowledged, determining an associated portion of the video frame to be processed may be performed in a similar manner to Step 230 of FIG. 2. On Step 643, the one or more portions of the video frame to be processed may be processed. In some exemplary embodiments, step 240 of FIG. 2 may be performed a plurality of times for the one or more portions of the video frame to be processed.

On Step 645, the one or more processed portions of the video frame may be provided to the consumer.

On Step 650, another video frame may be obtained.

On Step 660, another one or more objects displayed in the video frame may be determined. Determining the other one or more objects may be performed in a similar manner to Step 400 of FIG. 4. In some exemplary embodiments, the one or more objects may comprise a number of objects. Additionally or alternatively, the other one or more objects may comprise another number of objects. Additionally or alternatively, one object comprised by the one or more objects may be different from another object comprised by the another one or more objects.

On Step 670, the message may be re-determined. In some exemplary embodiments, re-determining the message may comprise generating another message. In some exemplary embodiments, utilizing SIP, the other message may be a RE-INVITE message. Additionally or alternatively, the RE-INVITE message may comprise one or more SDP media offer. In some exemplary embodiments, generating the other message may comprise generating another one or more session description offers to describe one or more expected processed portions of the video frame. As an example, in case that the video frame is comprised by a video stream of a Tennis match, the video frame may show one player and the other video frame may show the entire Tennis court, including another player. In that case, the producer may be configured to determine one or more session description offers for the video frame and another one or more session description offers for the other video frame. Additionally or alternatively, the producer may be configured to provide to the consumer a message for the video frame and to provide to the consumer another message for the other video frame.

In some exemplary embodiments, the other message may be provided to a consumer as illustrated in Step 620.

In some exemplary embodiments, Step 600 or Step 660 may comprise determining one or more areas of activity comprised by the video frame instead of one or more objects. Based on the one or more areas of activity, one or more session description offers may be determined. In those embodiments, a session description offer associated with an area of activity may comprise a description of the area of acidity. In those embodiments, the description may comprise a location of the area of activity, a shape of the area of acidity, dimensions of the shape of the area of activity, an activity level that may be associated with the area of activity, or the like.

In some exemplary embodiments, one or more areas of importance comprised by a video frame may be determined. An area of importance comprised by the one or more areas of importance may be an area of activity, an area of interest, may display a portion of one or more objects, or the like. The producer may be configured to determine one or more portions of the video frame to be processed based on the one or more areas of importance. In those embodiments, the producer may be configured to determine one or more portions of the video frame, each of which may be associated with an area of importance. Additionally or alternatively, the producer may be configured to determine the message based on the areas of importance. The message may comprise one or more session description offers. A session description offer may comprise a description of an area of importance. The description may comprise a shape of the area of importance, dimension of the area of importance, description of an object displayed by the area of importance, or the like. As an example, in case that the area of importance is a circular bounding shape displaying a person, the description may comprise the center of the circle, the radius of the circle, a name of the person displayed in the circle, or the like. In some exemplary embodiments, an expected processed portion of the video frame may refer to an expected result of encoding the portion of the video frame. In those embodiments, the description may comprise a shape or dimensions of the expected processed portion of the video frame.

In some exemplary embodiments, the message may be provided to a consumer. Additionally or alternatively, the consumer may be configured to determine an acknowledgment for the message. The acknowledgment may comprise a first acknowledgment for the session description offer. The consumer may be configured to provide the acknowledgment to the producer. Additionally or alternatively, the producer may be configured to obtain the acknowledgment from the consumer. In some exemplary embodiments, the producer may determine one or more portions of the video frame to be processed based on the acknowledgment. In those embodiments, the producer may be configured to determine that the portion of the video frame is a portion of the video frame to be processed. Additionally or alternatively, the producer may be configured to process the portion of the video frame to be processed.

In some exemplary embodiments, another video frame may be obtained. The producer may be configured to determine one or more portions of the other video frame to be processed. Determining the one or more portions of the other video frame to be processed may comprise determining one or more portions of the other video frame. The one or more portions of the other video frame may comprise a portion of the other video frame and a second portion of the other video frame. Additionally or alternatively, a portion of the other video frame may be associated with the portion of the video frame to be processed. In those embodiments, the portion of the video frame to be processed and the portion of the other video frame may be located in a same location, may display a same object, or the like. In some exemplary embodiments, the producer may be configured to determine another message. The other message may comprise another first description offer describing the portion of the other video frame. Additionally or alternatively, the other message may comprise a second session description offer describing the second portion of the other video frame. Additionally or alternatively, the producer may be configured to provide the other message to the consumer. Additionally or alternatively, the consumer may be configured to determine another acknowledgment. The other acknowledgment may comprise another first acknowledgment for the portion of the other video frame. Additionally or alternatively, the consumer may be configured to provide the other acknowledgment to the producer. Additionally or alternatively, the producer may be configured to obtain the other acknowledgment from the consumer. Additionally or alternatively, the producer may be configured to determine one or more portions of the other video frame to be processed. In those embodiments, the producer may be configured to determine, based on the other first acknowledgment, to process the portion of the other video frame. Additionally or alternatively, the producer may be configured to exclude the second portion of the video frame from the one or more portions of the video frame to be processed.

In some exemplary embodiments, the producer may be configured to determine another one or more areas of importance comprised by the other video frame. In some exemplary embodiments, a number of areas of importance comprised by the video frame may be larger than another number of another areas of importance comprised by another video frame. As an example, the number of objects displayed in the video frame may be larger than the other number of the other objects displayed in the other video frame. In those embodiments, the producer may be configured to determine and provide to the consumer another message comprising session description offers associated with the other one or more objects, with the other one or more areas of importance, or the like.

It may be noticed, that the disclosed subject matter may not be limited to SIP, SDP, RTP, or the like. The disclosed subject matter may be utilized in an H.323 setup comprising H.255, H.245, or the like. Additionally or alternatively, other proprietary signaling media protocols may utilize the disclosed subject matter. Additionally or alternatively, other media streaming protocols may be utilized by the disclosed subject matter.

In some exemplary embodiments, the producer or the consumer may be configured to enforce an age restriction regarding a viewer of the video stream, a content restriction, a privacy restriction, or the like. In those embodiments, a description comprised by a session description offer may comprise textual information such as "a person", "a car", or the like. Additionally or alternatively, the description may comprise information such as "restricted content", "sexual content", or the like. Additionally or alternatively, the session description offer may comprise a non-textual information such as the age restriction that may be associated with one or more bit locations in the session description offer. Additionally or alternatively, the session description offer may comprise a description comprising a numerical value indicating the level of violence that may be associated with the object, a numerical value indicating the level of sexual activity that may be associated with the object, or the like. Additionally or alternatively, the session description offer may comprise a description comprising a numerical value indicating a minimal age that may be recommended for viewing the object. As an example, a numerical value of 10 may indicate that the object may be recommended for viewing by users above the age of 10. As another example a numerical value of 18 may indicate that the content that may be associated with the object may be recommended to view for users above the age of 18. In those embodiments, the consumer may be configured to acknowledge a session description offer that is not comprising an age restricted description. Additionally or alternatively, the consumer may be configured to obtain an age of the user based on the context information and to acknowledge a session description offer that may be in line with the age of the user.

In some exemplary embodiments, the producer may be configured to detect a change in an age restriction that may be associated with an object, to detect changes in a privacy restriction that may be associated with the object, or the like.

As an example, the video stream may comprise one or more images of a dog running with a person. The producer may be configured to determine two session description offers. A first session description offer may comprise a description of expected images displaying the dog and a second session description offer may comprise a description of expected images displaying the person. Additionally or alternatively, the producer may be configured to determine a message comprising the two session description offers. Additionally or alternatively, the producer may provide the message to the consumer. Additionally or alternatively, the consumer may obtain the message. Additionally or alternatively, the consumer may determine an acknowledgment message. The acknowledgement message may comprise an acknowledgment for the first session description offer and an acknowledgment for the second session description offer. Additionally or alternatively, the consumer may provide the acknowledgment message to the producer. Additionally or alternatively, the producer may obtain the acknowledgment. Additionally or alternatively, the producer may provide to the consumer one or more processed portions of the video frame. Additionally or alternatively, a first portion of the video frame may comprise a representation of the dog. Additionally or alternatively, a second processed portion of the video frame may comprise a representation of the person. In case that the dog is hit by a car the, the producer may be configured to determine a new session description offer comprising a description of expected images displaying the dog.

The new session description offer may comprise an age restriction. Additionally or alternatively, the producer may be configured to determine another message comprising the new session description and to provide the other message to the consumer. Additionally or alternatively, the consumer may be configured to acknowledge the other message without acknowledging the new session description offer associated with the wounded dog. Upon obtaining the acknowledgment message from the consumer, the producer may be configured to omit a portion of the video frame displaying the object associated with the wounded dog, to blur the portion of the video frame displaying the wounded dog, or the like.

In some exemplary embodiments, an acknowledgment for an object may comprise a request to the producer to blur a portion of the video frame displaying the object. As an example, the producer may be requested to blur the portion of the video frame displaying the wounded dog, or the like.

In some exemplary embodiments, a consumer may be configured, for privacy's sake, to hide an age of a user, to hide preference of the user, or the like. In those embodiments, the consumer may be configured to acknowledge an object. Additionally or alternatively, upon obtaining an expected portion of the video frame, associated with the object, the consumer may be configured not to process the expected portion of the video frame. Additionally or alternatively, the consumer may be configured to blur the expected processed portion of the video frame. Referring again to the above girl and dog example, the consumer may be configured to acknowledge the expected processed portion of the video frame associated with the wounded dog. Additionally or alternatively, the consumer may be configured to omit a portion of the video frame displaying the wounded dog while generating the reconstructed frame. Additionally or alternatively, the consumer may be configured to blur a portion of the video frame displaying the dog while generating the reconstructed video frame.

In some exemplary embodiments, the producer may be configured to determine a priority FPS parameter for an object. The object may be associated with an activity level. A person associated with the object may be still, yielding a low priority FPS parameter compared to a priority FPS parameter that may be associated with the sensor. During the streaming of the video stream, the person may stand, start walking, or the like, yielding a new activity level that may be higher than the activity level. The new activity level may yield that the producer may be configured to determine a new priority FPS parameter for the object. The producer may be configured to determine a new message comprising the new FPS parameter, the new activity level, or the like. The new message may be provided to the consumer. The consumer may update timing events, decoding parameters, or the like. In some exemplary embodiments, the consumer may be configured to obtain one or more processed portions of the video frame.

In some exemplary embodiments, the consumer may be configured to hold a cache. The cache may comprise a portion of the obtained portions of the video frame. In some exemplary embodiments, the cache may be implemented as a jitter buffer, or the like. In case that the activity level changed, the content of the cache may not be relevant. The producer may be configured to provide to the consumer an urgent message. The consumer may be configured to obtain the urgent message. The consumer may be configured to clear the cache in response to obtaining the urgent message. In some exemplary embodiments, the consumer cache may comprise one or more sub caches. A sub cache comprised by the one or more sub caches may be associated with an object. Additionally or alternatively, the sub cache may be associated with the margin. In those embodiments, the producer may be configured to add to the urgent message an identifier. The consumer may be configured to clear the sub cache that may be associated with the object or with the margin in response to obtaining an urgent message comprising the identifier. In some exemplary embodiments, a sub cache may be implemented as a jitter buffer. In those embodiments, each object or the margin that may be displayed by the frame and provided to the consumer may be associated with a sub cache.

As an example, the video stream may display a movie. In case that a scene has changed, the determined objects may be un relevant. As a result, the cache of the consumer may be un relevant. In some exemplary embodiments, the urgent message may comprise a video frame comprised by the second scene. In those embodiments, the producer may be configured to obtain one or more video frames comprised by the second scene in order to determine one or more areas of importance, one or more activity levels, one or more objects displayed in the one or more video frames of the second scene, or the like. Additionally or alternatively, the producer may be configured to obtain one or more video frames comprised by the other scene in order to determine a path of an object displayed in the other scene. In those embodiments, the one or more portions of a video frame comprised by the second scene may be the video frame. Processing the video frame may comprise encoding the video frame. Additionally or alternatively, the encoded video frame may be provided to a user, may be retained, or the like. In some exemplary embodiments, in case that one or more areas of importance are determined, the producer may be configured to obtain another video frame comprised by the second scene or to determine one or more portions of the other video frame to be processed.

In some exemplary embodiments, a person may wish to remove her images from a video stream. The video stream provider may be under a privacy regulation such as GDPR or the like. Additionally or alternatively, the provider may be forced to grant to the person's wish. Additionally or alternatively, the video stream may comprise images comprising narcotics, images comprising sensitive security information, or the like. The video stream provider may be forced to remove those images. In those embodiments, in case that the video stream is provided online, the producer may be configured to detect and to blur, to detect and exclude, or the like, such images instead of stopping the video stream. Additionally or alternatively, in case that the video stream is statically provided such as for downloading or in a VOD service, the producer may be configured to detect and to blur, to detect and exclude, or the like, such images instead of re-editing the video stream.

In the disclosed subject matter, a media stream may comprise an audio stream, a video stream or a combination thereof. Additionally or alternatively, media may refer to video, audio, or the like.

In some exemplary embodiments, the producer may be configured to process a multi-source media stream. The multi-source media stream may comprise one or more media streams. A first media stream, comprised by the one or more media streams may have originated from a first media source such as a first camera, a first microphone, a first file, a first URL, or the like. Additionally or alternatively, a second media stream, comprised by the one or more media streams may have originated from a second media source such as a second camera, a second microphone, a second file, a second URL, or the like.

As an example, the multi-sources media stream may comprise a first media stream of audio of a singer. Additionally or alternatively, the multi-sources media stream may comprise a second media stream of audio of a musical instrument. Additionally or alternatively, the multi-sources media stream may comprise a third media stream of video of the singer. Additionally or alternatively, the multi-sources media stream may comprise a fourth media stream of video of a musician playing the musical instrument. A user, such as an editor, may be able to watch and hear the singer, the musical instrument, the musician playing the musical instrument, or the like. Additionally or alternatively, the singer may be able to watch and hear the musician, the editor or the like. Additionally or alternatively, a consumer may be utilized by an editing software, by an online studio, or the like. The editing software may be configured to utilize a consumer with accordance to the disclosed subject matter. The editing software may allow the user to edit, to save, to play different streams separately. Additionally or alternatively, in order to save bandwidth while rehearsing, the producer may be configured to reduce the size of a media stream associated with the singer while the musician is performing a solo by the musical instrument. Additionally or alternatively, a producer, such as a producer producing the singer's audio or the singer's video may be configured to produce an HD audio stream of the singer.

Referring now to FIG. 7 showing an illustration of a sequence of video frames of an object, in accordance with some exemplary embodiments of the disclosed subject matter.

Video Frame 700a may display Face Image 710a. Face Image 710a may be associated with an object. The object may be a person, a face of a person, or the like. Face Image 710a may comprise Mouth 720a. Minimal Bounding Shape 730a may be a minimal rectangle comprising Face Image 710a.

Video Frame 700b may display Face Image 710b. Face Image 710b may be associated with the object. Face Image 710b may comprise Mouth 720b. Minimal Bounding Shape 730b may be a minimal rectangle comprising Face Image 710b.

Video Frame 700c may display Face Image 710c. Face Image 710c may be associated with the object. Face Image 710c may comprise Mouth 720c. Minimal Bounding Shape 730c may be a minimal rectangle comprising Face Image 710c.

Video Frame 700a, 700b and 700c, may be a sequence of video frames. Face Image 710a, 710b and 710c may be the results of captures by a sensor of a person at different times. In some exemplary embodiments, between each capture, a time may elapse. The time may be 20, milliseconds, 25 milliseconds, 50 milliseconds, 100 milliseconds, or the like.

As can be seen, the object may change in the sequence. An activity level for the object may be calculated based on Minimal Bounding Shape 730a, Minimal Bounding 730b or Minimal Bounding 730c. The activity level may be calculated by determining an average difference between a first difference and a second difference. The first difference may be the difference between Minimal Bound Shape 730a and Minimal Bounding 730b. The second difference may be the difference between Minimal Bounding Shape 730b and Minimal Bounding 730c. In some cases, there may be more than one object. For each object, an activity level may be determined separately. Additionally or alternatively, for each bounding shape an activity level may be determined separately.

In some exemplary embodiments, the sequence of video frames may comprise video frames 700a and 700b. In those embodiments, a sequence of portions of the sequence of video frames, may be determined. A portion comprised by the sequence of portions may be a portion to be processed. In some exemplary embodiments, each portion may be associated with a same area of interest. In some exemplary embodiments, the area of interest may be determined based on areas of importance. An area of interest may be an area in a video frame. Additionally or alternatively, the area of impotence may be important to a user. The area of importance may be an area of activity, an area of interest, may comprise a portion of an object, one or more portions of one or more objects, or the like. Additionally or alternatively, each portion comprised by the sequence of portions may be associated with a same location in the video frames. As an example, the area of importance may display a same object. The same object may be a person displayed in FIG. 7. In this example, Minimal Bounding Shape 730a may be a first portion of the video frame to be processed. Additionally or alternatively, Minimal Bounding Shape 730b may be a second portion of the video frame to be processed. The sequence of portions of the sequence of video frames to be processed may comprise the first and second portions of the video frames to be processed. As can be seen, each portion comprised by the sequence is displaying an image of the person. In some exemplary embodiments, one or more processing channels may be determined. In some exemplary embodiments, processing the one or more video frames may utilize the one or more processing channels. In the example of FIG. 7, Minimal Bounding shape 730a and Minimal Bounding Shape 730b may be processed by utilizing a processing channel comprised by the one or more processing channels.

In some exemplary embodiments, another video frame may be obtained. Processing the other video frame may be based on the one or more sequence of portions of the video frame the sequence of video frames to be processed. In some exemplary embodiments, processing the other video frame may comprise determining one or more portions of the other video frame to be processed. In the example of FIG. 7, the other video frame may be Video Frame 700c. A portion of Video Frame 700c to be processed may be Minimal Bounding Shape 730c. Minimal Bounding Shape 730c may be processed in the processing channel as Minimal Bounding Shape 730c may display an image of the same object. In some exemplary embodiments, another object (not shown), may be displayed in Video Frame 700c. In those embodiments, another processing channel may be determined. Additionally or alternatively, a portion of Video Frame 700c displaying the other object may be processed by utilizing the other processing channel.

In some exemplary embodiments, Minimal Bounding Shapes 730a, Minimal Bounding Shape 730b and Minimal Bounding Shape 730c may be a same bounding shape. In those embodiments, the three minimal bounding shapes may be associated with a same location within the video frames, may be of a same width, of a same height, of a same dimensions, or the like.

In some exemplary embodiments, a sequence may be determined based on a location within the video frames. As an example, the sequence of low priority may be determined. In the example of FIG. 7, the sequence of low priority may comprise the complement of Minimal Bounding Shape 730a in Video Frame 700a. Additionally or alternatively, the sequence of low priority may comprise the complement of Minimal Bounding Shape 730b in Video Frame 700b. In some exemplary embodiments, another processing channel may be utilized in order to process the sequence of low activity thereby.

In some exemplary embodiments, a priority FPS parameter may be determined. In some exemplary embodiments, the priority FPS parameter may be associated with a processing channel. In those embodiments, determining one or more processing channels may comprise determining one or more FPS parameters. Based on the FPS parameter, a portion of the video frame may be excluded from portions of the video frame to be processed. In some exemplary embodiments, processing a sequence of portions may comprise excluding a portion from being processed. Excluding a portion may yield a smaller bandwidth consumption compared to not excluding the portion. Additionally or alternatively, excluding the portion may yield less required hardware resources compared to not excluding the portion. As an example, Minimal Bounding Shape 730a may be comprised by the portions of the Video Frame 700a to be processed. Additionally or alternatively, Minimal Bounding Shape 730b may be excluded from the portions of the Video Frame 700b to be processed. Additionally or alternatively, Minimal Bounding Shape 730c may be comprised by the portions of the Video Frame 700c to be processed.

Figure 8:
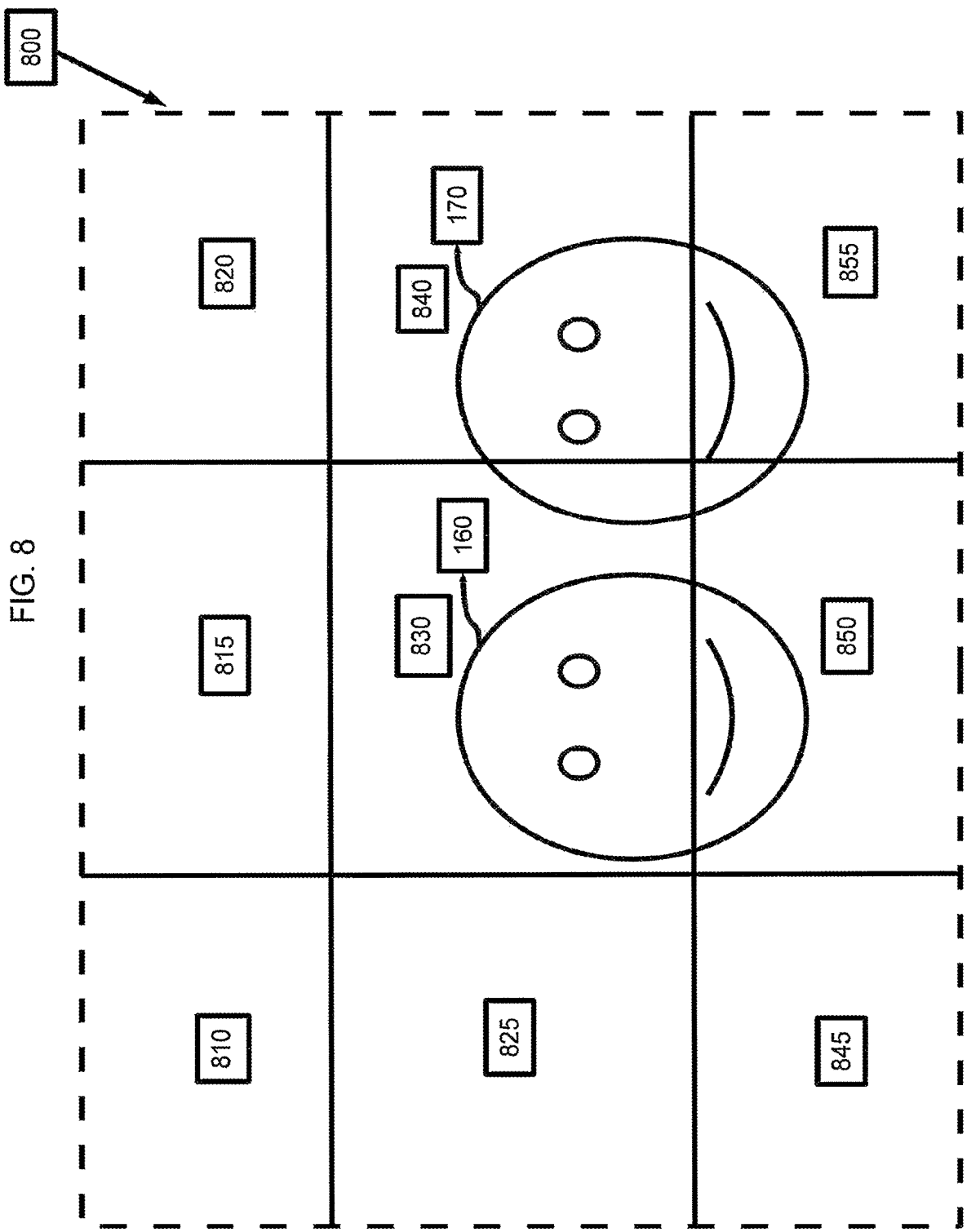

Referring now to FIG. 8 showing an illustration of one or more portions comprising a video frame, in accordance with some exemplary embodiments of the disclosed subject matter. In those embodiments, the one or more portions of the video frame may be one or more rectangles.

Video Frame 800 may comprise Object 160 and Object 170.

In some exemplary embodiments, Rectangle 810, Rectangle 815, Rectangle 820, Rectangle 825, Rectangle 830, Rectangle 840, Rectangle 845, Rectangle 850 and Rectangle 855 may comprise Video Frame 800. In those embodiments, a producer may provide each rectangle in a different processing channel.

As can be seen Rectangle 810, Rectangle 815, Rectangle 820, Rectangle 825 and Rectangle 845 display no object. In some exemplary embodiments, Rectangle 810, Rectangle 815, Rectangle 820, Rectangle 825 and Rectangle 845 may be low processed. Additionally or alternatively, Rectangle 830, Rectangle 840, Rectangle 850 and Rectangle 855 may be high processed as they comprise a portion of an image of an object.

In some exemplary embodiments, processing Rectangle 810, Rectangle 815, Rectangle 820, Rectangle 825 and Rectangle 845 may comprise utilizing a first encoder Additionally or alternatively, processing Rectangle 830, Rectangle 840, Rectangle 850 and Rectangle 855 may comprise a second encoder. As an example, a first encoder may be determined by applying a first encoder parameter. Applying the first encoder parameter on the first encoder may yield that the first encoder is configured to perform two passes on an input video frame. Additionally or alternatively, a second encoder may be determined. The first encoder may be utilized for encoding Rectangle 830, Rectangle 840, Rectangle 850 and Rectangle 855. Additionally or alternatively, the second encoder may be utilized for encoding Rectangle 810, Rectangle 815, Rectangle 820, Rectangle 825 and Rectangle 845. Additionally or alternatively, four instances of the first encoder may be determined, each of which may be utilized to encode one of the rectangles 830, 840, 850, 855. Additionally or alternatively, five instances of the second encoder may be determined, each of which may be utilized for encoding one of the rectangles 810, 815, 820, 825, 845. It may be noted that performing two passes on the entire video frame may take too long, may require hardware resources that may not be available, or the like.

In some exemplary embodiments, in case that the video frame comprised by a sequence of video frames, another video frame comprised by sequence may be obtained. The producer may be configured to determine a portion of the other video frame based on the portion of the video frame. In the example of FIG. 8, the producer may be configured to determine that Rectangle 810, Rectangle 815, Rectangle 820, Rectangle 825, Rectangle 830, Rectangle 840, Rectangle 845, Rectangle 850 and Rectangle 855 may be portions of the other video frame. Additionally or alternatively, the producer may be configured to determine to exclude Rectangle 810, Rectangle 815, Rectangle 820, Rectangle 825 and Rectangle 845 from the portion of the other video frame to be processed.

Figure 9:
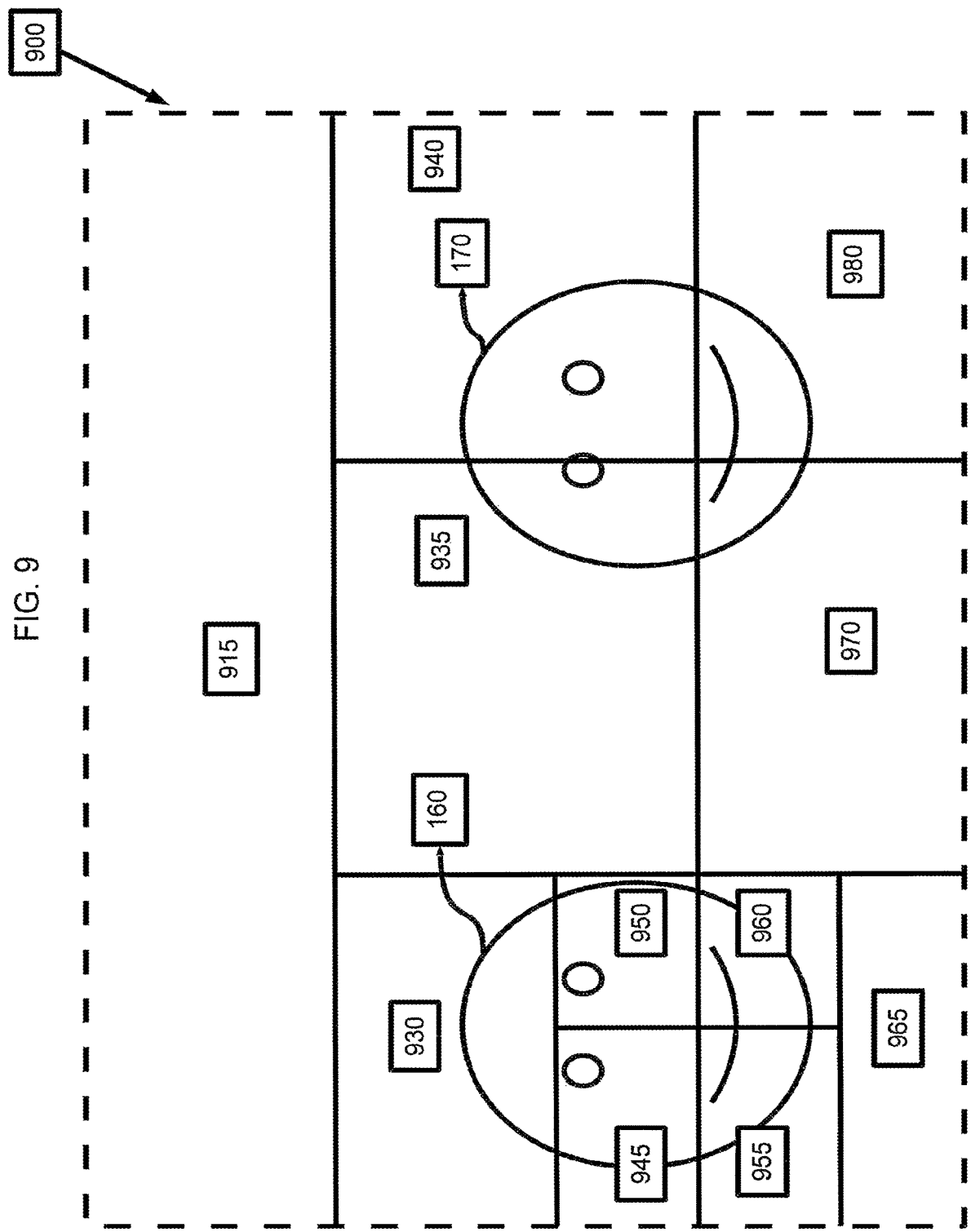

Referring now to FIG. 9 showing an illustration of rectangles slicing a video frame, in accordance with some exemplary embodiments of the disclosed subject matter.

Video Frame 900 may comprise Object 160 and Object 170. In that example, Object 160 may be associated with a higher interest level than Object 170. Additionally or alternatively, Object 160 may be associated with a higher activity level than Object 170.

In the illustrated embodiment, the producer may be configured to determine one or more rectangles based on the interest level of each object, based on the activity level of each object, based on a context information associated with the video stream, or the like.

As can be seen, Rectangle 915 comprises no object. Hence, Rectangle 915 may have a larger area compared to other rectangles determined by the producer.

As can be seen, Object 160 may be associated with 5 rectangles. In the illustrated embodiment, as eyes or a mouth of a person may move more rapidly compared to a person's forehead, Rectangle 945 may comprise the left eye of the person, Rectangle 950 may comprise the right eye of the person, Rectangle 955 and Rectangle 960 may comprise a portion of the mouth of the person. Additionally or alternatively, one rectangle, Rectangle 930 may comprise the person's forehead.

As can be seen, Rectangle 915 and Rectangle 965 comprise no object. In some exemplary embodiments, Rectangle 915 and Rectangle 965 may be low processed. Additionally or alternatively, Rectangle 930, Rectangle 935, Rectangle 940, Rectangle 945, Rectangle 950 Rectangle 955, and Rectangle 960 may be high processed as they comprise a portion of an image of an object.

In some exemplary embodiments, the producer may be configured to determine a rectangle of a width that is a product of 4. Additionally or alternatively, the producer may be configured to determine that a height of the rectangle is a product of 4. As an example, the rectangle may be 4×4 pixels, 8×8 pixels, 16×16 pixels, or the like. The width and height of the rectangle may be measured in pixels. Additionally or alternatively, the width and the height may be a product of 16. As an example, the rectangle may be 16×16 pixels, 32×32 pixels, or the like.

In some exemplary embodiments, a computerized apparatus may be configured to perform the steps of FIG. 2, of FIG. 3, of FIG. 4, of FIG. 5, of FIG. 6, or a combination thereof. In some exemplary embodiments the computerized apparatus may be a server, a cloud server, or the like.

In some exemplary embodiments, a computerized apparatus may be configured to determine one or more instances in order to scale the processing of one or more video frames. In some exemplary embodiments, an instance comprised by the one or more instances may be the computerized apparatus, another computerized apparatus, or the like. In some exemplary embodiments, an instance may be associated with one or more hardware capabilities. A hardware capability may comprise a number of one or more CPUs that may be utilized by the instance, a number of cores of a CPU, a clock rate of the CPU, or the like. Additionally or alternatively, the hardware capability may comprise a number of one or more Graphics Processing Units (GPU) that may be utilized by the instance, a number of cores of a GPU comprised by the one or more GPUs, a clock rate of the GPU, or the like. Additionally or alternatively, the hardware capability may comprise one or more characteristics of a RAM that may be utilized by the instance, bandwidth limitations that may be set upon an instance, or the like. In some exemplary embodiments, the computerized apparatus may be configured to obtain a context information. Additionally or alternatively, the computerized apparatus may be configured to determine the one or more instances based on the context information. In some exemplary embodiments, given the context information, the computerized apparatus may be configured to determine a configuration based on the context information. The configuration may comprise a number of instances and one or more hardware capabilities associated with the one or more instances. As an example, a video stream may display an NBA match, requiring a large amount of RAM, CPUs, or the like, compared to an online meeting. The context information may comprise fields such as "NBA", "online", or the like. Based on the context information, the computerized apparatus may be configured to determine a configuration to enable streaming the video stream. In some exemplary embodiments, the context information may be obtained periodically. In those embodiments, the context information may be updated in response to a change of a latency, in response to a consumer that may be connecting, in response to the consumer that may be disconnecting, in response to one or more changes in the one or more priorities, wherein a change is above a threshold, or the like.

In some exemplary embodiments, determining the one or more processing channels may comprise determining the one or more instances. In those embodiments, a processing channel may be associated with a portion of the one or more instances. In those embodiments, processing a portion of the video frame by utilizing the processing channel may comprise processing the video frame on the instance.

Additionally or alternatively, the video stream may be provided to a large number of consumers such as 100, 100,000, 1 million, 10 million, or the like. In some cases, users of the one or more consumers may be distributed geographically. The context information may comprise the number of users and the geographical distribution of the consumers. The computerized apparatus may be configured to determine a configuration that may enable the video stream. In some cases, a first portion of the users may be located in North America and a second portion of the consumers may be located in Europe. In those embodiments, the configuration may comprise a geographical distribution of the one or more instances. Additionally or alternatively, the configuration may comprise one or more computerized apparatuses. As an example, the computerized apparatus may be configured to determine a first portion of the one or more instances to be located in North America. Additionally or alternatively, the computerized apparatus may be configured to determine another portion of the one or more instances to be located in Europe.

In some exemplary embodiments, the context information may comprise an indication that the video stream is to be retained for future downloads. The computerized apparatus may be configured to determine one or more instances in order to minimize the processing time, to minimize the costs of the one or more instances, or the like. As an example, the disclosed subject matter may be utilized in order to prepare a movie to be streamed in as a VOD content, as a VR content, or the like. In case that preparing the content is cost sensitive, the producer may be configured to determine a configuration comprising a number of instances below a threshold. Additionally or alternatively, the configuration may comprise a hardware capability. The hardware capability may comprise a combination of CPU, memory capacity, storage capacity, networking capacity, or the like. Additionally or alternatively, the computerized apparatus may be configured to determine a weak one or more instances, or the like. In some exemplary embodiments, a weak instance may be associated with a number of CPUs below a threshold, with a memory capacity below a threshold, with a storage capacity below a threshold, with a network capacity below a threshold may be a weak capacity. Additionally or alternatively, in case that preparing the movie is time sensitive, the producer may be configured to determine a number of instances above another threshold, to determine strong instances, or the like. In some exemplary embodiments, a strong instance may be an instance with capacities above a threshold.

In some exemplary embodiments, the computerized apparatus may be configured to determine a portion of the context information. As an example, the computerized apparatus may be configured to determine a number of one or more consumers consuming the video stream, to measure one or more latencies between the one or more instances and the one or more consumers, between the computerized apparatus and the one or more consumers, or the like.

In some exemplary embodiments, the computerized apparatus may be configured to determine the one or more instances based on the one or more objects. As an example, in case that a number of the one or more objects is above a threshold, more instances may be required in order to process a video frame compared to another video frame comprising another number of another one or more objects, wherein the other number is smaller than the threshold. Additionally or alternatively, stronger instances may be required in order to processes the video frame compared to the other video frame. In some exemplary embodiments, the computerized apparatus may be configured to determine one or more instances based on one or more interest levels, based on one or more activity levels, based on one or more objects displayed in the video frame, or the like. Hence, the producer may be configured to determine, indirectly, the one or more instances based on the one or more portions of the video frame, on the one or more portions of the video frame to be processed, or the like.

In some exemplary embodiments, the computerized apparatus may be configured to determine the one or more instances based on the one or more interest levels, based on the one or more interest thresholds, or the like. As an example, a video frame may comprise a number of objects above a threshold. Additionally or alternatively, only one object may be associated with an interest level above an interest threshold. In those embodiments, the computerized apparatus may be configured to determine a first number of instances. Additionally or alternatively, another video frame may comprise another one or more objects. In that case, only one object may be associated with an interest level that is smaller than an interest threshold. Additionally or alternatively, all other objects comprised by the other one or more objects may be associated with an interest level that may be larger than an interest threshold. In that case, the computerized apparatus may be configured to determine another number of objects. In those embodiments, the number of instances may be smaller than the other number of instances.

In some exemplary embodiments, the computerized apparatus may be configured to determine the one or more instances based on the one or more activity levels, based on the one or more activity thresholds, or the like. As an example, a video frame may comprise a number of objects above a threshold. Additionally or alternatively, only one object may be associated with an activity level above an activity threshold. In those embodiments, the computerized apparatus may be configured to determine a first number of instances. Additionally or alternatively, in another case, another video frame may comprise another one or more objects. In that case, only one object may be associated with an activity level that is smaller than an activity threshold. Additionally or alternatively, all other objects comprised by the other one or more objects may be associated with an activity level that may be larger than the activity threshold. In that case, the computerized apparatus may be configured to determine another number of instances. In those embodiments, the number of instances may be smaller than the other number of instances.

In some exemplary embodiments, the computerized apparatus may be configured to obtain a context information from one or more consumers. The context information may comprise the one or more consumer context information. The computerized apparatus may be configured to determine a number of instances based on the one or more consumer context information, to determine a required hardware capability that may be associated with the one or more instances, or the like. As an example, in one case, a portion of the one or more consumers may be utilizing a small screen as a rendering device. In another case, the portion of the one or more consumers may utilize a large screen as the rendering device. In both cases, the size of the rendering device may be comprised by the consumer context information and provided to the computerized apparatus. In the first case, less instances may be determined compared to the second case. Additionally or alternatively, in the first case, the required one or more hardware capabilities of an instance may be weaker than one or more required hardware capabilities of the second case, or the like.

In some exemplary embodiments, the computerized apparatus may be configured to determine one or more instances based on the one or more portion of the video frame. Each instance may be associated with a portions of the video frame. As an example, in case that the video frame is a large frame such as 4K frame, 8K frame, or the like, more than one instance may be required in order to determine portions of the video frame to be processed, to process the one or more portions of the video frame to be processed, or the like.

In some exemplary embodiments, a camera application, such as a smartphone camera application, may be configured to obtain one or more video frames or may be configured to stream the one or more video frames to a user. In case that the user presses a button, touches the screen, or the like, a video frame may be retained on a local medium, on a remote medium, attached to a message, or the like. In those embodiments, a producer may be operatively coupled with the camera application. The producer may be configured to perform the Steps of FIG. 2, FIG. 2B, FIG. 3A, FIG. 3B, FIG. 4, FIG. 5, or FIG. 6. Additionally or alternatively, another video frame may be retained in response to obtaining an input from a user. In some cases, the producer may stream the one or more video frames to a consumer and the consumer may be configured to retain a video frame upon the user press of the button, touch in the screen, or the like.

In some exemplary embodiments, a VR/AR provider may utilize the disclosed subject matter in order to provide a VR content. In those embodiments, an overlay may be added to an obtained video frame. The overly may be provided as an object, as an area of importance, or the like. As an example, an AR/VR application may be configured to add a description to items displayed by the obtained video frame. The description may be provided with a location to the producer. Additionally or alternatively, the producer may be configured to determine a processing channel to the overlay. Additionally or alternatively, the overlay may be comprised by the portions of the video frame to be processed. As an example, the AR/VR application may be configured to add one or more images of one or more people to one or more images of a room in a streaming application. The consumer may be configured to obtain one or more images of the one or more people in one or more consumer processing channels.

Referring to FIG. 11, showing a flow chart of a method in accordance with the disclosed subject matter.

On Step 1100, a video frame may be obtained. The video frame may be obtained from a light sensor, such as a camera of a smartphone, a webcam of a laptop, a virtual camera installed on a computerized device, a laser scanning system, a street camera, or the like.

On Step 1120, one or more areas of interest of the video frame may be determined. In some exemplary embodiments, determining the areas of interest of the video frame may comprise detecting one or more objects displayed in the video frame. In those embodiments, an area of interest of the video frame may display an object, may display a portion of an image of an object, or the like.

In some exemplary embodiments, a user information may be obtained. The user information may comprise data regarding one or more users using one or more computerized devices. A computerized device may utilize the disclosed subject matter. Additionally or alternatively, the user information may comprise context information, may comprise user context information, or the like. As an example, the disclosed subject matter may be utilized by a video chat application. In those embodiments, the user may be a person using a computerized device. A computerized device may be configured to receive one or more encoded video frames, decode the one or more encoded video frames, construct one or more alternative video frames and to display the one or more constructed video frames to the user. An encoded video frame comprised by the one or more encoded video frames may comprised one or more processed portions of the video frame. In those embodiments, determining the portions of the video frame to be processed may be based on the user context information. The user information may comprise data regarding the user's preferences, the user's interests, or the like.

In some exemplary embodiments, one or more points of gaze of one or more users may be obtained. In those embodiments, the user information may comprise a point of gaze comprised by the one or more points of gaze. As an example, the disclosed subject matter may be utilized by a Virtual Reality (VR) application, by an Augmented Reality (AR) application, or the like. The application may be configured to provide to a user a 360 degrees view of a room. In case that the user is looking at the door, the door and the surrounding of the door may be associated with high priority.

In some exemplary embodiments, the video frame may be provided to a user. The user may point one or more areas in the video frame by clicking a mouse, by clicking a digital pen, or the like. One or more locations of the points of the user within the frame may be obtained. The user information may comprise the one or more locations. As an example, the user may be an editor editing a video. The video may comprise one or more images of one or more objects. The user may point a location comprised by a display of an object. In that case, an area within the video frame comprising the object may be an area of interest.

In some exemplary embodiments, the disclosed subject matter may be utilized by a computerized device configured to send one or more video frames. As an example, the computerized device may be a smartphone. The user may use an instant messaging application in order to send the one or more video frames. Additionally or alternatively, another user may be using a smartphone to receive the one or more video frames. In those embodiments, the user context information may comprise data about the user, data about the other user, a combination thereof, or the like. Additionally or alternatively, In some cases, an area displaying an object may be an area of interest. As an example, a user may utilize a camera in order to capture an image of one or more people. The user context information may comprise a point of gaze of the user. The user may look at a person comprised by the one or more people. Based on a point of gaze of the user, it may be determined that an area of the video frame displaying the person is an area of interest.

In some exemplary embodiments, a non-interesting area may be determined. In those embodiments, the non-interesting area may be the outcome of subtracting a unification of a portion of the one or more areas of interest from the video frame. In some exemplary embodiments, one or more portions of the video frame may be determined based on the non-interesting area. In those embodiments, the one or more portions may be processed by utilizing one or more processing channels. In some exemplary embodiments, one or more processing channels may be determined to process the one or more portions comprised by the non-interesting area. As an example, in case that the non-interesting area comprises a margin of the video frame, four portions may be determined as exemplified in FIG. 1.

In some exemplary embodiments, as an area of interest may be defined based on an object, the area of interest may be defined as having a minimal size above a predetermined threshold, such as above 4,096 (64×64) pixels, 16,384 (128×128), 1,000,000 (800×1250), or the like. In some cases, the minimal size may be defined based on a relative size to the frame size (e.g., at least 5% of the area of the frame, at least 3% of the width of the frame, at least 10% of the height of the frame, or the like). In case the size is smaller than the predetermined threshold, the shape may not be considered as encompassing an area of interest.

On Step 1130, one or more portions of the video frame may be determined. A portion comprised by the one or more portions may be a portion to be processed. In some exemplary embodiments, a unification of the one or more portions of the video frame may be comprised by the video frame, may be smaller than the video frame, or the like. Additionally or alternatively, it may be determined to process each portion comprised by the one or more portions of the video frame, yielding a one-to-one correspondence between the one or more portions of the video frame and the one or more areas of the video frame. Pot differently, a portion may be defined based on an area of interest of the video frame. In some cases, the portion may be excluded from the one or more portions.

In some exemplary embodiments, determining the one or more portions of the video frame may be based on a user information. As an example, the user information may comprise information regarding an application utilizing the disclosed subject matter. In some exemplary embodiments, the application may be a video chat application. Additionally or alternatively, the user information may indicate that the video chat application is utilized for an online meeting. In those embodiments, portions of the video frame comprising a representation of the faces of the participant may be processed. Additionally or alternatively, portions of the video frame displaying a portion of the margins of the video frame may be excluded from the one or more portions of the video frame to be processed.

In some exemplary embodiments, the video frame may comprise a first area of interest. Determining a first portion based on the first area may comprise cropping the video frame based on the first area of interest. Cropping the video frame based on the first area of interest may yield a first cropped portion. In those embodiments, a processing action may be performed with respect to the first cropped portion. The first cropped portion may be an input to a processing channel.

In some exemplary embodiments, the video frame may comprise an interesting area and a non-interesting area. The interesting area may be determined based on a unification of a portion of the one or more areas of interest. As an example, the video frame may display a number of objects above a threshold. The threshold may be 2 objects, 5 objects, or the like. It may be determined that the 5 largest objects are more interesting than the other objects. The interesting area may comprise a unification of the areas of interest displaying the 5 largest objects. Additionally or alternatively, the non-interesting area may be determined as the complement of the unification. It may be noted the non-interesting area may comprise an area of interest displaying an object. As an example, a person may take a picture of her family at a wedding. The picture may comprise many people such as 10 people, 20 people, or the like. Only the images of the 5 closest people may be comprised by the interesting area. In those embodiments, two portions may be determined. An interesting portion may be associated with the interesting area. Additionally or alternatively, a non-interesting portion may be associated with the non-interesting area. Determining the interesting portion may comprise setting the non-interesting area to constant value. Additionally or alternatively, determining the non-interesting portion may comprise setting the interesting area to the constant value, to another constant value, or the like. In some exemplary embodiments, the non-interesting area may comprise a margin of the video frame as exemplified by FIG. 1.

In some exemplary embodiments, determining the non-interesting portion may comprise shrinking the non-interesting portion. In those embodiments, the shrank non-interesting portion may be provided to a processing channel as an input.

In some exemplary embodiments, the video frame may comprise a first area and a second area. Additionally or alternatively, a first portion of the video frame may be a portion to be processed. The first portion may be defined based on the first area. Additionally or alternatively, a second portion of the video frame may be a portion to be processed. The second portion may be defined based on the second area. In those embodiments, a difference function of a video frame may output the difference of the video frame. As an example, the video frame may comprise one or more pixels, represented in RGB values. An average RGB value of the one or more pixels may be calculated. Additionally or alternatively, for each pixel comprised by the one or more pixels, a difference between the pixel and the average RGB value may be calculated, yielding one or more differences. Additionally or alternatively, an average difference may be calculated by calculating the average of the one or more differences. The average difference may be the output of the difference function.

In some exemplary embodiments, the input to the difference function may be the video frame and the output may be a major difference. Additionally or alternatively, the input to the difference function may be the first portion of the video frame and the output of the difference function may by a first minor difference. Additionally or alternatively, the input to the function may be the second portion of the video frame and the output of the difference function may be a second minor difference. In those embodiments, the sum of the first minor difference and the second minor difference may be smaller than the major difference, yielding that encoding separately the first portion and the second portion may result in two decoding portions having a smaller footprint than the result of encoding the video frame.

On Step 1140, one or more processing channels may be determined. In some exemplary embodiments, a processing channel may comprise one or more processing actions, each of which may be associated with one or more processing actions parameters. In some exemplary embodiments, a processing action may comprise encoding a portion of the video frame. Additionally or alternatively, another processing action may comprise providing the encoded portion of the video frame to another computerized device. Additionally or alternatively, yet another processing action may comprise retaining the encoded portion on a medium device.

In some exemplary embodiments, determining a processing channel may comprise determining a priority FPS parameter value may be determined. In those embodiments, the processing per second parameter value may be utilized in order to determine whether to process the portion or whether not to process the portion.

In some exemplary embodiments, in case that a processing action is encoding, an action parameter may be a name of an encoder configured to encode the portion of the video frame. The encoder name may be H265, H264 VP9, or the like. As an example, in case that encoder name is H265 a portion may be encoded by utilizing an implementation of H265. It may be noticed, that another portion of the video frame may be encoded by utilizing an implementation of H264, H266, or the like.

In some exemplary embodiments, an action parameter may be a desired quality of the encoded frame, a desired processing time of the encoder, the dimensions of the portions of the video frame, or the like.

In some exemplary embodiments, a processing action may comprise a final action. In those embodiments, the final action may be the last processing action with respect to a portion of a video frame. The final action may comprise providing the processed portion to another computerized device, retaining the encoded portion on a medium, or the like.

In some exemplary embodiments, in case that the final action comprises providing, an internet socket may be determined. Additionally or alternatively, the internet socket may be associated with the processing channel comprises the final action. Additionally or alternatively, one or more processing action parameters may be determined. The processing action parameters may comprise socket parameters such as a buffer size, timeout, or the like.

In some exemplary embodiments, in case that the final action comprises retaining on a medium the processed portion, a file descriptor may be determined. The file descriptor may be associated with the processing channel. Additionally or alternatively, one or more processing action parameters may be determined. The one or more processing action parameters may be a file descriptor parameter such as buffer size, write priority, or the like.

In some exemplary embodiments, determining the one or more processing channels may comprise determining at least one non-interesting processing channel. The non-interesting processing channel may comprise a non-interesting processing action. A non-interesting processing action may be a processing action associated with a non-interesting processing parameter. A non-interesting processing parameter may be a processing parameter causing the processing channel to process a non-interesting portion more slowly compared to an interesting parameter, causing the processing channel to encode the non-interesting portion in a lower quality compared to an interesting portion, or the like.

In some exemplary embodiments, a non-interesting action may be a deflating action. The deflating action, when performed on a portion of the video frame, may result in a portion comprising less information. The deflating action may comprise reducing the number of colors, performing Gaussian filtering, or the like.

On Step 1150, the one or more portions of the video frame to be processed may be processed. Each portion comprised by the one or more portions of the video frame to be processed may be processed by utilizing a processing channel. The processing channel may comprise one or more processing actions. In some exemplary embodiments, processing a portion of the video frame may comprise performing a processing action comprised by the one or more processing actions.

In some exemplary embodiments, a portion of the video frame may be provided as an input to a processing channel. A portion may be provided to a processing channel based on a location of the portion in the video frame. In case the video frame is comprised by a sequence of video frames, a portion of the video frame may be provided to a processing channel. Additionally or alternatively, another portion comprised by the other video frame may be provided to the processing channel. The portion and the other portion may have a same location in the sequence of video frames. Additionally or alternatively, the portion and the other portion may display a same portion of a same object.

On Step 1155, processed portions may be provided to a user device. In some exemplary embodiments, processing the one or more portions of the video frame to be processed may comprise providing the one or more processed portions of the video frame to a user device. The user device may be a laptop, a smartphone, a television, or the like. In some exemplary embodiments, the processed portions may be retained on a medium and the user device may be configured to access the medium in order to retrieve the processed portions.

On Step 1160, an alternative video frame may be constructed. In some exemplary embodiments, an alternative video frame may comprise one or more alternative portions. A user device may be configured to obtain the one or more processed portions of the video frame. A portion that was encoded may be decoded to a decoded portion. Additionally or alternatively, a portion that was resized to a smaller portion may be resized to an original size. The original size may be the size of the portion prior to resizing the portion. The decoded portion, or the resized decoded portion may be an alternative portion.

On Step 1170, the alternative video frame may be displayed to a user. The user device may be configured to merge the one or more alternative portions to an alternative video frame. Additionally or alternatively, the user device may be configured to render the alternative video frame on a screen that may be operatively coupled with the user device.

On Step 1180, another video frame may be obtained. The other video frame may be obtained in a similar manner to obtaining the video frame of Step 1110. In some exemplary embodiments, the video frame and the other video frame may be comprised by a sequence of the video frames. In those embodiments, the other video frame may be ordered after the video frame in the sequence of the video frame. In some exemplary embodiments, the sequence of video frames may be comprised by a video stream. The video stream may be utilized to display an online sport event to one or more users. Additionally or alternatively, the sequence of video frames may be photos of a same object taken one after the other by a user utilizing a smartphone.

In some exemplary embodiments, determining whether to perform Step 1120 after Step 1180 or whether to perform Step 1130 after Step 1180 may be based on a difference between the video frame and the other video frame. In case that the difference is above a threshold the other video frame may display different objects compared to the video frame. Additionally or alternatively, an object that may be displayed in the video frame may be displayed in a different location in the other video frame. In those cases, it may be desired to perform Step 1120 again in order to re-determine portions of the other video frame.

In some exemplary embodiments, determining whether to perform Step 1120 after Step 1180 or whether to perform Step 1130 after Step 1180 may be based on a difference between an area comprised in the video frame and based on another area comprised by the other video frame. In those embodiments, the area may be associated with a location and a dimension in the video frame. Additionally or alternatively, the other area may be associated with another location and another dimension in the other video frame. Additionally or alternatively, a difference between the location and the other location may be below a threshold. The threshold may be 1 pixel, 5 pixels, 90 pixels, 280 pixels, or the like. Additionally or alternatively, the threshold may be based on a percentage out of the size of the video frame, such as 1%, 3% or the like. Additionally or alternatively, another difference between the dimensions and the other dimension may be below another threshold. Additionally or alternatively, the other threshold may be based on a percentage out of the size of the video frame, such as 1%, 3% or the like.

In some exemplary embodiments, in case that the difference is below the threshold, determining a portion of the other video frame may be based on another portion of the other video frame. In some cases, the portion of the video frame may be associated with a same area as the other portion of the other video frame.

In some exemplary embodiments, Step 1120 may be performed again with respect to the other video frame. In those embodiments, Step 1140 may not be performed and processing channels that were determined for processing the video frame may be utilized again to process the other video frame. Additionally or alternatively, Step 1140 may be performed, yielding that one or more processing channels were determined in order to process portions of the other video frame to be processed.

In some exemplary embodiments, determining whether to perform Step 1140 or not to perform Step 1140 after Step 1180 may be based on a change in the user information. As an example, in case that the user information comprises data regarding a change in the connectivity, indicating that internet packets comprising processed portions may be dropped, a processed portions may be smaller than a previous processed portion of a previous video frame, such as by encoding by utilizing a smaller bitrate.

Referring now to FIG. 12 showing a flowchart diagram of a method, in accordance with some exemplary embodiments of the disclosed subject matter.

FIG. 12 may exemplify usage of the disclosed subject matter in a video chat application. In that example, there may be two areas in a sequence of video frames comprised by the video stream. The first area may be an area of interest. The second area may be a non-interesting area in the sequence of video frames. As an example, in case that the video stream is displaying a basketball match, the first area may be an inner area displaying the players, the court, or the like. Additionally or alternatively, the second area may be a non-interesting area such as the margins of one or more video frames comprised by the sequence of video frames.

On Step 1210, the first area and the second area may be determined. In some exemplary embodiments, Step 1210 may comprise Step 1220, Step 1230, or Step 1240.

On Step 1220, a detection counter may be utilized. The detection counter may be indicative to previous object detections that may have been performed with respect to previous frames. A threshold of the counter may be calculated based on an activity level of the sequence of video frames. The activity level may measure a difference between two consecutive video frames comprised by the sequences of video frames. As an example, in case that the video stream is displaying a car race, the difference between two consecutive frames may be larger than another difference of two consecutive video frames comprised by a video stream displaying a person that is lecturing. In the case of the car race it may be desired to perform object detection more often compared to the lecturing case. It may be noted that detecting objects with a video frame may yield a location of the objects in the video frame allowing to determine an area of interest comprised by the frame.

In some exemplary embodiments, in case that the counter is below a threshold Step 1230 may be performed yielding that one or more objects that may be displayed in the video frame may be detected. Additionally or alternatively, in case that the counter value is below the threshold, Step 1240 may be performed. In that case, a previous detection of objects may be utilized. The previous detection may refer to object detection that may have been performed on a previous video frame in the sequence of video frames.

On Step 1250, two processing channels may be determined. Step 2150 may be similar to Step 1140 of FIG. 1. A first processing channel may be determined to process a portion of the video frame that may be defined by the interesting area. Additionally or alternatively, a second processing channel may be determined in order to process another portion of the video frame that may be defined by the non-interesting area of the video frame.

In some exemplary embodiments, Step 1250 may comprise Step 1260. On Step 1260, two priority FPS parameter values may be determined. A first priority FPS parameter value may be utilized by the first processing channel in order to determine whether to process a portion defined by the area of interest. Additionally or alternatively, a second priority FPS parameter value may be determined. The second priority FPS parameter value may be utilized in order to determine whether to process another portion defined by the non-interesting area.

In some exemplary embodiments, Step 1270 may be performed for each portion of the video frame. In case that the associated priority FPS parameter value is above a threshold, Step 1280 may be performed, yielding that the portion is processed in an associated processing channel. Additionally or alternatively, in case that the priority FPS parameter value is below a threshold, the portion may not be processed.

In some exemplary embodiments, as can be seen in FIG. 12, a portion of a video frame may be processed. The portion may be defined based on the first area. Additionally or alternatively, another portion of the video frame may not be processed. The other portion may be defined based on the second area of the video frame. In those embodiments, in order to reconstruct an alternative video frame, a computerized device may utilize a previous portion. The previous portion may be a portion comprised by a previous video frame in the sequence of video frames. Additionally or alternatively, the previous portion may be defined based on the first area. As the first area is associated with a same area in the video frame and in the previous video frame, a difference between the portion and the previous may be below a threshold. Additionally or alternatively, a visual difference between the portion and the previous portion may not be perceived by a human eye. Hence, the alternative video frame may be constructed, wherein another difference between the video frame and the reconstructed video frame may be below another threshold.

In some exemplary embodiments, determining areas of interest, as exemplified in Step 1210, may be based on an execution of an object detection algorithm. Additionally or alternatively, a face detection algorithm may be executed. Executing such algorithms may require computing resources such as Random-Access Memory (RAM), CPU, GPU, or the like. In some exemplary embodiments, detecting objects per each frame may not be feasible.

In some exemplary embodiments, the method exemplified by FIG. 12 may be a recursive method. In those embodiments, a video frame may comprise a number of objects above a threshold, may have a size above a threshold, a footprint above a threshold, or the like. In those embodiments, a processing action with respect to a portion may comprise performing Step 1210 with respect to the portion. Pot differently, Step 1210 may be performed again, wherein the video frame is the portion.

In some exemplary embodiments, a bounding shape of an object displayed in a video frame may be determined. Additionally or alternatively, In those embodiments, the one or more low priority portions of the video frame may comprise another bounding shape. Additionally or alternatively, the other bounding shape may comprise the representation of the non-interesting object within the video frame.

In some exemplary embodiments, in case that a size of the bounding shape is above a threshold, one or more portions of the video frame may be determined with respect to the bounding shape. In those embodiments, a unification of the one or more portions may comprise the bounding shape.

Referring now to FIG. 13 showing a block diagram of an apparatus, in accordance with some exemplary embodiments of the disclosed subject matter.

In some exemplary embodiments, Apparatus 1300 may be a computerized device configured to compress a video frame. Additionally or alternatively, Apparatus 1300 may be configured to compress a sequence of video frames. Additionally or alternatively, Apparatus 1300 may be configured to compress and to stream the sequence of video frames to one or more computerized devices.

In some exemplary embodiments, Apparatus 1300 may comprise one or more Processor(s) 1302. Processor 1302 may be a Central Processing Unit (CPU), a Central Processing Unit (GPU), a microprocessor, an electronic circuit, an Integrated Circuit (IC) or the like. Processor 1302 may be utilized to perform computations required by Apparatus 1300 or any of its subcomponents.

In some exemplary embodiments, Apparatus 1300 may comprise an Input/Output (I/O) module 1305. I/O Module 1305 may be utilized to provide an output to and receive input from a user, such as, for example to receive one or more video frames from a camera, from a hard-disk, or the like, and to provide one or more processed portions of the video frames to a User Device 1380, or the like. Additionally or alternatively, I/O Module 1305 may be utilized to obtain one or more video frames from a User Device 1370. User Device 1370 may utilize Camera 1375 in order to provide one or more video frames. Additionally or alternatively, User Device 1370 may be configured to provide one or more video frames to Apparatus 1300 by utilizing Memory 1379. As an example, Memory 1379 may retain a prerecorded video, one or more photos, or the like.

In some exemplary embodiments, Apparatus 1300 may comprise Memory 1307. Memory 1307 may be a hard disk drive, a Flash disk, a Random Access Memory (RAM), a memory chip, or the like. In some exemplary embodiments, Memory 1307 may retain program code operative to cause Processor 1302 to perform acts associated with any of the subcomponents of Apparatus 1300.

In some exemplary embodiments, Areas Detection Module 1310 may be configured to detect one or more areas of potential of the video frame. An area of potential may display a portion of an object. Additionally or alternatively, the area of potential may not display an object. Areas Detection Module may be configured to determine one or more potential areas and to assign a priority to a portion of the one or more potential areas.

In some exemplary embodiments, Areas Detection Module 1310 may be configured to detect objects displayed in the video frame, such as by using object detection algorithms or the like. In some exemplary embodiments, the one or more detected objects may define one or more potential areas with a priority above an interest threshold. Additionally or alternatively, Areas Detection Module 1310 may be configured to select a portion of the one or more objects and to determine the interesting objects. In some exemplary embodiments, objects of interest may be determined based on a user information. The user information may be obtained from Device 1370, from Device 1390, may be automatically determined based on the application transmitting the video (such as a video meeting from a Zoom™ application), based on the audio of the video, based on spoken phrases within the video, or the like. In some exemplary embodiments, only potential areas displaying a portion of an object of interest may be assigned with the priority above the interest threshold. In some exemplary embodiments, Areas Detection Module 1310 may be configured to determine one or more non-interesting areas. A non-interesting area may be a potential area displaying a margin of the video frame, displaying a portion of the margin, displaying a portion of an object with another priority below the interesting threshold, or the like.

In some exemplary embodiments, Areas Detection Module 1310 may be configured to utilize object detection algorithms or other user information related detection algorithms, such as face detection algorithms, bird detection algorithms, or the like, in order to identify the one or more objects of interest. As an example, it may be determined, based on the user information, that the one or more video frames are displaying a national geographic video about birds. Accordingly, a bird detection algorithm may be applied, as birds can be objects of interest in accordance with the context of the video.

Additionally or alternatively, Areas Detection Module 1310 may be configured to identify the one or more objects of interest based on a previous identification of the one or more objects of interest or one or more objects related thereto in previous video frames. Additionally or alternatively, Areas Detection Module 1310 may be configured to detect a set of objects in the frame that comprises the one or more objects of interest or one or more objects related thereto, and continuously tracking locations of these objects over the frames. Additionally or alternatively, Detection Module 1310 may be configured to identify objects within the video frames having an interest level above a predetermined threshold, thereby determining that they are objects of interest.

In some exemplary embodiments, based on continuously tracking locations of an object, a path of an object may be determined. Areas Detection Module may be configured to predict, based on the path, a future location of the object in a future frame. The future frame may be a video frame ordered after the video frame in a sequence of video frames. Areas Detection Module 1310 may be configured to detect in the future frame based on one or more future locations, to not utilize an object detection algorithm with respect to the future frame, or the like. In some exemplary embodiments, a future frame may be an un-obtained video frame, such as another video frame.

In some exemplary embodiments, Areas Detection Module 1310 may be configured to utilize an activity level of objects, in order to determine whether an object is an object of interest. For each object in the video frame an activity level may be determined. Objects with activity level above a predetermined threshold may be objects of interest. Determining to process a portion of the video frame may be based on the activity level associated with an object displayed in the video frame.

In some exemplary embodiments, determining an activity level of an objects may be based on a difference between a location of the object in a current frame with respect to another location of the object in a previous video frame. Additionally or alternatively, an activity level associated with an object may be determined based on a difference in size of the object. As an example, the object may be a woman walking away from a camera. As a result, the image of the woman in the sequence of video frames may get smaller and smaller. In one case the woman may walk fast yielding a first activity level. In another case the woman may walk more slowly compared to the first case, yielding a second activity level that may be smaller than the first activity level.

In some exemplary embodiments, determining on whether to perform object detection in a next video frame may be based on an average of the activity levels of the one or more objects, of the one or more objects of interest, or the like.

In some exemplary embodiments, Areas Detection Module 1310 may be configured to determine, based on one or more activity levels of one or more objects, one or more bounding shapes of the one or more objects. Additionally or alternatively, Areas Detection Module 1310 may be configured to determine the one or more bounding shapes based on one or more paths of the one or more objects. In case that the video frame is comprised by a sequence of video frames in a video chat application, Areas Detection Module 1310 may be configured to determine a single object displaying a user head. Based on the movements of the head of the user an activity level may be determined. Based on the activity level, a bounding shape displaying the head of the user may be determined. In some exemplary embodiments, the bounding shape may display the head of the user in a future video frame, in an un-obtained video frame, such as another video frame.

In some exemplary embodiments, Areas Detection Module 1310 may be configured to utilize a confidence measurement relating to each identified object. In some cases, the object detection algorithm may identify several objects in the video frame, with varying confidence measurements and sizes. Detection Module 1310 may select the object with the highest confidence measurement for analysis and avoid processing the remaining objects. In some cases, N objects with top confidence measurements may be processed, wherein N is a positive integer. Additionally or alternatively, only objects with a confidence measurement above a threshold may be processed. Additionally or alternatively, objects with identified area below a minimal predetermined area may be ignored, such as small objects that may be represented by rectangles of size 8×8 pixels, 16×16 pixels, 16×64 pixels, or the like, may be ignored and not processed.

In some exemplary embodiments, N, the number of objects to process, may be determined based on a user information. As an example, the user information may comprise a name of the application used for obtaining the video frames. Additionally or alternatively, the user information may comprise audio of a user using User Device A 1370. Additionally or alternatively, the user information may comprise a location of the user. Based on the user information it may be determined that a user is using the application in a park. Additionally or alternatively, it may be determined that the user is using a video chat application, running on User Device A 1370. Additionally or alternatively, it may be determined, based on the audio, that no other user is using User Device A 1370 with the user. As a result, it may be determined that N is equal to 1, yielding that only one object should be processed. It may be noted that as the user in the park there may be many objects displayed in the video frame as 5 objects, 10 objects, or the like. The objects may be people, dogs, bicycles, or the like.

It may be noted that processing an object may refer to processing a portion of the video frame comprising an image of a portion of the object.

In some exemplary embodiments, User Device B 1380 may be configured to receive the one or more processed portions from Apparatus 1300, and construct an alternative video frame based thereon.

In some exemplary embodiments, User Device B 1380 may display one or more alternative video frames, such as using Screen 1385.

In some exemplary embodiments, a Portions To Be Processed Determination Module 1350 may be configured to determine one or more portions of the video frame. A portion of the video frame comprised by the one or more portions may be a portion to be processed of the video frame. In some exemplary embodiments, a portion to be processed may be a portion of the video frame that may be processed by utilizing a processing channel comprised by Processing Channels 1360.

In some exemplary embodiments, Portions To Be Processed Determination Module 1350 may utilize, as an input, the one or more areas from Areas Determination Module 1310. Additionally or alternatively, Portions To Be Processed Determination Module 1350 may be configured to utilize, as an input, the one or more interest levels from Interest Level Determination Module 1330. Additionally or alternatively, Portions To Be Processed Determination Module 1350 may be configured to utilize, as an input, a video frame. In some exemplary embodiments, Portions To Be Processed Determination Module 1350 may be configured to output one or more portions of the video frame as an input to one or more Processing Channels 1360.

In some exemplary embodiments, the video frame may be manipulated by Portions To Be Processed Determination Module 1350. Additionally or alternatively, the video frame may be manipulated by Portions To Be Processed Determination Module 1350 more than once, in order to determine more than one portion.

In some exemplary embodiments, manipulating the video frame may comprise performing a deflating operation in order to reduce a footprint of the portion. The deflating operation may comprise reducing the number of colors, by executing an implementation of a Gaussian Filter, or the like. In those embodiments, the manipulated portion may be provided to a processing channel.

In some exemplary embodiments, manipulating the video frame may comprise shrinking the video frame to a shranked video frame. Additionally or alternatively, manipulating the video frame may comprise cropping the video frame. Shrinking or Cropping the video frame may be based on an area of the video frame. In some exemplary embodiments, the shranked or the cropped video frame may be a portion to be processed. The portion to be processed may be provided to a processing channel.

In some exemplary embodiments, a Processing Channels Determination Module 1320 may be configured to determine a one or more Processing Channels 1360. Processing Channels Determination Module 1320 may obtain, as an input, a representation of the one or more areas from Areas Detection Module 1310. Additionally or alternatively, Processing Channels Determination Module 1320 may obtain, as an input, the one or more interest levels from Interests Levels Determination Module 1330. Additionally or alternatively, Processing Channels Determination Module 1320 may obtain, as an input, a user information.

In some exemplary embodiments, each area may be associated with a processing channel. For each processing channel, Processing Channels Determination Module 1320 may be configured to determine one or more processing actions. Determining the processing actions may comprise initializing one or more encoders, initializing one or more sockets, or the like.

In some exemplary embodiments, determining a process action may be based on a user input. As an example, in case that the user information comprises data indicative to an availability of computing resources, Processing Channels Determination Module 1320 may be configured to initialize an H265 encoder. Additionally or alternatively, in case that the user information comprises data indicative to a low availability of computing resources, Processing Channels Determination Module 1320 may initialize an H264 encoder.

In some exemplary embodiments determining a processing action may be based on an interest level associated with a processing channel. As an example, an encoder may be configured to encode a video frame or a portion thereof at a given bitrate. A first processing channel associated with a first interesting level may be associated with a first bitrate parameter. Additionally, or alternatively, a second processing channel associated with a second interesting level may be associated with a second bitrate parameter. In case that the first interest level is larger than the second interest level, the first bitrate parameter may be larger than the second bitrate parameter.

In some exemplary embodiments, an Interest Level Determination Module may be configured to determine one or more interest levels of one or more areas. In some exemplary embodiments, an area displaying an object may be associated with an interest level based on the interest level of an object. In some exemplary embodiments, an area may display a portion of an object. The interest level of the area may be determined based on the interest level of the object. Additionally or alternatively, the interest level may be based on the portion of the object. In case that a size of the portion of the object is below a size threshold the interest level may be below an interesting threshold. The size threshold may be 16 pixels (2×8, 4×4, or the like). Additionally or alternatively, the size threshold may be a relative threshold, relative to a size of the object. the relative threshold may be 10%, 20%, or the like. In some exemplary embodiments, the interest level of the area may be based on a content of the area. As an example, an area displaying an image comprising a head of a person may have a higher interest level compared to an area displaying another image comprising a shoes of a person.

In some exemplary embodiments, a Priority FPS Parameter Value Determination Module 1340 may be configured to determine a priority FPS parameter value. In some exemplary embodiments a processing comprised by Processing Channels 1350 may be configured to determine based on the processing channel parameter value whether to process a portion.

In some exemplary embodiments, a computerized device such as User Device B 1380 may be configured to construct an alternative video frame based on one or more processed portions. In case that a portion was not processed, the computerized device may be configured to construct the alternative video frame based on a previous processed portion instead of a processed portion. The previous processed portion may be associated with a same area in the previous frame. Additionally or alternatively, the processed portion may be associated with the same area in the frame.

In some exemplary embodiments, in case that the same area is associated with an activity level above an activity threshold, a priority FPS parameter value below a threshold may yield that a difference between the portion and an alternative portion is above a quality threshold.

In some exemplary embodiments, the term process per second and the term priority FPS may be interchangeable.

Another exemplary embodiment of the disclosed subject matter is a method comprising: obtaining a video frame; determining one or more portions of the video frame to be processed; determining, based on the one or more portions of the video frame to be processed, one or more processing channels; processing the one or more portions of the video frame to be processed, wherein processing a portion of the video frame to be processed is performed by utilizing a processing channel comprised by the one or more processing channels.

Optionally, the processing of the one or more portions of the video frame to be processed comprises: encoding the one or more portions of the video frame to be processed to one or more encoded portions of the video frame; or performing one or more final operations based on the one or more portions of the video frame to be processed; or a combination thereof.

Optionally, the determining of the portion of the video frame to be processed comprises: determining one or more portions of the video frame; determining one or more sets of the one or more portions of the video frame, wherein a set of one or more portions of the video frame comprised by the one or more sets is the portion of the video frame to be processed, wherein said processing the portion of the video frame to be processed comprises: determining an area comprised by the video frame, wherein the area is a unification of the one or more portions of the video frame comprised by the set; determining another area of the video frame, wherein the other area is a subtraction of the area from the video frame; setting the other area to a value, whereby determining a modified video frame, wherein the modified video frame is the portions of the video frame to be processed; and encoding the modified video frame, whereby determining an encoded video frame; or performing a final operation with respect to the video frame, wherein a final operation is selected from a set comprising: providing the encoded video frame, or retaining the encoded video frame, or providing the modified video frame, or retaining the modified video frame, or a combination thereof.

Optionally, the processing of the portion of the video frame to be processed comprises: obtaining a priority of the portion of the video frame to be processed; based on the priority, determining a smaller modified video frame, wherein the modified video frame is associated with a number of pixels, wherein the smaller modified video frame is associated with a smaller number of pixels, wherein the smaller number is smaller than the number, wherein the smaller modified video frame is the modified video frame.

Optionally, the determination of the one or more portions of the video frame to be processed comprises: determining to determine an area of low priority of the video frame; subtracting a unification of the one or more portions of the video frame from the video frame, wherein the area of low priority is a difference between the video frame and the unification of the one or more portions of the video frame, wherein the one or more portions of the video frame to be processed comprises the area of low priority, whereby determining a processing channel associated with the area of low priority.

Optionally, the processing of the one or more portions of the video frame to be processed comprises processing the area of low priority of the video frame, wherein processing the area of low priority of the video frame comprises: determining one or more portions of the area of low priority; encoding one or more portions of the of the area of low priority, whereby determining one or more encoded portions of the area of low priority; and grouping the one or more encoded portions of the area of low priority of the video frame, whereby determining an encoded area of low priority, wherein the encoded area of low priority is comprised by the one or more processed portions of the video frame.

Optionally, the processing of the one or more portions of the video frame to be processed comprises processing the area of low priority of the video frame, wherein processing the area of low priority of the video frame comprises: resizing the area of low priority to a smaller area of low priority; determining the one or more portions of the area of low priority; encoding one or more portions of the of the smaller area of low priority, whereby determining one or more encoded portions of the smaller area of low priority; and grouping the one or more encoded portions of the smaller area of low priority of the video frame, whereby determining an encoded area of low priority, wherein a final operation comprised by the one or more final operation is performed based on the area of low priority.

Optionally, the area of low priority comprises the margin of the video frame.

Optionally, the determination of the one or more processing channels comprises: determining to process the area of low priority; determining another portion of the video frame to be processed, wherein the other video frame to be processed is a high priority portion of the video frame; wherein the processing channel is associated with the area of low priority, whereby processing the area of low priority by utilizing the processing channel; determining another processing channel comprised by the one or more processing channels, wherein the other processing channel is associated with the other portion of the video frame to be processed, whereby processing the other portion of the video frame to be processed by utilizing the other processing channel.

Optionally, the determination of the an additional portion of the video frame to be processed, wherein the other portion of the video frame to be processed is associated with another priority, wherein the additional portion of the video frame to be processed is associated with an additional priority, wherein the other priority is larger than the additional priority, wherein the additional portion of the video frame to be processed is associated with the processing channel, whereby processing the additional portion of the video frame to be processed by utilizing the processing channel.

Optionally, the determination of the one or more portions of the video frame to be processed comprises: obtaining one or more priorities, wherein a priority comprised by the one or more priorities is associated with the portion of the video frame, wherein said determining the one or more portions of the video frame to be processed comprises: determining that the priority is higher than another priority, wherein the other priority is associated with another portion of the video frame; determining to process the portion of the video frame, whereby excluding the other portion of the video frame from the one or more portions of the video frame to be processed.

Optionally, the priority is based on an activity level, wherein an activity level associated with the portion of the video frame is indicative to a movement of an object displayed in the portion of the video frame.

Optionally, the priority is based on an interest level, wherein an interest level associated with a portion of the video frame is indicative to an interest of a user in an image displayed in the portion of the video frame.

Optionally, the obtainment of the one or more priorities comprises obtaining one or more points of gaze of the one or more users, wherein a point of gaze of a user is indicative to an interest of a user in an image displayed by the video frame.

Optionally, the other portion of the video frame is the margin of the video frame.

Optionally, the obtainment of the one or more priorities, wherein a priority comprised by the one or more priorities is associated with a portion of the video frame; obtaining one or more priority thresholds, wherein a priority threshold comprised by the one or more priority threshold is associated with the priority; and wherein said determining the one or more portions of the video frame to be processed comprises determining that the priority is larger than the priority threshold, whereby the portion of the video frame comprised by the one or more portions of the video frame to be processed.

Optionally, the obtainment of the one or more priorities, wherein a priority comprised by the one or more priorities is associated with a portion of the video frame; obtaining one or more priority thresholds, wherein a priority threshold comprised by the one or more priority threshold is associated with the priority; wherein said determining the one or more portions of the video frame to be processed comprises determining that the priority is smaller than the priority threshold; and excluding the portion of the video frame from the one or more portions of the video frame to be processed.

Optionally, the obtainment of another video frame, wherein the other video frame comprises another portion of the video frame, wherein the other portion of the video frame and the portion of the video frame are displaying an image of a same object; determining another one or more portions of the other video frame to be processed, wherein determining the other one or more portions of the other video frame to be processed comprises determining to process the other portion of the video frame, whereby the other portion of the video frame comprised by the one or more portions of the video frame to be processed; and processing the one or more portions of the other video frame to be processed.

Optionally, the determination of the one or more portions of the video frame to be processed is based on a context information.

Optionally, the context information comprises one or more consumer context information.

Optionally, the context information is periodically obtained.

The method of claim 1, wherein said determining the one or more portions of the video frame comprises detecting one or more objects displayed in the video frame, wherein a portion of the video frame, comprised by the one or more portions of the video frame, is displaying a portion of an object comprised by the one or more objects, wherein said determining the one or more portions of the video frame to be processed comprises determining to process the portion of the video frame.

Optionally, the determination of the one or more portions of the video frame comprises determining one or more areas of interest.

Optionally, the determination of the one or more areas of interest comprises: displaying, to a user, the video frame; obtaining, from the user, one or more points of the user to one or more portions of the video frame, wherein a user point comprised by the one or more points of the user is associated with an area of interest comprised by the one or more areas of interest Optionally, the determination of the one or more portions of the video frame to be processed comprises: obtaining a location within the video frame of the user point, wherein the area of interest is associated with the location.

Optionally, a unification of the one or more portions of the video frame comprises the video frame.

Optionally, the determination of the one or more portions of the video frame comprises determining one or more areas of activity, whereby determining one or more activity levels.

Optionally, the processing of the one or more portions of the video frame to processed comprises processing a portion of the video frame to be processed, wherein processing the portion of the video frame to be processed comprises cropping the portion of the video frame to be processed, whereby determining a cropped portion of the video frame, wherein the cropped portion of the video frame is comprised by the one or more portions of the video frame to be processed, wherein said encoding the one or more portions of the video frame to be processed comprises encoding the cropped portion of the video frame.

Optionally, the determination of the one or more processing channels comprises: determining one or more objects displayed in the one or more portions of the video frame to be processed; obtaining one or more priorities, wherein a priority comprised by the one or more priorities is associated with a portion of the one or more objects; obtaining one or more priority thresholds, wherein a priority threshold comprised by the one or more priority thresholds is associated with a portion of the one or more portions of the video frame to be processed, wherein said determining the one or more processing channels based on the one or more priorities and based on the one or more priority thresholds.

Optionally, the determination of the one or more processing channels comprises determining an encoder, wherein said encoding the one or more portions of the video frame to be processed, comprises: encoding, by utilizing the encoder, the portion of the video frame to be processed.

Optionally, the determination of the one or more processing channels comprises determining one or more encoder parameters; and applying an encoder parameter comprised by the by the one or more encoder parameters on the encoder.

Optionally, the determination of the one or more processing channels comprises determining one or more computerized processes, wherein a computerized processed comprised by the one or more computerized processes is associated with the processing channel, wherein said processing the portion of the video frame to be processes by utilizing the processing channel comprises processing the portion of the video frame to be processed in the computerized process.

Optionally, the determination of the one or more processing channels comprises determining one or more computerized process parameters; and applying a computerized process parameter comprised by the by the one or more computerized processes parameters on the computerized process.

Optionally, a final operation comprised by the one or more final operations is providing the one or more processed portions of the video frame, wherein said providing comprises providing to one or more consumers or to one or more processing devices or a combination thereof, wherein a final operation based on a processed portion of the video frame comprises providing the processed portion of the video frame.

Optionally, the determination of the one or more processing channels comprises obtaining one or more sockets, wherein said determining the processing channels comprises associating a socket comprised by the one or more sockets to the processing channel, wherein said providing the processed portion of the video frame is performed by utilizing the socket, whereby providing the processed portion of the video frame by utilizing the processing channel.

Optionally, the determination of the one or more processing channels comprises determining one or more socket parameters; and applying a socket parameter comprised by the one or more socket parameters on the socket.

Optionally, a final operation comprised by the one or more final operations is retaining the one or more processed portions of the video frame, wherein said retaining comprises retaining on one or more mediums, wherein a final operation based on a processed portion of the video frame comprises retaining the processed portion of the video frame.

Optionally, the determination of the one or more processing channels comprises determining one or more file descriptors, wherein said determining the processing channels comprises associating a file descriptor comprised by the one or more file descriptors to the processing channel, wherein retaining the processed portion of the video frame is performed by utilizing the file descriptor, whereby retaining the processed portion of the video frame by utilizing the processing channel.

Optionally, the determination of one or more processing channel comprises determining one or more file descriptor parameters; and applying a file descriptor parameter comprised by the by the one or more file descriptors parameters.

Yet Another exemplary embodiment of the disclosed A method comprising: obtaining a sequence of video frames; determining one or more sequences of portions of the sequence of video frames to be processed, wherein the sequences of portions of the sequence of video frames to be processed is comprising a sequence to be processed, wherein each portion of a video frame comprised by the sequence to be processed is displaying a portion of a same area of importance. determining, based on the one or more sequences of portions of the sequence of video frames to be processed one or more processing channels; processing, by utilizing the one or more processing channels, a video frame comprised by the sequence of video frames, wherein processing the video frame comprises: determining, based on the one or more sequences of portions of the video frames to be processed, a portion of the video frame to be processed, wherein the portion is displaying the portion of the same area of importance; and processing the portion of the video frame to be processed by utilizing a processing channel.

Optionally, the method comprises obtaining another video frame; determining one or more portions of the other video frame to be processed; and processing the one or more portions of the other video frame to be processed, wherein processing a portion of the other video frame to be processed is utilizing the processing channel, wherein the portion of the other video frame to be processed comprises a portion of a same area of importance.

Optionally, the same area of importance is based on at least one of: a same activity level or a same interest level or a same object or a same location or a combination thereof.

Optionally, the determination of the processing channel comprises determining a frames per second parameter, the method comprising: obtaining an additional video frame; determining one or more portions of the additional video frame, wherein the additional video frame comprises an additional portion of the same area of importance; and determining, based on the frames per second parameter, to exclude the portion from the portions of the additional video frame to be processed.

Optionally, the determination of the one or more sequences comprises determining a sequence of low priority, wherein each portion of a video frame comprised by the sequence of low priority comprises an area of low priority.

Optionally, the same area of importance is displaying one or more portions of a same object, the method comprising: determining a path of the same object in the sequence of video frames; obtaining another video frame; determining, based on the path, a portion of the other video frame to be processed, wherein the portion of the other video frame to be processed is displaying a portion of the same object; and processing the portions of the other video frame to be processed.

Optionally, the method comprises determining a bounding shape of the portions comprising the same area of importance; obtaining another video frame; determining, based on the bounding shape, a portion of the other video frame to be processed, wherein the portion of the other video frame to be processed is displaying the portion of the same area of importance; and processing the portion of the other video frame to be processed.

Optionally, the method comprises displaying, to a user, a portion of the sequence of video frames; obtaining from the user one or more points, wherein the area of importance is determined based on a point comprised by the one or more points.

Optionally, the method comprises determining that a difference between the video frame and another video frame comprised by the sequence of video frames is above a threshold, wherein the other video frame is obtained after the video frame; generating, by the producer, an urgent message, wherein the urgent message comprises an indication to the difference; providing, by the producer, the urgent message; obtaining, by the first consumer, the urgent message; and performing, by the first consumer, a mitigating action.

Optionally, the generation of the urgent message comprises encoding the other video frame, wherein the urgent message comprises the encoded other frame.

Optionally, the first consumer is configured to maintain a cache, wherein the mitigating action comprises clearing the cache.

Optionally, the cache comprises a buffer of one or more obtained processed portions of the frame.

Optionally, the cache comprises one or more consumer sub caches, wherein a first sub cache comprised by the one or more consumers sub caches is configured to retain obtained processed portions of the video frame associated with a first consumer processing channel, wherein the urgent message is associated with the first consumer processing channel, wherein the mitigating action comprises clearing the first sub cache.

Optionally, the method is performed by a producer, wherein said determining the one or more portions of the video frame to be processed comprises: determining, by the producer, a first message, wherein the first message comprises one or more session description offers of one or more expected processed portions of the video frame, wherein the one or more session description offers comprises a first session description offer of a first expected processed portion of the video frame, wherein the first expected processed portion of the video frame is associated with the portion of the video frame wherein the first session description offer comprises at least one of: a shape of the first expected processed portion of the video frame, or dimensions of the shape of the first expected processed portion of the video frame, or a shape of the portion of the video frame, or dimensions of the shape of the portion of the video frame, or an activity level of the portion of the video frame, or an interest level of the portion of the video frame, or a description of a first object displayed in the portion of the video frame or a combination thereof; providing, by the producer, the first message to the one or more consumers; obtaining, by the producer, an acknowledgment from a first consumer comprised by the one or more consumers, wherein the acknowledgment comprises an acknowledgment for the first session description offer; wherein said determining one or more portions of the video frame to be processed is performed by the producer, wherein said determining one or more portions of the video frame to be processed is based on the acknowledgment, wherein the portion of the video frame is a portion of the video frame to be processed, wherein said processing the one or more portions of the video frame to be processed comprises processing the portion of the video frame to be processed, wherein processing the portion of the video frame to be processed yields the first expected processed portion of the video frame, wherein a final operation comprises providing the first expected processed portion of the video frame to the first consumer.

Optionally, the method comprises that in response to said providing the first message, obtaining, by the first consumer the message; determining, by the first consumer, the acknowledgment, wherein determining the acknowledgment comprises determining, by the first consumer, a first acknowledgment for the first session description offer; providing, by the first consumer, the acknowledgment to the producer; in response to said providing the first expected processed portion of the video frame, obtaining, by the first consumer, the first expected processed portion of the video frame; processing the first expected processed portion of the video frame, whereby determining a first portion of a reconstructed video frame; and providing the first portion of the reconstructed video frame to a rendering device, whereby the first portion of the reconstructed video frame is displayed to a user.

Optionally, the processing, by the producer, the one or more portions of the video frame to be processed comprises determining, by the producer, one or more volatile descriptions of one or more expected portions of the video frame to be processed, wherein a first volatile description comprised by the one or more volatile descriptions is associated with a first portion of the video frame to be processed, wherein the first volatile location is indicative to a location or to a shape or to a dimensions of a first portion of the video frame to be processed within the video frame, wherein said providing, by the producer, the one or more processed portions of the video frame comprises providing, by the producer, the one or more volatile descriptions, wherein said providing the first portion of the reconstructed video frame to a rendering device is based on the first volatile description.

Optionally, the method comprises obtaining another video frame; determining one or more portions of the other video frame, wherein the one or more portions of the other video frame comprises a portion of the other video frame and a second portion of the other video frame; determining a difference between the one or more portions of the video frame and the one or more portions of the other video frame, wherein the deference comprises the second portion of the other video frame; determining, by the producer, a second message, wherein the second message comprises another first session description offer and a second session description, wherein the other first session description offer comprises another first description of a first expected processed portion of the other video frame, wherein the first expected processed portion of the other video frame is associated with the first expected processed of the video frame, wherein the other first session description offer comprises at least one of: a shape of the first expected processed portion of the other video frame, or dimensions of the shape of the first expected processed portion of the other video frame, or a shape of the portion of the other video frame, or dimensions of the shape of the portion of the video other frame, or an activity level of the portion of the other video frame, or an interest level of the portion of the other video frame, or a description of the object displayed in the portion of the other video frame or a combination thereof; wherein the second session description offer comprises at least on of: a shape of the second expected processed portion of the other video frame, or the dimensions of the shape of the second expected processed portion of the other video frame, or a shape of a second portion of the other video frame, or dimensions of the second portion of the other video frame, or an activity level of the second portion of the other video frame, or an interest level of the second portion of the other video frame, or a description of a second object displayed in the second portion of the other video frame or a combination thereof; providing, by the producer, the second message to the one or more consumers; obtaining, by the producer, another acknowledgment from the first consumer, wherein the other acknowledgment comprises another first acknowledgment for the other first session description offer; determining, by the producer, one or more portions of the other video frame to be processed, wherein determining the one or more portions of the other video frame to be processed is based on the other acknowledgment, whereby determining the one or more portions of the other video frame to be processed is based on the other first acknowledgment, whereby the portion of the other video frame is a portion of the other video frame to be processed, wherein said processing the one or more portions of the other video frame to be processed comprises processing the portion of the other video frame to be processed, wherein processing the portion of the other video frame to be processed yields the first expected processed portion of the other video frame, wherein another final operation comprises providing the first expected processed portion of the other video frame to the first consumer.

Optionally, the one or more portions of the video frame to be processed is a first set of portions of the video frame, wherein the one or more portions of the other video frame to be processed is a second set of portions of the other video frame, wherein the difference between the one or more portions of the video frame and the one or more portions of the other video frame is a difference between a first size of the first set and a second size of the second set, wherein the second size is larger than the first size.

Optionally, the determination of the one or more portions of the video frame to be processed comprises determining one or more minimal bounding shapes, wherein a first portion of the video frame to be processed is comprised a minimal bounding shape, wherein the minimal bounding shape is comprised by the one or more minimal bounding shapes, wherein the first minimal bounding shape is a minimal shape in area comprising an image of the first object.

Optionally, a final operation is providing to a consumer, wherein the method is performed by a consumer, wherein the method comprises: obtaining one or more portions of the one or more processed portions of the video frame, wherein a first portion of the video frame comprises a representation of a first portion of the video frame, wherein a second portion of the video frame comprises a representation of a second portion of the video frame; decoding, by the consumer, the portion of the one or more processed portions of the video frame to one or more decoded portions of the video frame; determining a reconstructed video frame, wherein a difference between the video frame and the reconstructed video frame is below a threshold, wherein determining a reconstructed video frame comprises merging the one or more decoded portion of the video frame; and providing the reconstructed video frame to a rendering device, whereby providing the reconstructed video frame to a user.

Optionally, the method comprises that obtaining, by the consumer, one or more processed portions of another video frame, wherein a processed portion of the other video frame comprises a representation of another portion of the other video frame, wherein the other portion of the video frame and the first portion of the video frame are: representations of a same object; determining another reconstructed video frame, wherein determining the other reconstructed video frame comprises merging the other processed portion of the video frame and the second portion of the video frame, wherein another difference between the other video frame and the other reconstructed video frame is below the threshold; and providing the other reconstructed video frame to a rendering device, whereby providing the other reconstructed video frame to a user.

Optionally, the method comprises that obtaining, by the consumer, one or more processed portions of another video frame, wherein a processed portion of the other video frame comprises a representation of another portion of the other video frame, wherein the other portion of the video frame and the first portion of the video frame are: representations of a same object; and providing the other processed portion of the video frame to the rendering device, whereby providing to the user another reconstructed video frame, wherein another difference between the other video frame and the other reconstructed video frame is below the threshold.

Yet Another exemplary embodiment of the disclosed is a computerized apparatus having a processor and coupled memory, wherein the processor is adapted to perform the steps of a method comprising obtaining a video frame; determining one or more portions of the video frame to be processed; determining, based on the one or more portions of the video frame to be processed, one or more processing channels; processing the one or more portions of the video frame to be processed, wherein processing a portion of the video frame to be processed is performed by utilizing a processing channel comprised by the one or more processing channels.

Yet Another exemplary embodiment of the disclosed is a computerized apparatus having a processor and coupled memory, wherein the processor is adapted to perform the steps of: obtaining a context information; determining, based on the context information, one or more instances, wherein an instance comprised by the one or more instances is another computerized apparatus having another processor and coupled with another memory, wherein the other processor is configured to perform the steps of claim 1.

Optionally, the computerized apparatus is further configured to determine one or more portions of the video frame to be processed, wherein said determining one or more instances is based on the one or more portions of the video frame to be processed.

Optionally, the computerized apparatus is further configured to: obtaining one or more priorities for the one or more portions of the video frame to be processed, wherein the computerized apparatus is further configured to determine the one or more one or more instances based on the one or more priorities.

Optionally, the computerized apparatus is further configured to determine, based on the one or more portions of the video frame to be processed, one or more activity levels, wherein said determining the one or more instances is further based on the one or more activity levels.

Optionally, the computerized apparatus is further configured to perform the steps of: obtaining, from a consumer comprised by the one or more consumers, a consumer context information, wherein the context information comprises the consumer context information, whereby said determining one or more instances is based on the consumer context information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a sequence of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

An "or" used therein and/or in the claims is an inclusive or. As an example, the sentence "a priority may be based on an interest level or based on an activity level" indicates that the priority can be based on the interest level. Additionally or alternatively, the sentence indicates that the priority can be based on the activity level. Additionally or alternatively, the sentence indicates that the priority can be based on the interest level and on the activity level.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computing system comprising:
   at least one processor; and
   at least one memory communicatively coupled to the at least one processor comprising computer-readable instructions that when executed by the at least one processor cause the computing system to perform a method comprising:
   obtaining a video frame;
   determining one or more areas of interest in the video frame, wherein the one or more areas of interest in the video frame comprises at least a first area of interest in the video frame, wherein the first area of interest displays an image of a portion of an object;
   determining, based on the one or more areas of interest, one or more portions of the video frame, wherein the one or more portions of the video frame comprises at least a first portion, wherein the first portion is defined based on the first area of interest in the video frame, wherein the first portion of the video frame is a portion to be processed;
   determining, based on the one or more areas of interest of the video frame, one or more processing channels, wherein a processing channel comprises one or more processing actions, wherein a processing action comprised by the processing actions is associated with one or more processing action parameters; and
   processing the one or more portions by utilizing the one or more processing channels, whereby processing the first portion of the video frame by utilizing a first processing channel, wherein the first processing channel is comprised by the one or more processing channels, wherein processing the first portion of the video frame by utilizing the first processing channel comprises performing one or more processing actions comprised by the first processing channel, wherein processing the first portion of the video frame yields a first processed portion of the video frame;
   whereby an alternative video frame can be constructed based on the first processed portions of the video frame.

2. The computing system of claim 1, wherein said determining the first portion comprises cropping the video frame, wherein cropping the video frame, when performed with respect to the first area yields a first cropped portion, whereby performing a processing action comprised by the first processing channel with respect to the first cropped portion.

3. The computing system of claim 1, wherein said determining the first area of interest comprises performing a unification of a portion of the one or more areas of interest of the video frame, wherein the unification yields the first area of interest, whereby determining a non-interesting area of the video frame, wherein the non-interesting area is the complement of the first area of interest.

4. The computing system of claim 3, wherein said determining the one or more portions of the video frame comprises determining to process the first area of interest and the non-interesting area, wherein the method comprises:
   setting the interesting area to a constant value, whereby determining a non-interesting portion, wherein the non-interesting portion is associated with the non-interesting area; and
   setting the non-interesting area to another constant value, whereby determining the portion, wherein the portion is associated with the interesting area.

5. The computing system of claim 4, wherein said determining the one or more processing channels comprises determining one or more non-interesting processing channels, wherein a processing action comprised by a non-interesting channel is a non-interesting action, wherein the non-interesting action is associated with one or more non-interesting processing parameter.

6. The computing system of claim 4, wherein said determining the non-interesting portion comprises shrinking the non-interesting portion.

7. The computing system of claim 3, wherein the non-interesting area of the video frame comprises a margin of the video frame.

8. The computing system of claim 1, wherein the processing action is a deflating action, wherein the method comprises:

performing the deflating action with respect to the portion.

9. The computing system of claim 1, wherein said determining the one or more areas of interest is based on one or more points of gaze of one or more users.

10. The computing system of claim 1, wherein said determining the one or more areas of interest comprises:
    displaying, to a user, the video frame;
    obtaining, from the user, one or more locations of one or more points of the user to of the video frame; and
    determining, based on the one or more locations, the one or more areas of interest, wherein a user point comprised by the one or more points of the user is associated with an area of interest comprised by the video frame.

11. The computing system of claim 1, wherein said determining the one or more areas of interest of the video frame comprises detecting one or more objects displayed in the video frame, wherein the first portion of the video frame is displaying a portion of an object comprised by the one or more objects.

12. The computing system of claim 1, wherein the video frame comprised by a sequence of video frames, wherein the sequence of video frames comprises at least the video frame and another video frame, wherein the first area of interest of the video frame is a first area of interest in the sequence of the video frames, wherein the video frame comprises a second area, wherein the other video frame is ordered after the video frame in the sequence of video frames, wherein the other video frame comprises at least the first area of interest and the second area;
    wherein the method further comprises:
        determining to process a second portion of the video frame, wherein the second portion of the video frame is defined based on the second area;
        processing the second portion of the video frame by utilizing a second processing channel, wherein the second processing channel comprised by the one or more processing channels, wherein processing the second portion of the video frame yields a second processed portion of the video frame;
        obtaining the other video frame;
        determining, based on the one or more areas in the video frame, one or more portions of the other video frame, wherein the one or more portions of the other video frame comprises a first other portion of the other video frame, wherein the first other portion is defined by the first area of interest, wherein a unification of the one or more portions of the other video frame is different than the other video frame; and
        processing the one or more portions of the other video frame by utilizing the one or more processing channels, whereby processing the first other portion of the other video frame by utilizing the first processing channel, wherein a major relative difference is a relative difference of the video frame, wherein a first minor relative difference is the relative difference of the first portion of the video frame to be processed, wherein a second minor relative difference is the relative difference of the second portion of the video frame to be processed, wherein a value of a sum function of the first minor relative difference and the second minor relative difference is smaller than the major relative difference;
    whereby an alternative other video frame can be constructed based on the one or more processed portions of the video frame and based on the one or more processed portions of the other video frame.

13. The computing system of claim 12, wherein said determining the one or more portions of the other video frame comprises determining to exclude a second other portion from the portions of the other video frame to be processed, wherein the second other portion is defined by the second area.

14. The computing system of claim 13, wherein said determining the one or more processing channels comprises determining one or more priority frame per second parameter values, wherein said determining to exclude the second other portion of the other video frame from the one or more portions of the other video frame is based on a second priority frame per second parameter, wherein the second priority frame per second parameter is smaller than a process per second parameter value, wherein the process per second parameter value is associated with the second portion of the video frame and with the second other portion of the other video frame, wherein the process per second parameter value is comprised by the one or more process per second parameter values.

15. The computing system of claim 1, wherein the video frame comprised by a sequence of video frames, wherein the sequence of video frames comprises at least the video frame and another video frame, wherein the other video frame is ordered after the video frame in the sequence of video frames;
    wherein said determining the first area of interest comprises detecting one or more objects displayed in the video frame, wherein a same object is comprised by the one or more objects;
    wherein the method comprises:
    obtaining the other video frame;
    determining, based on the one or more areas of interest in the video frame, one or more portions of the other video frame to be processed, wherein determining the one or more portions of the other video frame comprises:
    determining a path of the same objects in the sequences of video frames;
    based on the path, determining another area of interest in the other video frame, wherein the same object is displayed in the other video frame, wherein the other area of interest is different than the first area of interest;
    determining to process another portion of the other video frame, wherein the other portion is defined by the other area of interest, whereby not detecting objects in the other video frame; and
    processing the one or more portions of the other video frame by utilizing the one or more processing channels;
    whereby an alternative other video frame can be constructed based on the one or more processed portions of the other video frame, whereby the alternative other video frame is displaying an alternative representation of the same object.

16. The computing system of claim 1, wherein the video frame comprised by a sequence of video frames, wherein the sequence of video frames comprises at least the video frame and another video frame, wherein the other video frame is ordered after the video frame in the sequence of video frames, wherein the first area of interest is displaying a same object, wherein said determining the first area of interest comprises:
    detecting one or more objects displayed in the video frame, wherein the same object is comprised by the one or more objects;
    determining an activity level of the same object; and determining, based on the activity level a bounding shape, wherein the bounding shape comprises the same object in the video frame and in the other video frame, wherein the first area of interest is comprised by the bounding shape, whereby the first portion of the video frame is comprised by the bounding shape;

wherein the method further comprises:

obtaining the other video frame;

determining, based on the one or more areas of interest in the video frame, one or more portions of the other video frame, wherein determining the one or more portions of the video frame comprises:

determining, based on the bounding shape, another area of interest in the other video frame, wherein the same object is displayed in the other video frame in the other area of interest, wherein the first area of interest and the other area of interest are different;

determining to process another portion of the other video frame, wherein the other portion is defined by the other area of interest, whereby not detecting objects in the other video frame;

processing the one or more portions of the other video frame by utilizing the one or more processing channels;

whereby an alternative other video frame can be constructed based on the one or more processed portions of the other video frame, whereby the alternative other video frame is displaying an alternative representation of the same object.

17. The computing system of claim 1, wherein the method recursively comprises performing the steps of claim 1, wherein the first portion of the video frame is the video frame.

18. A method comprising:

obtaining a video frame;

determining one or more areas of interest in the video frame, wherein the one or more areas of interest in the video frame comprises at least a first area of interest in the video frame, wherein the first area of interest displays an image of a portion of an object;

determining, based on the one or more areas of interest, one or more portions of the video frame, wherein the one or more portions of the video frame comprises at least a first portion, wherein the first portion is defined based on the first area of interest in the video frame, wherein the first portion of the video frame is a portion to be processed;

determining, based on the one or more areas of interest of the video frame, one or more processing channels, wherein a processing channel comprises one or more processing actions, wherein a processing action comprised by the processing actions is associated with one or more processing action parameters; and processing the one or more portions by utilizing the one or more processing channels, whereby processing the first portion of the video frame by utilizing a first processing channel, wherein the first processing channel is comprised by the one or more processing channels, wherein processing the first portion of the video frame by utilizing the first processing channel comprises performing one or more processing actions comprised by the first processing channel, wherein processing the first portion of the video frame yields a first processed portion of the video frame;

whereby an alternative video frame can be constructed based on the first processed portions of the video frame.

19. The method of claim 18, wherein the video frame comprised by a sequence of video frames, wherein the sequence of video frames comprises at least the video frame and another video frame, wherein the first area of interest of the video frame is a first area of interest in the sequence of the video frames, wherein the video frame comprises a second area, wherein the other video frame is ordered after the video frame in the sequence of video frames, wherein the other video frame comprises at least the first area of interest and the second area;

wherein the method further comprises:

determining to process a second portion of the video frame, wherein the second portion of the video frame is defined based on the second area;

processing the second portion of the video frame by utilizing a second processing channel, wherein the second processing channel comprised by the one or more processing channels, wherein processing the second portion of the video frame yields a second processed portion of the video frame;

obtaining the other video frame;

determining, based on the one or more areas in the video frame, one or more portions of the other video frame, wherein the one or more portions of the other video frame comprises a first other portion of the other video frame, wherein the first other portion is defined by the first area of interest, wherein a unification of the one or more portions of the other video frame is different than the other video frame; and processing the one or more portions of the other video frame by utilizing the one or more processing channel, whereby processing the first other portion of the other video frame by utilizing the first processing channel, wherein a major relative difference is a relative difference of the video frame, wherein a first minor relative difference is the relative difference of the first portion of the video frame to be processed, wherein a second minor relative difference is the relative difference of the second portion of the video frame to be processed, wherein a value of a sum function of the first minor relative difference and the second minor relative difference is smaller than the major relative difference;

whereby an alternative other video frame can be constructed based on the one or more processed portions of the video frame and based on the one or more processed portions of the other video frame.

20. The method of claim 18, wherein the video frame comprised by a sequence of video frames, wherein the sequence of video frames comprises at least the video frame and another video frame, wherein the other video frame is ordered after the video frame in the sequence of video frames;

wherein said determining the first area of interest comprises detecting one or more objects displayed in the video frame, wherein a same object is comprised by the one or more objects;

wherein the method comprises:

obtaining the other video frame;

determining, based on the one or more areas of interest in the video frame, one or more portions of the other video frame to be processed, wherein determining the one or more portions of the other video frame comprises:

determining a path of the same objects in the sequences of video frames;

based on the path, determining another area of interest in the other video frame, wherein the same object is displayed in the other video frame, wherein the other area of interest is different than the first area of interest;

determining to process another portion of the other video frame, wherein the other portion is defined by the other area of interest, whereby not detecting objects in the other video frame; and processing the one or more portions of the other video frame by utilizing the one or more processing channels;

whereby an alternative other video frame can be constructed based on the one or more processed portions of the other video frame, whereby the alternative other video frame is displaying an alternative representation of the same object.

21. The method of claim 18, wherein the video frame comprised by a sequence of video frames, wherein the sequence of video frames comprises at least the video frame and another video frame, wherein the other video frame is ordered after the video frame in the sequence of video frames, wherein the first area of interest is displaying a same object, wherein said determining the first area of interest comprises:

detecting one or more objects displayed in the video frame, wherein the same object is comprised by the one or more objects;

determining an activity level of the same object; and determining, based on the activity level a bounding shape, wherein the bounding shape comprises the same object in the video frame and in the other video frame, wherein the first area of interest is comprised by the bounding shape, whereby the first portion of the video frame is comprised by the bounding shape;

wherein the method further comprises:

obtaining the other video frame;

determining, based on the one or more areas of interest in the video frame, one or more portions of the other video frame, wherein determining the one or more portions of the video frame comprises:

determining, based on the bounding shape, another area of interest in the other video frame, wherein the same object is displayed in the other video frame in the other area of interest, wherein the first area of interest and the other area of interest are different;

determining to process another portion of the other video frame, wherein the other portion is defined by the other area of interest, whereby not detecting objects in the other video frame;

processing the one or more portions of the other video frame by utilizing the one or more processing channels;

whereby an alternative other video frame can be constructed based on the one or more processed portions of the other video frame, whereby the alternative other video frame is displaying an alternative representation of the same object.

22. An apparatus comprising a processor and a memory;

wherein the memory is configured to retain one or more video frames, wherein a video frame comprised by the one or more video frames comprises at least a first area of interest in the video frame;

wherein said processor is configured to:

determining one or more areas of interest in the video frame, wherein the one or more areas of interest in the video frame comprises at least a first area of interest in the video frame, wherein the first area of interest displays an image of a portion of an object;

determining, based on the one or more areas of interest, one or more portions of the video frame, wherein the one or more portions of the video frame comprises at least a first portion, wherein the first portion is defined based on the first area of interest in the video frame, wherein the first portion of the video frame is a portion to be processed;

determining, based on the one or more areas of interest of the video frame, one or more processing channels, wherein a processing channel comprises one or more processing actions, wherein a processing action comprised by the processing actions is associated with one or more processing action parameters; and processing the one or more portions by utilizing the one or more processing channels, whereby processing the first portion of the video frame by utilizing a first processing channel, wherein the first processing channel is comprised by the one or more processing channels, wherein processing the first portion of the video frame by utilizing the first processing channel comprises performing one or more processing actions comprised by the first processing channel, wherein processing the first portion of the video frame yields a first processed portion of the video frame;

whereby an alternative video frame can be constructed based on the first processed portions of the video frame.

23. The apparatus of claim 22, wherein the one or more video frames are a sequence of video frames, wherein the video frame comprised by the sequence of video frames, wherein the sequence of video frames comprises at least the video frame and another video frame, wherein the first area of interest of the video frame is a first area of interest in the sequence of the video frames, wherein the video frame comprises a second area, wherein the other video frame is ordered after the video frame in the sequence of video frames, wherein the other video frame comprises at least the first area of interest and the second area;

wherein said processor is further configured to:

determining to process a second portion of the video frame, wherein the second portion of the video frame is defined based on the second area;

processing the second portion of the video frame by utilizing a second processing channel, wherein the second processing channel comprised by the one or more processing channels, wherein processing the second portion of the video frame yields a second processed portion of the video frame;

determining, based on the one or more areas in the video frame, one or more portions of the other video frame, wherein the one or more portions of the other video frame comprises a first other portion of the other video frame, wherein the first other portion is defined by the first area of interest, wherein a unification of the one or more portions of the other video frame is different than the other video frame; and processing the one or more portions of the other video frame by utilizing the one or more processing channels, whereby processing the first other portion of the other video frame by utilizing the first processing channel, wherein a major relative difference is a relative difference of the video frame, wherein a first minor relative difference is the relative difference of the first portion of the video frame to be processed, wherein a second minor relative difference is the relative difference of the second portion of the video frame to be processed, wherein a value of a sum function of the first minor relative difference and the second minor relative difference is smaller than the major relative difference;

whereby an alternative other video frame can be constructed based on the one or more processed portions of the video frame and based on the one or more processed portions of the other video frame.

\* \* \* \* \*